US008464169B2

(12) United States Patent
Gottlieb et al.

(10) Patent No.: US 8,464,169 B2
(45) Date of Patent: *Jun. 11, 2013

(54) METHODS FOR IDENTIFYING CELLS IN A PATH IN A FLOWCHART AND FOR SYNCHRONIZING GRAPHICAL AND TEXTUAL VIEWS OF A FLOWCHART

(75) Inventors: Harry N. Gottlieb, Chicago, IL (US); Mari H. Franklin, Barrington Hills, IL (US); Lukass R. Franklin, Barrington Hills, IL (US); Jeffrey A. Barhorst, Grayslake, IL (US)

(73) Assignee: The Jellyvision Lab, Inc., Chicago, IL (US)

( * ) Notice: Subject to any disclaimer, the term of this patent is extended or adjusted under 35 U.S.C. 154(b) by 1100 days.

This patent is subject to a terminal disclaimer.

(21) Appl. No.: 11/975,577

(22) Filed: Oct. 19, 2007

(65) Prior Publication Data
US 2008/0065977 A1    Mar. 13, 2008

Related U.S. Application Data

(63) Continuation of application No. 10/038,527, filed on Jan. 2, 2002, now Pat. No. 7,310,784.

(51) Int. Cl.
*G06F 3/00* (2006.01)

(52) U.S. Cl.
USPC ........... 715/763; 715/771; 715/853; 715/854; 717/102

(58) Field of Classification Search
USPC ................... 715/763, 771, 853–854; 717/102
See application file for complete search history.

(56) References Cited

U.S. PATENT DOCUMENTS

| 4,538,188 A | 8/1985 | Barker et al. |
| 4,831,525 A | 5/1989 | Saito et al. |

(Continued)

FOREIGN PATENT DOCUMENTS

| EP | 0 438 299 A2 | 7/1991 |
| EP | 0 661 631 A2 | 7/1995 |

(Continued)

OTHER PUBLICATIONS

Goofy Animation System, Technical Report 266, Lindsey Ford Department of Computer Science University of Exeter, Exeter EX4 4PT, U.K. Nov. 5, 1993, pp. 1-15.

(Continued)

*Primary Examiner* — Ryan Pitaro
(74) *Attorney, Agent, or Firm* — Brinks Hofer Gilson & Lione

(57) ABSTRACT

The preferred embodiments described herein provide methods for identifying cells in a path in a flowchart and for synchronizing graphical and textual views of a flowchart. In one preferred embodiment, a method for identifying cells in a path in a flowchart is provided comprising the acts of displaying a flowchart comprising a plurality of cells, selecting a cell in the flowchart, determining a path comprising the selected cell, and identifying at least some of the cells in the path. In another preferred embodiment, a method for synchronizing graphical and textual views of a flowchart is provided. This method comprises the acts of displaying a graphical view of a flowchart comprising a plurality of cells in a first display region, displaying a textual view of at least some cells in the flowchart in a second display region, and in response to input received in either the first or second display regions, applying the input to both the first and second display regions. Other preferred embodiments are provided, and each of the preferred embodiments can be used alone or in combination with one another.

27 Claims, 12 Drawing Sheets

U.S. PATENT DOCUMENTS

| | | | |
|---|---|---|---|
| 4,831,580 A | | 5/1989 | Yamada |
| 4,852,047 A | | 7/1989 | Lavallee et al. |
| 4,875,187 A | | 10/1989 | Smith |
| 4,893,256 A | | 1/1990 | Rutherfoord et al. |
| 4,931,950 A | | 6/1990 | Isle et al. |
| 4,933,880 A | | 6/1990 | Borgendale et al. |
| 4,956,773 A | | 9/1990 | Saito et al. |
| 5,111,409 A | | 5/1992 | Gasper et al. |
| 5,119,474 A | | 6/1992 | Beitel et al. |
| 5,261,041 A | | 11/1993 | Susman |
| 5,307,456 A | | 4/1994 | MacKay |
| 5,386,508 A | | 1/1995 | Itonori et al. |
| 5,418,622 A | | 5/1995 | Takeuchi |
| 5,430,872 A | | 7/1995 | Dahod et al. |
| 5,446,911 A | | 8/1995 | Juso et al. |
| 5,515,490 A | | 5/1996 | Buchanan et al. |
| 5,519,828 A | | 5/1996 | Rayner |
| 5,530,856 A | | 6/1996 | Dahod et al. |
| 5,546,529 A | | 8/1996 | Bowers et al. |
| 5,581,759 A | | 12/1996 | Ohhashi et al. |
| 5,586,311 A | | 12/1996 | Davies et al. |
| 5,590,253 A | | 12/1996 | Onishi et al. |
| 5,592,602 A | | 1/1997 | Edmunds et al. |
| 5,619,636 A | | 4/1997 | Sweat et al. |
| 5,630,017 A | | 5/1997 | Gasper et al. |
| 5,640,590 A | | 6/1997 | Luther |
| 5,692,212 A | | 11/1997 | Roach |
| 5,697,788 A | | 12/1997 | Ohta |
| 5,708,845 A | | 1/1998 | Wistendahl et al. |
| 5,717,879 A | | 2/1998 | Moran et al. |
| 5,721,959 A | | 2/1998 | Nakamura et al. |
| 5,752,029 A | | 5/1998 | Wissner |
| 5,754,851 A | | 5/1998 | Wissner |
| 5,806,079 A | | 9/1998 | Rivette et al. |
| 5,818,435 A | | 10/1998 | Kozuka et al. |
| 5,870,768 A | | 2/1999 | Hekmatpour |
| 5,892,507 A | * | 4/1999 | Moorby et al. ............... 715/205 |
| 5,893,105 A | | 4/1999 | MacLennan |
| 5,905,981 A | | 5/1999 | Lawler |
| 6,034,692 A | | 3/2000 | Gallery et al. |
| 6,058,333 A | | 5/2000 | Klein et al. |
| 6,072,480 A | | 6/2000 | Gorbet et al. |
| 6,097,887 A | | 8/2000 | Hardikar et al. |
| 6,100,881 A | | 8/2000 | Gibbons et al. |
| 6,144,938 A | | 11/2000 | Surace et al. |
| 6,154,600 A | | 11/2000 | Newman et al. |
| 6,179,490 B1 | | 1/2001 | Pruitt |
| 6,184,879 B1 | | 2/2001 | Minemura et al. |
| 6,212,674 B1 | | 4/2001 | Suckow |
| 6,239,800 B1 | | 5/2001 | Mayhew et al. |
| 6,243,857 B1 | | 6/2001 | Logan et al. |
| 6,314,569 B1 | | 11/2001 | Chernock et al. |
| 6,334,103 B1 | | 12/2001 | Surace et al. |
| 6,346,945 B1 | | 2/2002 | Mansurov et al. |
| 6,356,867 B1 | | 3/2002 | Gabai et al. |
| 6,370,683 B1 | | 4/2002 | Sobers |
| 6,421,821 B1 | | 7/2002 | Lavallee |
| 6,496,208 B1 | | 12/2002 | Bernhardt et al. |
| 6,654,803 B1 | | 11/2003 | Rochford et al. |
| 6,816,174 B2 | | 11/2004 | Tiongson et al. |
| 6,873,344 B2 | | 3/2005 | Samra et al. |
| 6,973,639 B2 | | 12/2005 | Hashimoto et al. |
| 7,310,784 B1 | * | 12/2007 | Gottlieb et al. ............... 715/853 |
| 7,793,219 B1 | | 9/2010 | Stratton et al. |
| 2002/0038206 A1 | | 3/2002 | Dori |
| 2002/0089527 A1 | | 7/2002 | Paradies |
| 2002/0140731 A1 | | 10/2002 | Subramaniam et al. |
| 2004/0070594 A1 | | 4/2004 | Burke |
| 2004/0196310 A1 | | 10/2004 | Aamodt et al. |
| 2007/0234196 A1 | | 10/2007 | Nicol et al. |
| 2007/0240046 A1 | | 10/2007 | Yan et al. |
| 2008/0065977 A1 | | 3/2008 | Gottlieb et al. |
| 2008/0104121 A1 | | 5/2008 | Gottlieb et al. |
| 2008/0184143 A1 | | 7/2008 | Gottlieb et al. |
| 2008/0244376 A1 | | 10/2008 | Gottlieb et al. |

FOREIGN PATENT DOCUMENTS

| | | |
|---|---|---|
| EP | 1667115 A2 | 6/2006 |
| JP | 63 127333 | 5/1988 |
| JP | 5 257666 A2 | 10/1993 |
| JP | 8 96001 | 4/1996 |
| JP | 8 263536 | 10/1996 |
| JP | 2002 120174 | 4/2002 |
| WO | WO 96/19779 | 6/1996 |
| WO | WO 96/26600 | 8/1996 |

OTHER PUBLICATIONS

A Multimedia Presentation Mechanism Permitting Partial Loss of Objects, Han Il Kim et al., Dept. of Computer Eng., pp. 847-851 (1992).

Storm Structural and Temporal Object-oRiented Multimedia database system, Michel Adiba, IMAG-LGI, Grenoble University, BP 53, 38041 Grenoble Cedex 9 France, pp. 12-19 (1995).

Shelldrake Developer, http://www.shelldrake.com/Developer/faqs.htm, 3 pages (2000).

Shelldrake Developer, http://www.shelldrake.com/Developer/StoryFirst.htm, 3 pages (2000).

Quality America Inc., Flowchart/Cause & Effect Features, Jun. 21, 2000, pp. 1-4.

"allCLEAR User's Guide," Version 4.5, SPSS Inc., 1999 (218 pages).

"Anark Studio™ User Guide," Version date: Feb. 16, 2005. 324 pages.

"Cubase SX/SL 3 Music Creation and Production System," Getting Started, Manual by Anders Nordmark, Steinberg Media Technologies GmbH, 2004. 268 pages.

"Cubase SX/SL 3 Music Creation and Production System," Operation Manual, Manual by Anders Nordmark, Steinberg Media Technologies GmbH, 2004. 810 pages.

"Macromedia FLASH™ MX 2004 Getting Started with Flash," Macromedia, Inc. 2004. 68 pages.

"Macromedia FLASH™ MX 2004 Using Flash," Macromedia, Inc. 2004. 498 pages.

"Macromedia Authorware7 Using Authorware 7," Macromedia, Inc., 2003. 286 pages.

Watts et al., "The SFC Editor: A Graphical Tool for Algorithm Development, Consortium for Computing Science in Colleges," 2004, pp. 73-85.

PCT International Search Report/Written Opinion of the International Searching Authority (the European Patent Office) regarding Application No. PCT/US08/53407, dated May 23, 2008, 8 pages.

PCT International Search Report/Written Opinion of the International Searching Authority (the European Patent Office) regarding Application No. PCT/US2007/087623, dated May 8, 2008, 12 pages.

"Using Authorware passage", Using Authorware, Macromedia, US, Aug. 2001, page complete, XP002343353, pp. 13, 33-34, 41, 48.

Shih, T. K. et al: "Multimedia presentation design using data flow diagrams", Intelligent Processing Systems, 1997, ICIPS '97, 1997 IEEE International Conference on Beijing, China, Oct. 28-31, 1997, New York, NY, USA, IEEE, US, vol. 2, Oct. 28, 1997, pp. 1716-1720, XP010276159, ISBN: 0-7803-4253-4, the whole document.

Bell, M. A. et al.: "CALVIN-courseware authoring language using visual notation", Visual Languages, 1993, Proceedings 1993 IEEE Symposium on Bergen, Norway, Aug. 24-27, 1993, Los Alamitos, CA, USA, IEEE Comp. Soc., US, Aug. 24, 1993, pp. 225-230, XP010032717, ISBN: 0-8186-3970-9, the whole document.

Dick C. A. Bulterman and Lynda Hardman: "Structured Multimedia Authoring", ACM Transactions on Multimedia Computing, [Online] 2005, XP002487484, Retrieved from the Internet: URL: http://homepages.cwi.nl/{dcab/PDF/tomccap05.pdf> the whole document.

PCT International Search Report/Written Opinion of the International Searching Authority (the European Patent Office) regarding Application No. PCT/US2007/087618, dated Jul. 23, 2008, 14 pages.

\* cited by examiner

METHODS FOR IDENTIFYING CELLS IN A PATH IN A FLOWCHART AND FOR SYNCHRONIZING GRAPHICAL AND TEXTUAL VIEWS OF A FLOWCHART

CROSS-REFERENCE TO RELATED APPLICATIONS

This application is a continuation of U.S. application Ser. No. 10/038,527, filed Jan. 2, 2002, now U.S. Pat. No. 7,310,784 which is hereby incorporated by reference.

REFERENCE TO COMPUTER PROGRAM LISTING APPENDIX

This application contains one compact disc submitted in duplicate. The material on that compact disc is hereby incorporated by reference. The following is a listing of the names of the files on the compact disc, their dates of creation, and their sizes in bytes.
Volume in drive F is 011228__1335
Volume Serial Number is 7635-063B
Directory of F:\Send\docs

| | | |
|---|---|---|
| Dec. 28, 2001 01:37 p | 1,420 | ReadMe.txt |
| Dec. 28, 2001 12:51 p | 2,663 | TWiki_Lab_AudioMoment.mht |
| Dec. 28, 2001 12:51 p | 3,118 | TWiki_Lab_AudioVersion.mht |
| Dec. 28, 2001 12:51 p | 25,715 | TWiki_Lab_ConditionCell.mht |
| Dec. 28, 2001 12:51 p | 3,386 | TWiki_Lab_CueCard.mht |
| Dec. 28, 2001 12:51 p | 15,237 | TWiki_Lab_DialogueCell.mht |
| Dec. 28, 2001 12:51 p | 17,114 | TWiki_Lab_FlowchartScriptWindow.mht |
| Dec. 28, 2001 12:51 p | 4,093 | TWiki_Lab_GotoCell.mht |
| Dec. 28, 2001 12:51 p | 31,354 | TWiki_Lab_MediaWindow.mht |
| Dec. 28, 2001 12:51 p | 4,713 | TWiki_Lab_PlaybackWindow.mht |
| Dec. 28, 2001 01:31 p | 4,239 | TWiki_Lab_UberToolManual.mht |
| 11 File(s) | 113,052 bytes | |

Directory of F:\Send\ExtLibraries\graphviz-1.7.7

| | | |
|---|---|---|
| Dec. 28, 2001 12:51 p | 19,004 | aclocal.m4 |
| Dec. 28, 2001 12:51 p | 860 | AUTHORS |
| Dec. 28, 2001 12:51 p | 1,747 | autogen.sh |
| Dec. 28, 2001 12:51 p | 5,424 | ChangeLog |
| Dec. 28, 2001 12:51 p | 3,780 | config.cache |
| Dec. 28, 2001 12:51 p | 32,349 | config.guess |
| Dec. 28, 2001 12:51 p | 16,295 | config.log |
| Dec. 28, 2001 12:51 p | 1,295 | Config.mk.linux.i386 |
| Dec. 28, 2001 12:51 p | 1,269 | Config.mk.sgi.mips3 |
| Dec. 28, 2001 12:51 p | 19,637 | config.status |
| Dec. 28, 2001 12:51 p | 25,767 | config.sub |
| Dec. 28, 2001 12:51 p | 162,205 | CONFIGURE |
| Dec. 28, 2001 12:51 p | 16,756 | configure.in |
| Dec. 28, 2001 12:51 p | 20,205 | COPYING |
| Dec. 28, 2001 12:51 p | 2,548 | FAQ.txt |
| Dec. 28, 2001 12:51 p | 10,967 | graphviz.spec |
| Dec. 28, 2001 12:51 p | 10,929 | graphviz.spec.in |
| Dec. 28, 2001 12:51 p | 3,127 | gvconfig.h |
| Dec. 28, 2001 12:51 p | 2,866 | gvconfig.h.IN |
| Dec. 28, 2001 12:51 p | 8,064 | INSTALL |
| Dec. 28, 2001 12:51 p | 5,849 | install-sh |
| Dec. 28, 2001 12:51 p | 124,781 | libtool |
| Dec. 28, 2001 12:51 p | 99,548 | ltconfig |
| Dec. 28, 2001 12:51 p | 114,545 | ltmain.sh |
| Dec. 28, 2001 12:51 p | 280 | Makeargs |
| Dec. 28, 2001 12:51 p | 16,270 | Makefile |
| Dec. 28, 2001 12:51 p | 772 | Makefile.am |
| Dec. 28, 2001 12:51 p | 16,527 | Makefile.IN |
| Dec. 28, 2001 12:51 p | 6,960 | MINTERMS.txt |
| Dec. 28, 2001 12:51 p | 6,473 | missing |
| Dec. 28, 2001 12:51 p | 762 | mkinstalldirs |
| Dec. 28, 2001 12:51 p | 4,074 | NEWS |
| Dec. 28, 2001 12:51 p | 417 | nmakefile |
| Dec. 28, 2001 12:51 p | 141 | README |
| Dec. 28, 2001 12:51 p | 11 | stamp-h |
| Dec. 28, 2001 12:51 p | 11 | stamp-h.in |
| 36 File(s) | 762,515 bytes | |

Directory of F:\Send\ExtLibraries\graphviz-1.7.7\agraph

| | | |
|---|---|---|
| Dec. 28, 2001 12:51 p | 1,280 | agerror.c |
| Dec. 28, 2001 12:51 p | 5,114 | aghdr.h |
| Dec. 28, 2001 12:51 p | 18,912 | agraph.3 |
| Dec. 28, 2001 12:51 p | 14,773 | agraph.h |
| Dec. 28, 2001 12:51 p | 2,292 | apply.c |
| Dec. 28, 2001 12:51 p | 10,278 | attr.c |
| Dec. 28, 2001 12:51 p | 9,616 | cmpnd.c |
| Dec. 28, 2001 12:51 p | 1,260 | dotdge.c |
| Dec. 28, 2001 12:51 p | 9,639 | edge.c |
| Dec. 28, 2001 12:51 p | 227 | fixheader |
| Dec. 28, 2001 12:51 p | 1,221 | flatten.c |
| Dec. 28, 2001 12:51 p | 39,722 | grammar.c |
| Dec. 28, 2001 12:51 p | 8,064 | grammar.grammar |
| Dec. 28, 2001 12:51 p | 324 | grammar.h |
| Dec. 28, 2001 12:51 p | 11,069 | grammar.y |
| Dec. 28, 2001 12:51 p | 5,019 | graph.c |
| Dec. 28, 2001 12:51 p | 3,192 | id.c |
| Dec. 28, 2001 12:51 p | 4,587 | imap.c |
| Dec. 28, 2001 12:51 p | 929 | io.c |
| Dec. 28, 2001 12:51 p | 1,963 | main.c |
| Dec. 28, 2001 12:51 p | 13,107 | Makefile |
| Dec. 28, 2001 12:51 p | 685 | Makefile.am |
| Dec. 28, 2001 12:51 p | 13,656 | Makefile.IN |
| Dec. 28, 2001 12:51 p | 69 | malloc.h |
| Dec. 28, 2001 12:51 p | 2,882 | mem.c |
| Dec. 28, 2001 12:51 p | 842 | nmakefile |
| Dec. 28, 2001 12:51 p | 5,824 | node.c |
| Dec. 28, 2001 12:51 p | 5,650 | obj.c |
| Dec. 28, 2001 12:51 p | 5,418 | pend.c |
| Dec. 28, 2001 12:51 p | 44 | README |
| Dec. 28, 2001 12:51 p | 5,938 | rec.c |
| Dec. 28, 2001 12:51 p | 2,808 | refstr.c |
| Dec. 28, 2001 12:51 p | 44,702 | scan.c |
| Dec. 28, 2001 12:51 p | 3,250 | scan.1 |
| Dec. 28, 2001 12:51 p | 2,274 | subg.c |
| Dec. 28, 2001 12:51 p | 1,260 | tester.c |
| Dec. 28, 2001 12:51 p | 2,021 | utils.c |
| Dec. 28, 2001 12:51 p | 881 | vmstub.h |
| Dec. 28, 2001 12:51 p | 10,616 | write.c |
| 39 File(s) | 271,408 bytes | |

Directory of F:\Send\ExtLibraries\graphviz-1.7.7\agutil

| | | |
|---|---|---|
| Dec. 28, 2001 12:51 p | 455 | agutil.h |
| Dec. 28, 2001 12:51 p | 740 | dynattr.c |
| Dec. 28, 2001 12:51 p | 10,707 | Makeflle |
| Dec. 28, 2001 12:51 p | 276 | Makefile.am |
| Dec. 28, 2001 12:51 p | 11,241 | Makefile.in |
| Dec. 28, 2001 12:51 p | 713 | nodeq.c |
| 6 File(s) | 24,132 bytes | |

Directory of F:\Send\ExtLibraries\graphviz-1.7.7\cdt

| | | |
|---|---|---|
| Dec. 28, 2001 12:51 p | 3,394 | ast_common.h |
| Dec. 28, 2001 12:51 p | 19,591 | cdt.3 |
| Dec. 28, 2001 12:51 p | 8,301 | cdt.h |
| Dec. 28, 2001 12:51 p | 1,293 | dtclose.c |
| Dec. 28, 2001 12:51 p | 2,886 | dtdisc.c |
| Dec. 28, 2001 12:51 p | 1,250 | dtextract.c |

-continued

| | |
|---|---|
| Dec. 28, 2001 12:51 p | 1,698 dtflatten.c |
| Dec. 28, 2001 12:51 p | 7,251 dthash.c |
| Dec. 28, 2001 12:51 p | 2,569 dthdr.h |
| Dec. 28, 2001 12:51 p | 4,361 dtlist.c |
| Dec. 28, 2001 12:51 p | 2,548 dtmethod.c |
| Dec. 28, 2001 12:51 p | 2,289 dtopen.c |
| Dec. 28, 2001 12:51 p | 1,841 dtrenew.c |
| Dec. 28, 2001 12:51 p | 2,076 dtrestore.c |
| Dec. 28, 2001 12:51 p | 1,310 dtsize.c |
| Dec. 28, 2001 12:51 p | 2,725 dtstat.c |
| Dec. 28, 2001 12:51 p | 1,028 dtstrhash.c |
| Dec. 28, 2001 12:51 p | 7,187 dttree.c |
| Dec. 28, 2001 12:51 p | 3,279 dtview.c |
| Dec. 28, 2001 12:51 p | 1,130 dtwalk.c |
| Dec. 28, 2001 12:51 p | 609 libcdt.la |
| Dec. 28, 2001 12:51 p | 12,646 Makefile |
| Dec. 28, 2001 12:51 p | 678 Makefile.am |
| Dec. 28, 2001 12:51 p | 13,183 Makefile.IN |
| Dec. 28, 2001 12:51 p | 509 nmakefile |
| Dec. 28, 2001 12:51 p | 939 README |
| 26 File(s) | 106,571 bytes |

Directory of F:\Send\ExtLibraries\graphviz-1.7.7\cdt\features

| | |
|---|---|
| Dec. 28, 2001 12:51 p | 8,960 common |
| 1 File(s) | 8,960 bytes |

Directory of F:\Send\ExtLibraries\graphviz-1.7.7\contrib

| | |
|---|---|
| Dec. 28, 2001 12:51 p | 2,148 gprof2dot.awk |
| Dec. 28, 2001 12:51 p | 127 INDEX |
| Dec. 28, 2001 12:51 p | 7,632 Makefile |
| Dec. 28, 2001 12:51 p | 259 Makefile.am |
| Dec. 28, 2001 12:51 p | 8,110 Makefile.in |
| 5 File(s) | 18,276 bytes |

Directory of F:\Send\ExtLibraries\graphviz-1.7.7\contrib\CVS

| | |
|---|---|
| Dec. 28, 2001 12:51 p | 154 Entries |
| Dec. 28, 2001 12:51 p | 18 Repository |
| Dec. 28, 2001 12:51 p | 40 Root |
| 3 File(s) | 212 bytes |

Directory of F:\Send\ExtLibraries\graphviz-1.7.7\contrib\lefty-grace

| | |
|---|---|
| Dec. 28, 2001 12:51 p | 23,701 dotty.lefty |
| Dec. 28, 2001 12:51 p | 30,116 dotty_draw.lefty |
| Dec. 28, 2001 12:51 p | 21,460 dotty_edit.lefty |
| Dec. 28, 2001 12:51 p | 19,317 dotty_ui.lefty |
| Dec. 28, 2001 12:51 p | 2,018 README |
| 5 File(s) | 96,612 bytes |

Directory of F:\Send\ExtLibraries\graphviz-1.7.7\contrib\lefty-grace\CVS

| | |
|---|---|
| Dec. 28, 2001 12:51 p | 256 Entries |
| Dec. 28, 2001 12:51 p | 30 Repository |
| Dec. 28, 2001 12:51 p | 40 Root |
| 3 File(s) | 326 bytes |

Directory of F:\Send\ExtLibraries\graphviz-1.7.7\contrib\lefty-grace\lefty-grace

| | |
|---|---|
| Dec. 28, 2001 12:51 p | 23,701 dotty.lefty |
| Dec. 28, 2001 12:51 p | 30,116 dotty_draw.lefty |
| Dec. 28, 2001 12:51 p | 21,460 dotty_edit.lefty |
| Dec. 28, 2001 12:51 p | 19,317 dotty_ui.lefty |
| Dec. 28, 2001 12:51 p | 2,018 README |
| 5 File(s) | 96,612 bytes |

Directory of F:\Send\ExtLibraries\graphviz-1.7.7\contrib\lefty-grace\lefty-grace\CVS

| | |
|---|---|
| Dec. 28, 2001 12:51 p | 256 Entries |
| Dec. 28, 2001 12:51 p | 30 Repository |
| Dec. 28, 2001 12:51 p | 40 Root |
| 3 File(s) | 326 bytes |

Directory of F:\Send\ExtLibraries\graphviz-1.7.7\dag

| | |
|---|---|
| Dec. 28, 2001 12:51 p | 6,931 base.c |
| Dec. 28, 2001 12:51 p | 5,400 check.c |
| Dec. 28, 2001 12:51 p | 6,444 config.c |
| Dec. 28, 2001 12:51 p | 2,385 dag.c |
| Dec. 28, 2001 12:51 p | 10,029 dag.h |
| Dec. 28, 2001 12:51 p | 16,358 ddspline.c |
| Dec. 28, 2001 12:51 p | 4,020 geom.c |
| Dec. 28, 2001 12:51 p | 10,962 Makefile |
| Dec. 28, 2001 12:51 p | 472 Makefile.am |
| Dec. 28, 2001 12:51 p | 11,496 Makefile.in |
| Dec. 28, 2001 12:51 p | 2,606 medians.c |
| Dec. 28, 2001 12:51 p | 4,137 opt.c |
| Dec. 28, 2001 12:51 p | 13,880 order.c |
| Dec. 28, 2001 12:51 p | 11,400 rank.c. |
| Dec. 28, 2001 12:51 p | 1,443 uvcross.c |
| Dec. 28, 2001 12:51 p | 5,440 work.c |
| Dec. 28, 2001 12:51 p | 5,834 xcoord.c |
| Dec. 28, 2001 12:51 p | 3,181 ycoord.c |
| 18 File(s) | 122,418 bytes |

Directory of F:\Send\ExtLibraries\graphviz-1.7.7\doc

| | |
|---|---|
| Dec. 28, 2001 12:51 p | 8,327 build.html |
| Dec. 28, 2001 12:51 p | 5,366 Dot.ref |
| Dec. 28, 2001 12:51 p | 9,584 FAQ.html |
| Dec. 28, 2001 12:51 p | 137,760 gd.html |
| Dec. 28, 2001 12:51 p | 7,600 Makefile |
| Dec. 28, 2001 12:51 p | 262 Makefile.am |
| Dec. 28, 2001 12:51 p | 8,078 Makefile.in |
| Dec. 28, 2001 12:51 p | 6,754 tcldot.html |
| 8 File(s) | 183,731 bytes |

Directory of F:\Send\ExtLibraries\graphviz-1.7.7\dotneato

| | |
|---|---|
| Dec. 28, 2001 12:51 p | 11,833 dot.1 |
| Dec. 28, 2001 12:51 p | 1,258 dot.c |
| Dec. 28, 2001 12:51 p | 2,118 dotmemtest.c |
| Dec. 28, 2001 12:51 p | 18,960 Makefile |
| Dec. 28, 2001 12:51 p | 1,590 Makefile.am |
| Dec. 28, 2001 12:51 p | 19,506 Makefile.IN |
| Dec. 28, 2001 12:51 p | 3,577 neato.1 |
| Dec. 28, 2001 12:51 p | 1,264 neato.c |
| Dec. 28, 2001 12:51 p | 2,028 neatomemtest.c |

-continued

| | | |
|---|---|---|
| Dec. 28, 2001 12:51 p | 33 | nmakefile |
| Dec. 28, 2001 12:51 p | 17,843 | XFIG_FORMAT3.2.txt |
| 11 File(s) | 80,010 bytes | |

Directory of F:\Send\ExtLibraries\graphviz-1.7.7\dotneato\awk

| | | |
|---|---|---|
| Dec. 28, 2001 12:51 p | 1,010 | colortbl.awk |
| Dec. 28, 2001 12:51 p | 395 | stringize.awk |
| Dec. 28, 2001 12:51 p | 1,310 | typegraph.awk |
| 3 File(s) | 2,715 bytes | |

Directory of F:\Send\ExtLibraries\graphviz-1.7.7\dotneato\common

| | | |
|---|---|---|
| Dec. 28, 2001 12:51 p | 16,478 | colortbl.h |
| Dec. 28, 2001 12:51 p | 13,886 | color_lib |
| Dec. 28, 2001 12:51 p | 13,886 | color_names |
| Dec. 28, 2001 12:51 p | 3,267 | colxlate.c |
| Dec. 28, 2001 12:51 p | 5,262 | const.h |
| Dec. 28, 2001 12:51 p | 20,822 | emit.c |
| Dec. 28, 2001 12:51 p | 13,200 | figgen.c |
| Dec. 28, 2001 12:51 p | 20,819 | gdgen.c |
| Dec. 28, 2001 12:51 p | 589 | globals.c |
| Dec. 28, 2001 12:51 p | 3,154 | globals.h |
| Dec. 28, 2001 12:51 p | 21,616 | hpglgen.c |
| Dec. 28, 2001 12:51 p | 12,961 | imapgen.c |
| Dec. 28, 2001 12:51 p | 9,182 | input.c |
| Dec. 28, 2001 12:51 p | 9,951 | ismapgen.c |
| Dec. 28, 2001 12:51 p | 624 | libdotneato.la |
| Dec. 28, 2001 12:51 p | 2,021 | macros.h |
| Dec. 28, 2001 12:51 p | 11,877 | Makefile |
| Dec. 28, 2001 12:51 p | 1,141 | Makefile.am |
| Dec. 28, 2001 12:51 p | 12,408 | MakefileIN |
| Dec. 28, 2001 12:51 p | 17,333 | mifgen.c |
| Dec. 28, 2001 12:51 p | 7,661 | mpgen.c |
| Dec. 28, 2001 12:51 p | 1,392 | nmakefile |
| Dec. 28, 2001 12:51 p | 7,363 | output.c |
| Dec. 28, 2001 12:51 p | 18,928 | picgen.c |
| Dec. 28, 2001 12:51 p | 7,091 | postproc.c |
| Dec. 28, 2001 12:51 p | 3,557 | ps.h |
| Dec. 28, 2001 12:51 p | 3,090 | ps.txt |
| Dec. 28, 2001 12:51 p | 12,760 | psgen.c |
| Dec. 28, 2001 12:51 p | 1,970 | README.imap |
| Dec. 28, 2001 12:51 p | 1,078 | render.h |
| Dec. 28, 2001 12:51 p | 5,732 | renderprocs.h |
| Dec. 28, 2001 12:51 p | 37,647 | shapes.c |
| Dec. 28, 2001 12:51 p | 372 | strcasecmp.c |
| Dec. 28, 2001 12:51 p | 469 | strncasecmp.c |
| Dec. 28, 2001 12:51 p | 17,791 | svggen.c |
| Dec. 28, 2001 12:51 p | 9,667 | types.h |
| Dec. 28, 2001 12:51 p | 11,891 | utils.c |
| Dec. 28, 2001 12:51 p | 531 | utils.h |
| Dec. 28, 2001 12:51 p | 18,531 | vrmlgen.c |
| Dec. 28, 2001 12:51 p | 14,808 | vtxgen.c |
| 40 File(s) | 392,806 bytes | |

Directory of F:\Send\ExtLibraries\graphviz-1.7.7\dotneato\dotgen

| | | |
|---|---|---|
| Dec. 28, 2001 12:51 p | 1,388 | acyclic.c |
| Dec. 28, 2001 12:51 p | 2,716 | class1.c |
| Dec. 28, 2001 12:51 p | 6,729 | class2.c |
| Dec. 28, 2001 12:51 p | 9,473 | cluster.c |
| Dec. 28, 2001 12:51 p | 13,932 | compound.c |
| Dec. 28, 2001 12:51 p | 5,795 | conc.c |
| Dec. 28, 2001 12:51 p | 2,316 | decomp.c |
| Dec. 28, 2001 12:51 p | 631 | dot.h |

-continued

| | | |
|---|---|---|
| Dec. 28, 2001 12:51 p | 9,914 | dotprocs.h |
| Dec. 28, 2001 12:51 p | 7,323 | fastgr.c |
| Dec. 28, 2001 12:51 p | 5,243 | flat.c |
| Dec. 28, 2001 12:51 p | 6,399 | init.c |
| Dec. 28, 2001 12:51 p | 609 | libdot.la |
| Dec. 28, 2001 12:51 p | 11,127 | Makefile |
| Dec. 28, 2001 12:51 p | 545 | Makefile.am |
| Dec. 28, 2001 12:51 p | 11,658 | Makefile.IN |
| Dec. 28, 2001 12:51 p | 32,107 | mincross.c |
| Dec. 28, 2001 12:51 p | 225 | nmakefile |
| Dec. 28, 2001 12:51 p | 16,647 | ns.c |
| Dec. 28, 2001 12:51 p | 20,272 | position.c |
| Dec. 28, 2001 12:51 p | 10,930 | rank.c |
| Dec. 28, 2001 12:51 p | 18,537 | routespl.c |
| Dec. 28, 2001 12:51 p | 7,002 | sameport.c |
| Dec. 28, 2001 12:51 p | 60,818 | splines.c |
| Dec. 28, 2001 12:51 p | 1,189 | timing.c |
| 25 File(s) | 263,525 bytes | |

Directory of F:\Send\ExtLibraries\graphviz-1.7.7\dotneato\neatogen

| | | |
|---|---|---|
| Dec. 28, 2001 12:51 p | 13,284 | adjust.c |
| Dec. 28, 2001 12:51 p | 592 | adjust.h |
| Dec. 28, 2001 12:51 p | 4,677 | edges.c |
| Dec. 28, 2001 12:51 p | 1,067 | edges.h |
| Dec. 28, 2001 12:51 p | 3,282 | find_ints.c |
| Dec. 28, 2001 12:51 p | 2,573 | geometry.c |
| Dec. 28, 2001 12:51 p | 1,245 | geometry.h |
| Dec. 28, 2001 12:51 p | 3,050 | heap.c |
| Dec. 28, 2001 12:51 p | 766 | heap.h |
| Dec. 28, 2001 12:51 p | 6,609 | hedges.c |
| Dec. 28, 2001 12:51 p | 1,347 | hedges.h |
| Dec. 28, 2001 12:51 p | 6,913 | info.c |
| Dec. 28, 2001 12:51 p | 1,394 | info.h |
| Dec. 28, 2001 12:51 p | 4,941 | init.c |
| Dec. 28, 2001 12:51 p | 3,999 | intersect.c |
| Dec. 28, 2001 12:51 p | 2,931 | legal.c |
| Dec. 28, 2001 12:51 p | 615 | libneato.la |
| Dec. 28, 2001 12:51 p | 11,372 | Makefile |
| Dec. 28, 2001 12:51 p | 771 | Makefile.am |
| Dec. 28, 2001 12:51 p | 11,903 | Makefile.IN |
| Dec. 28, 2001 12:51 p | 1,646 | mem.h |
| Dec. 28, 2001 12:51 p | 2,746 | memory.c |
| Dec. 28, 2001 12:51 p | 752 | neato.h |
| Dec. 28, 2001 12:51 p | 2,713 | neatoprocs.h |
| Dec. 28, 2001 12:51 p | 244 | nmakefile |
| Dec. 28, 2001 12:51 p | 9,622 | poly.c |
| Dec. 28, 2001 12:51 p | 890 | poly.h |
| Dec. 28, 2001 12:51 p | 1,158 | printvis.c |
| Dec. 28, 2001 12:51 p | 1,442 | simple.h |
| Dec. 28, 2001 12:51 p | 1,451 | site.c |
| Dec. 28, 2001 12:51 p | 1,130 | site.h |
| Dec. 28, 2001 12:51 p | 2,392 | solve.c |
| Dec. 28, 2001 12:51 p | 20,643 | splines.c |
| Dec. 28, 2001 12:51 p | 13,655 | stuff.c |
| Dec. 28, 2001 12:51 p | 3,719 | voronoi.c |
| Dec. 28, 2001 12:51 p | 619 | voronoi.h |
| 36 File(s) | 148,153 bytes | |

Directory of F:\Send\ExtLibraries\graphviz-1.7.7\dotty

| | | |
|---|---|---|
| Dec. 28, 2001 12:51 p | 1,052 | dotty.1 |
| Dec. 28, 2001 12:51 p | 2,150 | dotty.bsh |
| Dec. 28, 2001 12:51 p | 2,408 | dotty.ksh |
| Dec. 28, 2001 12:51 p | 24,415 | dotty.lefty |
| Dec. 28, 2001 12:51 p | 2,155 | dotty.sh |
| Dec. 28, 2001 12:51 p | 29,613 | dotty_draw.lefty |
| Dec. 28, 2001 12:51 p | 18,436 | dotty_edit.lefty |
| Dec. 28, 2001 12:51 p | 8,345 | dotty_layout.lefty |
| Dec. 28, 2001 12:51 p | 13,553 | dotty_ui.lefty |
| Dec. 28, 2001 12:51 p | 11,129 | Makefile |

-continued

| | | |
|---|---|---|
| Dec. 28, 2001 12:51 p | 478 | Makefile.am |
| Dec. 28, 2001 12:51 p | 11,608 | Makefile.IN |
| Dec. 28, 2001 12:51 p | 296 | nmakefile |
| Dec. 28, 2001 12:51 p | 46 | notes |
| 14 File(s) | 125,684 bytes | |

Directory of F:\Send\ExtLibraries\graphviz-1.7.7\dotty\mswin32

| | | |
|---|---|---|
| Dec. 28, 2001 12:51 p | 178 | doinst |
| Dec. 28, 2001 12:51 p | 2,403 | dotty.c |
| Dec. 28, 2001 12:51 p | 6,425 | dotty.mak |
| 3 File(s) | 9,006 bytes | |

Directory of F:\Send\ExtLibraries\graphviz-1.7.7\dotty\mswin32\CVS

| | | |
|---|---|---|
| Dec. 28, 2001 12:51 p | 139 | Entries |
| Dec. 28, 2001 12:51 p | 24 | Repository |
| Dec. 28, 2001 12:51 p | 40 | Root |
| 3 File(s) | 203 bytes | |

Directory of F:\Send\ExtLibraries\graphviz-1.7.7\fdp

| | | |
|---|---|---|
| Dec. 28, 2001 12:51 p | 5,603 | adjust.c |
| Dec. 28, 2001 12:51 p | 112 | adjust.h |
| Dec. 28, 2001 12:51 p | 824 | component.c |
| Dec. 28, 2001 12:51 p | 170 | component.h |
| Dec. 28, 2001 12:51 p | 1,860 | exprval.c |
| Dec. 28, 2001 12:51 p | 568 | exprval.h |
| Dec. 28, 2001 12:51 p | 3,748 | grid.c |
| Dec. 28, 2001 12:51 p | 625 | grid.h |
| Dec. 28, 2001 12:51 p | 12,445 | il.c |
| Dec. 28, 2001 12:51 p | 692 | macros.h |
| Dec. 28, 2001 12:51 p | 10,927 | Makefile |
| Dec. 28, 2001 12:51 p | 520 | Makefile.am |
| Dec. 28, 2001 12:51 p | 11,461 | Makefile.in |
| Dec. 28, 2001 12:51 p | 3,894 | options.c |
| Dec. 28, 2001 12:51 p | 381 | options.h |
| Dec. 28, 2001 12:51 p | 1,229 | structs.h |
| 16 File(s) | 55,059 bytes | |

Directory of F:\Send\ExtLibraries\graphviz-1.7.7\gd

| | | |
|---|---|---|
| Dec. 28, 2001 12:51 p | 4,211 | bdftogd |
| Dec. 28, 2001 12:51 p | 39,981 | gd.c |
| Dec. 28, 2001 12:51 p | 10,683 | gd.h |
| Dec. 28, 2001 12:51 p | 1,360 | gd2copypal.c |
| Dec. 28, 2001 12:51 p | 1,298 | gd2time.c |
| Dec. 28, 2001 12:51 p | 910 | gd2topng.c |
| Dec. 28, 2001 12:51 p | 5,116 | gdcache.c |
| Dec. 28, 2001 12:51 p | 2,756 | gdcache.h |
| Dec. 28, 2001 12:51 p | 3,051 | gddemo.c |
| Dec. 28, 2001 12:51 p | 81,853 | gdfontg.c |
| Dec. 28, 2001 12:51 p | 519 | gdfontg.h |
| Dec. 28, 2001 12:51 p | 78,780 | gdfontl.c |
| Dec. 28, 2001 12:51 p | 518 | gdfontl.h |
| Dec. 28, 2001 12:51 p | 58,280 | gdfontmb.c |
| Dec. 28, 2001 12:51 p | 479 | gdfontmb.h |
| Dec. 28, 2001 12:51 p | 51,606 | gdfonts.c |
| Dec. 28, 2001 12:51 p | 480 | gdfonts.h |
| Dec. 28, 2001 12:51 p | 29,618 | gdfontt.c |
| Dec. 28, 2001 12:51 p | 513 | gdfontt.h |
| Dec. 28, 2001 12:51 p | 21,671 | gdft.c |
| Dec. 28, 2001 12:51 p | 1,470 | gdhelpers.c |

-continued

| | | |
|---|---|---|
| Dec. 28, 2001 12:51 p | 519 | gdhelpers.h |
| Dec. 28, 2001 12:51 p | 12,399 | gdkanji.c |
| Dec. 28, 2001 12:51 p | 1,170 | gdparttopng.c |
| Dec. 28, 2001 12:51 p | 6,214 | gdtables.c |
| Dec. 28, 2001 12:51 p | 9,578 | gdtest.c |
| Dec. 28, 2001 12:51 p | 2,732 | gdtestttf.c |
| Dec. 28, 2001 12:51 p | 907 | gdtopng.c |
| Dec. 28, 2001 12:51 p | 26,750 | gdttf.c |
| Dec. 28, 2001 12:51 p | 3,544 | gdxpm.c |
| Dec. 28, 2001 12:51 p | 4,112 | gd_gd.c |
| Dec. 28, 2001 12:51 p | 21,085 | gd_gd2.c |
| Dec. 28, 2001 12:51 p | 36,160 | gd_gif.c |
| Dec. 28, 2001 12:51 p | 3,093 | gd_io.c |
| Dec. 28, 2001 12:51 p | 956 | gd_io.h |
| Dec. 28, 2001 12:51 p | 7,702 | gd_io_dp.c |
| Dec. 28, 2001 12:51 p | 2,557 | gd_io_file.c |
| Dec. 28, 2001 12:51 p | 2,898 | gd_io_ss.c |
| Dec. 28, 2001 12:51 p | 24,192 | gd_jpeg.c |
| Dec. 28, 2001 12:51 p | 22,928 | gd_png.c |
| Dec. 28, 2001 12:51 p | 897 | gc_ss.c |
| Dec. 28, 2001 12:51 p | 5,370 | gd_wbmp.c |
| Dec. 28, 2001 12:51 p | 893 | giftogd.c |
| Dec. 28, 2001 12:51 p | 137,760 | index.html |
| Dec. 28, 2001 12:51 p | 38 | install-item |
| Dec. 28, 2001 12:51 p | 72,555 | jisx0208.h |
| Dec. 28, 2001 12:51 p | 606 | libgd.la |
| Dec. 28, 2001 12:51 p | 11,867 | Makefile |
| Dec. 28, 2001 12:51 p | 1,261 | Makefile.am |
| Dec. 28, 2001 12:51 p | 12,417 | Makefile.IN |
| Dec. 28, 2001 12:51 p | 3,686 | Makefile.nt |
| Dec. 28, 2001 12:51 p | 5,850 | Makefile.orig |
| Dec. 28, 2001 12:51 p | 926 | mathmake.c |
| Dec. 28, 2001 12:51 p | 754 | nmakefile |
| Dec. 28, 2001 12:51 p | 907 | pngtogd.c |
| Dec. 28, 2001 12:51 p | 1,149 | pngtogd2.c |
| Dec. 28, 2001 12:51 p | 132,756 | readme.txt |
| Dec. 28, 2001 12:51 p | 6,928 | wbmp.c |
| Dec. 28, 2001 12:51 p | 1,271 | wbmp.h |
| Dec. 28, 2001 12:51 p | 5,149 | webpng.c |
| 60 File(s) | 987,689 bytes | |

Directory of F:\Send\ExtLibraries\graphviz-1.7.7\gd\test

| | | |
|---|---|---|
| Dec. 28, 2001 12:51 p | 28,877 | gdtest.gd2 |
| 1 File(s) | 28,877 bytes | |

Directory of F:\Send\ExtLibraries\graphviz-1.7.7\gdtclft

| | | |
|---|---|---|
| Dec. 28, 2001 12:51 p | 40,491 | gdtclft.c |
| Dec. 28, 2001 12:51 p | 12,039 | gdtclft.n |
| Dec. 28, 2001 12:51 p | 16,611 | Makefile |
| Dec. 28, 2001 12:51 p | 848 | Makefile.am |
| Dec. 28, 2001 12:51 p | 17,188 | Makefile.IN |
| Dec. 28, 2001 12:51 p | 127 | nmakefile |
| 6 File(s) | 87,304 bytes | |

Directory of F:\Send\ExtLibraries\graphviz-1.7.7\gdtclft\demo

| | | |
|---|---|---|
| Dec. 28, 2001 12:51 p | 1,684 | entities |
| Dec. 28, 2001 12:51 p | 44,391 | entities.html |
| Dec. 28, 2001 12:51 p | 291 | entities.README |
| Dec. 28, 2001 12:51 p | 9,291 | Makefile |
| Dec. 28, 2001 12:51 p | 234 | Makefile.am |
| Dec. 28, 2001 12:51 p | 9,767 | Makefile.in |
| 6 File(s) | 65,658 bytes | |

Directory of F:\Send\ExtLibraries\graphviz-1.7.7\geo

| | | |
|---|---|---|
| Dec. 28, 2001 12:51 p | 3,680 | geo.c |
| Dec. 28, 2001 12:51 p | 10,618 | Makefile |
| Dec. 28, 2001 12:51 p | 307 | Makefile.am |
| Dec. 28, 2001 12:51 p | 11,152 | Makefile.in |
| 4 File(s) | 25,757 bytes | |

Directory of F:\Send\ExtLibraries\graphviz-1.7.7\graph

| | | |
|---|---|---|
| Dec. 28, 2001 12:51 p | 6,770 | attribs.c |
| Dec. 28, 2001 12:51 p | 6,214 | edge.c |
| Dec. 28, 2001 12:51 p | 10,088 | graph.3 |
| Dec. 28, 2001 12:51 p | 8,842 | graph.c |
| Dec. 28, 2001 12:51 p | 4,769 | graph.h |
| Dec. 28, 2001 12:51 p | 10,389 | graphio.c |
| Dec. 28, 2001 12:51 p | 6,382 | lexer.c |
| Dec. 28, 2001 12:51 p | 4,080 | libgraph.h |
| Dec. 28, 2001 12:51 p | 615 | libgraph.la |
| Dec. 28, 2001 12:51 p | 12,989 | Makefile |
| Dec. 28, 2001 12:51 p | 799 | Makefile.am |
| Dec. 28, 2001 12:51 p | 13,523 | Makefile.IN |
| Dec. 28, 2001 12:51 p | 303 | nmakefile |
| Dec. 28, 2001 12:51 p | 2,984 | node.c |
| Dec. 28, 2001 12:51 p | 38,655 | parser.c |
| Dec. 28, 2001 12:51 p | 11,243 | parser.grammar |
| Dec. 28, 2001 12:51 p | 315 | parser.h |
| Dec. 28, 2001 12:51 p | 8,877 | parser.y |
| Dec. 28, 2001 12:51 p | 1,915 | refstr.c |
| Dec. 28, 2001 12:51 p | 2,570 | trie.c |
| Dec. 28, 2001 12:51 p | 2,836 | triefa.cP |
| Dec. 28, 2001 12:51 p | 1,210 | triefa.h |
| 22 File(s) | 156,368 bytes | |

Directory of F:\Send\ExtLibraries\graphviz-1.7.7\graphs

| | | |
|---|---|---|
| Dec. 28, 2001 12:51 p | 11,517 | Makefile |
| Dec. 28, 2001 12:51 p | 118 | Makefile.am |
| Dec. 28, 2001 12:51 p | 12,005 | Makefile.in |
| 3 File(s) | 23,640 bytes | |

Directory of F:\Send\ExtLibraries\graphviz-1.7.7\graphs\directed

| | | |
|---|---|---|
| Dec. 28, 2001 12:51 p | 851 | abstract.dot |
| Dec. 28, 2001 12:51 p | 990 | alf.dot |
| Dec. 28, 2001 12:51 p | 7,493 | awilliams.dot |
| Dec. 28, 2001 12:51 p | 278 | clust.dot |
| Dec. 28, 2001 12:51 p | 154 | clust1.dot |
| Dec. 28, 2001 12:51 p | 154 | clust2.dot |
| Dec. 28, 2001 12:51 p | 154 | clust3.dot |
| Dec. 28, 2001 12:51 p | 428 | clust4.dot |
| Dec. 28, 2001 12:51 p | 263 | clust5.dot |
| Dec. 28, 2001 12:51 p | 5,676 | crazy.dot |
| Dec. 28, 2001 12:51 p | 444 | ctext.dot |
| Dec. 28, 2001 12:51 p | 993 | dfa.dot |
| Dec. 28, 2001 12:51 p | 909 | fig6.dot |
| Dec. 28, 2001 12:51 p | 625 | fsm.dot |
| Dec. 28, 2001 12:51 p | 1,373 | grammar.dot |
| Dec. 28, 2001 12:51 p | 652 | hashtable.dot |
| Dec. 28, 2001 12:51 p | 822 | jcctree.dot |
| Dec. 28, 2001 12:51 p | 6,339 | jsort.dot |
| Dec. 28, 2001 12:51 p | 436 | KW91.dot |
| Dec. 28, 2001 12:51 p | 5,571 | ldbxtried.dot |
| Dec. 28, 2001 12:51 p | 9,162 | Makefile |
| Dec. 28, 2001 12:51 p | 926 | Makefile.am |
| Dec. 28, 2001 12:51 p | 9,638 | Makefile.in |
| Dec. 28, 2001 12:51 p | 423 | mike.dot |
| Dec. 28, 2001 12:51 p | 2,798 | NaN.dot |
| Dec. 28, 2001 12:51 p | 392 | newarrows.dot |
| Dec. 28, 2001 12:51 p | 352 | nhg.dot |
| Dec. 28, 2001 12:51 p | 2,705 | pgram.dot |
| Dec. 28, 2001 12:51 p | 2,146 | pm2way.dot |
| Dec. 28, 2001 12:51 p | 3,718 | pmpipe.dot |
| Dec. 28, 2001 12:51 p | 5,317 | polypoly.dot |
| Dec. 28, 2001 12:51 p | 6,564 | proc3d.dot |
| Dec. 28, 2001 12:51 p | 432 | records.dot |
| Dec. 28, 2001 12:51 p | 837 | rowe.dot |
| Dec. 28, 2001 12:51 p | 1,157 | shells.dot |
| Dec. 28, 2001 12:51 p | 514 | states.dot |
| Dec. 28, 2001 12:51 p | 315 | structs.dot |
| Dec. 28, 2001 12:51 p | 807 | train11.dot |
| Dec. 28, 2001 12:51 p | 1,563 | trapeziumlr.dot |
| Dec. 28, 2001 12:51 p | 608 | tree.dot |
| Dec. 28, 2001 12:51 p | 1,724 | triedds.dot |
| Dec. 28, 2001 12:51 p | 178 | try.dot |
| Dec. 28, 2001 12:51 p | 1,486 | unix.dot |
| Dec. 28, 2001 12:51 p | 1,782 | unix2.dot |
| Dec. 28, 2001 12:51 p | 1,831 | viewfile.dot |
| Dec. 28, 2001 12:51 p | 1,047 | world.dot |
| 46 File(s) | 93,027 bytes | |

Directory of F:\Send\ExtLibraries\graphviz-1.7.7\graphs\undirected

| | | |
|---|---|---|
| Dec. 28, 2001 12:51 p | 672 | ER.dot |
| Dec. 28, 2001 12:51 p | 8,766 | Makefile |
| Dec. 28, 2001 12:51 p | 476 | Makefile.am |
| Dec. 28, 2001 12:51 p | 9,242 | Makefile.in |
| Dec. 28, 2001 12:51 p | 1,857 | ngk10_4.dot |
| Dec. 28, 2001 12:51 p | 249 | process.dot |
| 6 File(s) | 21,262 bytes | |

Directory of F:\Send\ExtLibraries\graphviz-1.7.7\grid

| | | |
|---|---|---|
| Dec. 28, 2001 12:51 p | 4,331 | cutbox.c |
| Dec. 28, 2001 12:51 p | 10,569 | erbase.c |
| Dec. 28, 2001 12:51 p | 7,891 | grid.c |
| Dec. 28, 2001 12:51 p | 5,310 | grid.h |
| Dec. 28, 2001 12:51 p | 10,767 | Makefile |
| Dec. 28, 2001 12:51 p | 342 | Makefile.am |
| Dec. 28, 2001 12:51 p | 11,301 | Makefile.in |
| Dec. 28, 2001 12:51 p | 1,103 | print.c |
| Dec. 28, 2001 12:51 p | 12,368 | route.c |
| 9 File(s) | 63,982 bytes | |

Directory of F:\Send\ExtLibraries\graphviz-1.7.7\incr

| | | |
|---|---|---|
| Dec. 28, 2001 12:51 p | 1,360 | basic.c |
| Dec. 28, 2001 12:51 p | 4,627 | batch.c |
| Dec. 28, 2001 12:51 p | 2,735 | callback.c |
| Dec. 28, 2001 12:51 p | 458 | dispatch.c |
| Dec. 28, 2001 12:51 p | 5,060 | edgeclip.c |
| Dec. 28, 2001 12:51 p | 2,258 | engine.c |
| Dec. 28, 2001 12:51 p | 3,706 | engine.h |
| Dec. 28, 2001 12:51 p | 7,034 | incr.h |
| Dec. 28, 2001 12:51 p | 10,867 | Makefile |
| Dec. 28, 2001 12:51 p | 403 | Makefile.am |
| Dec. 28, 2001 12:51 p | 11,401 | Makefile.in |
| Dec. 28, 2001 12:51 p | 6,135 | model.c |
| Dec. 28, 2001 12:51 p | 4,749 | routem.c |
| 13 File(s) | 60,793 bytes | |

Directory of F:\Send\ExtLibraries\graphviz-1.7.7\lefty

| | | |
|---|---|---|
| Dec. 28, 2001 12:51 p | 2,459 | code.c |
| Dec. 28, 2001 12:51 p | 1,833 | code.h |
| Dec. 28, 2001 12:51 p | 17,155 | colors.txt |
| Dec. 28, 2001 12:51 p | 11,857 | common.c |
| Dec. 28, 2001 12:51 p | 1,943 | common.h |
| Dec. 28, 2001 12:51 p | 4,605 | display.c |
| Dec. 28, 2001 12:51 p | 689 | display.h |
| Dec. 28, 2001 12:51 p | 28,973 | exec.c |
| Dec. 28, 2001 12:51 p | 872 | exec.h |
| Dec. 28, 2001 12:51 p | 25,207 | g.c |
| Dec. 28, 2001 12:51 p | 11,686 | g.h |
| Dec. 28, 2001 12:51 p | 50,387 | gfxview.c |
| Dec. 28, 2001 12:51 p | 1,738 | gfxview.h |
| Dec. 28, 2001 12:51 p | 21,692 | internal.c |
| Dec. 28, 2001 12:51 p | 848 | internal.h |
| Dec. 28, 2001 12:51 p | 1,724 | io.h |
| Dec. 28, 2001 12:51 p | 3,496 | lefty.1 |
| Dec. 28, 2001 12:51 p | 11,418 | lefty.c |
| Dec. 28, 2001 12:51 p | 2,441 | lefty.psp |
| Dec. 28, 2001 12:51 p | 7,137 | lex.c |
| Dec. 28, 2001 12:51 p | 1,250 | lex.h |
| Dec. 28, 2001 12:51 p | 17,819 | Makefile |
| Dec. 28, 2001 12:51 p | 1,155 | Makefile.am |
| Dec. 28, 2001 12:51 p | 18,461 | Makefile.IN |
| Dec. 28, 2001 12:51 p | 10,962 | mem.c |
| Dec. 28, 2001 12:51 p | 1,660 | mem.h |
| Dec. 28, 2001 12:51 p | 1,096 | nmakefile |
| Dec. 28, 2001 12:51 p | 15,170 | parse.c |
| Dec. 28, 2001 12:51 p | 850 | parse.h |
| Dec. 28, 2001 12:51 p | 13,267 | str.c |
| Dec. 28, 2001 12:51 p | 822 | str.h |
| Dec. 28, 2001 12:51 p | 18,654 | tbl.c |
| Dec. 28, 2001 12:51 p | 3,774 | tbl.h |
| Dec. 28, 2001 12:51 p | 19,834 | txtview.c |
| Dec. 28, 2001 12:51 p | 834 | txtview.h |
| 35 File(s) | 333,768 bytes | |

Directory of F:\Send\ExtLibraries\graphviz-1.7.7\lefty\aix_mods

| | | |
|---|---|---|
| Dec. 28, 2001 12:51 p | 1,414 | common.h |
| Dec. 28, 2001 12:51 p | 28,496 | exec.c |
| Dec. 28, 2001 12:51 p | 18,172 | tbl.c |
| 3 File(s) | 48,082 bytes | |

Directory of F:\Send\ExtLibraries\graphviz-1.7.7\lefty\aix_mods\CVS

| | | |
|---|---|---|
| Dec. 28, 2001 12:51 p | 136 | Entries |
| Dec. 28, 2001 12:51 p | 25 | Repository |
| Dec. 28, 2001 12:51 p | 40 | Root |
| 3 File(s) | 201 bytes | |

Directory of F:\Send\ExtLibraries\graphviz-1.7.7\lefty\cs21

| | | |
|---|---|---|
| Dec. 28, 2001 12:51 p | 1,113 | cs21.c |
| Dec. 28, 2001 12:51 p | 124 | cs21.h |
| Dec. 28, 2001 12:51 p | 8,543 | Makefile |
| Dec. 28, 2001 12:51 p | 246 | Makefile.am |
| Dec. 28, 2001 12:51 p | 9,018 | Makefile.in |
| 5 File(s) | 19,044 bytes | |

Directory of F:\Send\ExtLibraries\graphviz-1.7.7\lefty\dot21

| | | |
|---|---|---|
| Dec. 28, 2001 12:51 p | 23,362 | dot21.c |
| Dec. 28, 2001 12:51 p | 1,100 | dot21.h |
| Dec. 28, 2001 12:51 p | 6,891 | dotlex.c |
| Dec. 28, 2001 12:51 p | 33,001 | dotparse.c |
| Dec. 28, 2001 12:51 p | 268 | dotparse.h |
| Dec. 28, 2001 12:51 p | 3,505 | dotparse.y |
| Dec. 28, 2001 12:51 p | 2,429 | dottrie.c |
| Dec. 28, 2001 12:51 p | 11,337 | Makefile |
| Dec. 28, 2001 12:51 p | 533 | Makefile.am |
| Dec. 28, 2001 12:51 p | 11,868 | Makefile.in |
| Dec. 28, 2001 12:51 p | 2,243 | triefa.cP |
| Dec. 28, 2001 12:51 p | 798 | triefa.h |
| 12 File(s) | 97,335 bytes | |

Directory of F:\Send\ExtLibraries\graphviz-1.7.7\lefty\examples

| | | |
|---|---|---|
| Dec. 28, 2001 12:51 p | 3,770 | box.lefty |
| Dec. 28, 2001 12:51 p | 474 | def.lefty |
| Dec. 28, 2001 12:51 p | 2,833 | fractal.lefty |
| Dec. 28, 2001 12:51 p | 5,985 | fractal2.lefty |
| Dec. 28, 2001 12:51 p | 8,616 | Makefile |
| Dec. 28, 2001 12:51 p | 286 | Makefile.am |
| Dec. 28, 2001 12:51 p | 9,092 | Makefile.in |
| Dec. 28, 2001 12:51 p | 3,307 | slides.lefty |
| Dec. 28, 2001 12:51 p | 5,079 | tree.lefty |
| 9 File(s) | 39,442 bytes | |

Directory of F:\Send\ExtLibraries\graphviz-1.7.7\lefty\os

| | | |
|---|---|---|
| Dec. 28, 2001 12:51 p | 11,489 | Makefile |
| Dec. 28, 2001 12:51 p | 77 | Makefile.am |
| Dec. 28, 2001 12:51 p | 11,974 | Makefile.in |
| 3 File(s) | 23,540 bytes | |

Directory of F:\Send\ExtLibraries\graphviz-1.7.7\lefty\os\unix

| | | |
|---|---|---|
| Dec. 28, 2001 12:51 p | 10,245 | io.c |
| Dec. 28, 2001 12:51 p | 10,547 | Makefile |
| Dec. 28, 2001 12:51 p | 176 | Makefile.am |
| Dec. 28, 2001 12:51 p | 11,075 | Makefile.in |
| 4 File(s) | 32,043 bytes | |

Directory of F:\Send\ExtLibraries\graphviz-1.7.7\lefty\ws

| | | |
|---|---|---|
| Dec. 28, 2001 12:51 p | 11,552 | Makefile |
| Dec. 28, 2001 12:51 p | 102 | Makefile.am |
| Dec. 28, 2001 12:51 p | 12,037 | Makefile.in |
| 3 File(s) | 23,691 bytes | |

Directory of F:\Send\ExtLibraries\graphviz-1.7.7\lefty\ws\mswin32

| | | |
|---|---|---|
| Dec. 28, 2001 12:51 p | 9,586 | garray.c |
| Dec. 28, 2001 12:51 p | 4,306 | gbutton.c |
| Dec. 28, 2001 12:51 p | 43,610 | gcanvas.c |
| Dec. 28, 2001 12:51 p | 22,815 | gcommon.c |

-continued

| | |
|---|---|
| Dec. 28, 2001 12:51 p | 5,719 gcommon.h |
| Dec. 28, 2001 12:51 p | 4,526 glabel.c |
| Dec. 28, 2001 12:51 p | 2,535 gmenu.c |
| Dec. 28, 2001 12:51 p | 38,128 gpcanvas.c |
| Dec. 28, 2001 12:51 p | 6,684 gquery.c |
| Dec. 28, 2001 12:51 p | 6,186 gscroll.c |
| Dec. 28, 2001 12:51 p | 6,537 gtext.c |
| Dec. 28, 2001 12:51 p | 4,777 gview.c |
| Dec. 28, 2001 12:51 p | 2,424 lefty.rc |
| Dec. 28, 2001 12:51 p | 636 resource.h |
| 14 File(s) | 158,469 bytes |

Directory of F:\Send\ExtLibraries\graphviz-1.7.7\lefty\ws\mswin32\CVS

| | |
|---|---|
| Dec. 28, 2001 12:51 p | 653 Entries |
| Dec. 28, 2001 12:51 p | 27 Repository |
| Dec. 28, 2001 12:51 p | 40 Root |
| 3 File(s) | 720 bytes |

Directory of F:\Send\ExtLibraries\graphviz-1.7.7\lefty\ws\x11

| | |
|---|---|
| Dec. 28, 2001 12:51 p | 16,447 garray.c |
| Dec. 28, 2001 12:51 p | 5,480 gbutton.c |
| Dec. 28, 2001 12:51 p | 52,762 gcanvas.c |
| Dec. 28, 2001 12:51 p | 5,981 gcommon.c |
| Dec. 28, 2001 12:51 p | 6,780 gcommon.h |
| Dec. 28, 2001 12:51 p | 6,112 glabel.c |
| Dec. 28, 2001 12:51 p | 3,408 gmenu.c |
| Dec. 28, 2001 12:51 p | 23,301 gpcanvas.c |
| Dec. 28, 2001 12:51 p | 9,563 gquery.c |
| Dec. 28, 2001 12:51 p | 7,609 gscroll.c |
| Dec. 28, 2001 12:51 p | 8,516 gtext.c |
| Dec. 28, 2001 12:51 p | 6,292 gview.c |
| Dec. 28, 2001 12:51 p | 14,024 Makefile |
| Dec. 28, 2001 12:51 p | 365 Makefile.am |
| Dec. 28, 2001 12:51 p | 14,586 Makefile.in |
| 15 File(s) | 181,226 bytes |

Directory of F:\Send\ExtLibraries\graphviz-1.7.7\lefty\ws\x11\libfilereq

| | |
|---|---|
| Dec. 28, 2001 12:51 p | 4,440 Dir.c |
| Dec. 28, 2001 12:51 p | 17,904 Draw.c |
| Dec. 28, 2001 12:51 p | 10,824 Makefile |
| Dec. 28, 2001 12:51 p | 306 Makefile.am |
| Dec. 28, 2001 12:51 p | 11,359 Makefile.in |
| Dec. 28, 2001 12:51 p | 17,999 Path.c |
| Dec. 28, 2001 12:51 p | 2,829 README.selfile |
| Dec. 28, 2001 12:51 p | 22,428 SelFile.c |
| Dec. 28, 2001 12:51 p | 3,650 SFinternal.h |
| Dec. 28, 2001 12:51 p | 529 xstat.h |
| 10 File(s) | 92,268 bytes |

Directory of F:\Send\ExtLibraries\graphviz-1.7.7\lneato

| | |
|---|---|
| Dec. 28, 2001 12:51 p | 1,573 lneato.bsh |
| Dec. 28, 2001 12:51 p | 1,644 lneato.ksh |
| Dec. 28, 2001 12:51 p | 1,575 lneato.sh |
| Dec. 28, 2001 12:51 p | 7,759 Makefile |
| Dec. 28, 2001 12:51 p | 330 Makefile.am |

-continued

| | |
|---|---|
| Dec. 28, 2001 12:51 p | 8,237 Makefile.IN |
| Dec. 28, 2001 12:51 p | 67 nmakefile |
| 7 File(s) | 21,185 bytes |

Directory of F:\Send\ExtLibraries\graphviz-1.7.7\lneato\mswin32

| | |
|---|---|
| Dec. 28, 2001 12:51 p | 152 doinst |
| Dec. 28, 2001 12:51 p | 2,431 lneato.c |
| Dec. 28, 2001 12:51 p | 6,462 lneato.mak |
| 3 File(s) | 9,045 bytes |

Directory of F:\Send\ExtLibraries\graphviz-1.7.7\lneato\mswin32\CVS

| | |
|---|---|
| Dec. 28, 2001 12:51 p | 141 Entries |
| Dec. 28, 2001 12:51 p | 25 Repository |
| Dec. 28, 2001 12:51 p | 40 Root |
| 3 File(s) | 206 bytes |

Directory of F:\Send\ExtLibraries\graphviz-1.7.7\makearch

| | |
|---|---|
| Dec. 28, 2001 12:51 p | 462 aix41 |
| Dec. 28, 2001 12:51 p | 644 hp.pa |
| Dec. 28, 2001 12:51 p | 444 linux.i386 |
| Dec. 28, 2001 12:51 p | 394 netbsd.i386 |
| Dec. 28, 2001 12:51 p | 391 osf.alpha |
| Dec. 28, 2001 12:51 p | 411 sgi.mips2 |
| Dec. 28, 2001 12:51 p | 442 sgi.mips3 |
| Dec. 28, 2001 12:51 p | 573 sol.i386 |
| Dec. 28, 2001 12:51 p | 558 sol.sun4 |
| Dec. 28, 2001 12:51 p | 560 sol6.sun4 |
| Dec. 28, 2001 12:51 p | 353 sun4 |
| 11 File(s) | 5,232 bytes |

Directory of F:\Send\ExtLibraries\graphviz-1.7.7\makearch\CVS

| | |
|---|---|
| Dec. 28, 2001 12:51 p | 464 Entries |
| Dec. 28, 2001 12:51 p | 19 Repository |
| Dec. 28, 2001 12:51 p | 40 Root |
| 3 File(s) | 523 bytes |

Directory of F:\Send\ExtLibraries\graphviz-1.7.7\ns

| | |
|---|---|
| Dec. 28, 2001 12:51 p | 10,644 Makefile |
| Dec. 28, 2001 12:51 p | 282 Makefile.am |
| Dec. 28, 2001 12:51 p | 11,178 Makefile.in |
| Dec. 28, 2001 12:51 p | 20,299 ns.c |
| Dec. 28, 2001 12:51 p | 399 ns.h |
| Dec. 28, 2001 12:51 p | 604 nspvt.h |
| 6 File(s) | 43,406 bytes |

Directory of F:\Send\ExtLibraries\graphviz-1.7.7\pathplan

| | |
|---|---|
| Dec. 28, 2001 12:51 p | 7,178 cvt.c |
| Dec. 28, 2001 12:51 p | 2,472 inpoly.c |
| Dec. 28, 2001 12:51 p | 624 libpathplan.la |

-continued

| | | |
|---|---|---|
| Dec. 28, 2001 12:51 p | 12,411 | Makefile |
| Dec. 28, 2001 12:51 p | 488 | Makefile.am |
| Dec. 28, 2001 12:51 p | 12,945 | Makefile.IN |
| Dec. 28, 2001 12:51 p | 405 | nmakefile |
| Dec. 28, 2001 12:51 p | 6,798 | path.lefty |
| Dec. 28, 2001 12:51 p | 949 | pathgeom.h |
| Dec. 28, 2001 12:51 p | 2,845 | pathplan.3 |
| Dec. 28, 2001 12:51 p | 1,253 | pathplan.h |
| Dec. 28, 2001 12:51 p | 970 | pathutil.h |
| Dec. 28, 2001 12:51 p | 1,237 | README |
| Dec. 28, 2001 12:51 p | 18,574 | route.c |
| Dec. 28, 2001 12:51 p | 17,447 | shortest.c |
| Dec. 28, 2001 12:51 p | 3,120 | shortestpth.c |
| Dec. 28, 2001 12:51 p | 2,782 | solvers.c |
| Dec. 28, 2001 12:51 p | 693 | solvers.h |
| Dec. 28, 2001 12:51 p | 598 | tri.h |
| Dec. 28, 2001 12:51 p | 4,837 | triang.c |
| Dec. 28, 2001 12:51 p | 1,375 | util.c |
| Dec. 28, 2001 12:51 p | 1,414 | vis.h |
| Dec. 28, 2001 12:51 p | 11,846 | visibility.c |
| Dec. 28, 2001 12:51 p | 1,329 | vispath.h |
| 24 File(s) | 114,590 bytes | |

Directory of F:\Send\ExtLibraries\graphviz-1.7.7\shape

| | | |
|---|---|---|
| Dec. 28, 2001 12:51 p | 3,558 | inpoly.c |
| Dec. 28, 2001 12:51 p | 10,702 | Makefile |
| Dec. 28, 2001 12:51 p | 288 | Makefile.am |
| Dec. 28, 2001 12:51 p | 11,236 | Makefile.in |
| Dec. 28, 2001 12:51 p | 2,158 | shape.c |
| Dec. 28, 2001 12:51 p | 1,448 | shape.h |
| 6 File(s) | 29,390 bytes | |

Directory of F:\Send\ExtLibraries\graphviz-1.7.7\tcldgl

| | | |
|---|---|---|
| Dec. 28, 2001 12:51 p | 5,958 | dgl.c |
| Dec. 28, 2001 12:51 p | 3,531 | dgl.h |
| Dec. 28, 2001 12:51 p | 11,692 | dglayout.c |
| Dec. 28, 2001 12:51 p | 16,976 | dglshape.c |
| Dec. 28, 2001 12:51 p | 10,908 | dglutil.c |
| Dec. 28, 2001 12:51 p | 17,134 | Makefile |
| Dec. 28, 2001 12:51 p | 1,141 | Makefile.am |
| Dec. 28, 2001 12:51 p | 17,709 | Makefile.in |
| Dec. 28, 2001 12:51 p | 13,501 | tcldgl.n |
| 9 File(s) | 98,550 bytes | |

Directory of F:\Send\ExtLibraries\graphviz-1.7.7\tcldgl\demo

| | | |
|---|---|---|
| Dec. 28, 2001 12:51 p | 24,728 | dge |
| Dec. 28, 2001 12:51 p | 1,486 | dge.example1.dot |
| Dec. 28, 2001 12:51 p | 6,682 | dge.example2.dot |
| Dec. 28, 2001 12:51 p | 489 | dge.README |
| Dec. 28, 2001 12:51 p | 9,300 | Makefile |
| Dec. 28, 2001 12:51 p | 245 | Makefile.am |
| Dec. 28, 2001 12:51 p | 9,776 | Makefile.in |
| 7 File(s) | 52,706 bytes | |

Directory of F:\Send\ExtLibraries\graphviz-1.7.7\tcldgr

| | | |
|---|---|---|
| Dec. 28, 2001 12:51 p | 6,059 | dgedge.c |
| Dec. 28, 2001 12:51 p | 11,642 | dgnode.c |
| Dec. 28, 2001 12:51 p | 7,695 | dgr.c |
| Dec. 28, 2001 12:51 p | 2,735 | dgr.h |
| Dec. 28, 2001 12:51 p | 24,450 | dgraph.c |

-continued

| | | |
|---|---|---|
| Dec. 28, 2001 12:51 p | 18,377 | dgrutil.c |
| Dec. 28, 2001 12:51 p | 16,727 | Makefile |
| Dec. 28, 2001 12:51 p | 876 | Makefile.am |
| Dec. 28, 2001 12:51 p | 17,302 | Makefile.in |
| Dec. 28, 2001 12:51 p | 27,019 | tcldgr.n |
| 10 File(s) | 132,882 bytes | |

Directory of F:\Send\ExtLibraries\graphviz-1.7.7\tcldgr\demo

| | | |
|---|---|---|
| Dec. 28, 2001 12:51 p | 6,465 | ihi |
| Dec. 28, 2001 12:51 p | 991 | ihi.README |
| Dec. 28, 2001 12:51 p | 43 | ihi.testdata |
| Dec. 28, 2001 12:51 p | 9,278 | Makefile |
| Dec. 28, 2001 12:51 p | 225 | Makefile.am |
| Dec. 28, 2001 12:51 p | 9,754 | Makefile.in |
| 6 File(s) | 26,756 bytes | |

Directory of F:\Send\ExtLibraries\graphviz-1.7.7\tcldot

| | | |
|---|---|---|
| Dec. 28, 2001 12:51 p | 17,226 | Makefile |
| Dec. 28, 2001 12:51 p | 1,292 | Makefile.am |
| Dec. 28, 2001 12:51 p | 17,813 | Makefile.IN |
| Dec. 28, 2001 12:51 p | 523 | nmakefile |
| Dec. 28, 2001 12:51 p | 2,295 | README |
| Dec. 28, 2001 12:51 p | 418 | README.Tkspline |
| Dec. 28, 2001 12:51 p | 43,963 | tcldot.c |
| Dec. 28, 2001 12:51 p | 137 | tcldot.h |
| Dec. 28, 2001 12:51 p | 15,368 | tcldot.n |
| Dec. 28, 2001 12:51 p | 13,901 | tkgen.c |
| 10 File(s) | 112,936 bytes | |

Directory of F:\Send\ExtLibraries\graphviz-1.7.7\tcldot\demo

| | | |
|---|---|---|
| Dec. 28, 2001 12:51 p | 21,006 | doted |
| Dec. 28, 2001 12:51 p | 394 | doted.README |
| Dec. 28, 2001 12:51 p | 9,269 | Makefile |
| Dec. 28, 2001 12:51 p | 214 | Makefile.am |
| Dec. 28, 2001 12:51 p | 9,745 | Makefile.in |
| 5 File(s) | 40,628 bytes | |

Directory of F:\Send\ExtLibraries\graphviz-1.7.7\tclhandle

| | | |
|---|---|---|
| Dec. 28, 2001 12:51 p | 10,721 | Makefile |
| Dec. 28, 2001 12:51 p | 255 | Makefile.am |
| Dec. 28, 2001 12:51 p | 11,255 | Makefile.IN |
| Dec. 28, 2001 12:51 p | 62 | nmakefile |
| Dec. 28, 2001 12:51 p | 13,385 | tclhandle.c |
| Dec. 28, 2001 12:51 p | 3,230 | tclhandle.h |
| 6 File(s) | 38,908 bytes | |

Directory of F:\Send\ExtLibraries\graphviz-1.7.7\tclpathplan

| | | |
|---|---|---|
| Dec. 28, 2001 12:51 p | 2,626 | find_ints.c |
| Dec. 28, 2001 12:51 p | 3,470 | intersect.c |
| Dec. 28, 2001 12:51 p | 875 | makecw.c |
| Dec. 28, 2001 12:51 p | 15,263 | Makefile |
| Dec. 28, 2001 12:51 p | 745 | Makefile.am |
| Dec. 28, 2001 12:51 p | 15,838 | Makefile.in |

-continued

| | | |
|---|---|---|
| Dec. 28, 2001 12:51 p | 1,001 | simple.h |
| Dec. 28, 2001 12:51 p | 24,300 | tclpathplan.c |
| Dec. 28, 2001 12:51 p | 3,531 | wrapper.c |
| 9 File(s) | 67,649 bytes | |

Directory of F:\Send\ExtLibraries\graphviz-1.7.7\tclpathplan\demo

| | | |
|---|---|---|
| Dec. 28, 2001 12:51 p | 13,370 | Makefile |
| Dec. 28, 2001 12:51 p | 250 | Makefile.am |
| Dec. 28, 2001 12:51 p | 13,856 | Makefile.in |
| Dec. 28, 2001 12:51 p | 17,625 | pathplan |
| Dec. 28, 2001 12:51 p | 420 | pathplan.README |
| 5 File(s) | 45,521 bytes | |

Directory of F:\Send\ExtLibraries\graphviz-1.7.7\tclpathplan\demo\pathplan_data

| | | |
|---|---|---|
| Dec. 28, 2001 12:51 p | 291 | boxes.dat |
| Dec. 28, 2001 12:51 p | 640 | dpd.dat |
| Dec. 28, 2001 12:51 p | 185 | funny.dat |
| Dec. 28, 2001 12:51 p | 8,704 | Makefile |
| Dec. 28, 2001 12:51 p | 345 | Makefile.am |
| Dec. 28, 2001 12:51 p | 9,177 | Makefile.in |
| Dec. 28, 2001 12:51 p | 1,391 | maze.dat |
| Dec. 28, 2001 12:51 p | 238 | nested.dat |
| Dec. 28, 2001 12:51 p | 238 | northo.dat |
| Dec. 28, 2001 12:51 p | 510 | obs.dat |
| Dec. 28, 2001 12:51 p | 36 | other.dat |
| Dec. 28, 2001 12:51 p | 23 | paths.dat |
| Dec. 28, 2001 12:51 p | 696 | rotor.dat |
| Dec. 28, 2001 12:51 p | 640 | u.dat |
| Dec. 28, 2001 12:51 p | 30 | unknown.dat |
| 15 File(s) | 23,144 bytes | |

Directory of F:\Send\ExtLibraries\graphviz-1.7.7\tclstubs

| | | |
|---|---|---|
| Dec. 28, 2001 12:51 p | 10,777 | Makefile |
| Dec. 28, 2001 12:51 p | 397 | Makefile.am |
| Dec. 28, 2001 12:51 p | 11,349 | Makefile.IN |
| Dec. 28, 2001 12:51 p | 62 | nmakefile |
| Dec. 28, 2001 12:51 p | 296 | README |
| Dec. 28, 2001 12:51 p | 60 | tclStubLib.c |
| 6 File(s) | 22,941 bytes | |

Directory of F:\Send\ExtLibraries\graphviz-1.7.7\tkspline

| | | |
|---|---|---|
| Dec. 28, 2001 12:51 p | 16,466 | Makefile |
| Dec. 28, 2001 12:51 p | 732 | Makefile.am |
| Dec. 28, 2001 12:51 p | 17,074 | Makefile.in |
| Dec. 28, 2001 12:51 p | 508 | README |
| Dec. 28, 2001 12:51 p | 7,596 | tkspline.c |
| Dec. 28, 2001 12:51 p | 7,369 | tkspline.n |
| 6 File(s) | 49,745 bytes | |

Directory of F:\Send\ExtLibraries\graphviz-1.7.7\tkspline\demo

| | | |
|---|---|---|
| Dec. 28, 2001 12:51 p | 9,275 | Makefile |
| Dec. 28, 2001 12:51 p | 216 | Makefile.am |
| Dec. 28, 2001 12:51 p | 9,751 | Makefile.in |
| Dec. 28, 2001 12:51 p | 4,549 | spline |
| Dec. 28, 2001 12:51 p | 267 | spline.README |
| 5 File(s) | 24,058 bytes | |

Directory of F:\Send\ExtLibraries\graphviz-1.7.7\tkstubs

| | | |
|---|---|---|
| Dec. 28, 2001 12:51 p | 10,845 | Makefile |
| Dec. 28, 2001 12:51 p | 403 | Makefile.am |
| Dec. 28, 2001 12:51 p | 11,415 | Makefile.in |
| Dec. 28, 2001 12:51 p | 295 | README |
| Dec. 28, 2001 12:51 p | 60 | tkStubImg.c |
| Dec. 28, 2001 12:51 p | 60 | tkStubLib.c |
| 6 File(s) | 23,078 bytes | |

Directory of F:\Send\ExtLibraries\graphviz-1.7.7\tools

| | | |
|---|---|---|
| Dec. 28, 2001 12:51 p | 72,985 | iffe |
| Dec. 28, 2001 12:51 p | 11,532 | Makefile |
| Dec. 28, 2001 12:51 p | 135 | Makefile.am |
| Dec. 28, 2001 12:51 p | 12,020 | Makefile.IN |
| 4 File(s) | 96,672 bytes | |

Directory of F:\Send\ExtLibraries\graphviz-1.7.7\tools\ast

| | | |
|---|---|---|
| Dec. 28, 2001 12:51 p | 3,033 | align.h |
| Dec. 28, 2001 12:51 p | 1,998 | ast.h |
| Dec. 28, 2001 12:51 p | 1,714 | chresc.c |
| Dec. 28, 2001 12:51 p | 539 | chrtoi.c |
| Dec. 28, 2001 12:51 p | 1,621 | error.c |
| Dec. 28, 2001 12:51 p | 1,037 | error.h |
| Dec. 28, 2001 12:51 p | 432 | fmtbuf.c |
| Dec. 28, 2001 12:51 p | 2,393 | fmtesc.c |
| Dec. 28, 2001 12:51 p | 1,207 | hashkey.h |
| Dec. 28, 2001 12:51 p | 11,418 | Makefile |
| Dec. 28, 2001 12:51 p | 550 | Makefile.am |
| Dec. 28, 2001 12:51 p | 11,949 | Makefile.IN |
| Dec. 28, 2001 12:51 p | 1,265 | pathaccess.c |
| Dec. 28, 2001 12:51 p | 332 | pathbin.c |
| Dec. 28, 2001 12:51 p | 3,780 | pathcanon.c |
| Dec. 28, 2001 12:51 p | 515 | pathcat.c |
| Dec. 28, 2001 12:51 p | 2,278 | pathfind.c |
| Dec. 28, 2001 12:51 p | 1,375 | pathgetlink.c |
| Dec. 28, 2001 12:51 p | 2,078 | pathpath.c |
| Dec. 28, 2001 12:51 p | 1,181 | sfstr.h |
| Dec. 28, 2001 12:51 p | 235 | strcopy.c |
| Dec. 28, 2001 12:51 p | 365 | strerror.c |
| Dec. 28, 2001 12:51 p | 501 | stresc.c |
| Dec. 28, 2001 12:51 p | 17,148 | strmatch.c |
| Dec. 28, 2001 12:51 p | 3,979 | strton.c |
| 25 File(s) | 72,923 bytes | |

Directory of F:\Send\ExtLibraries\graphviz-1.7.7\tools\expr

| | | |
|---|---|---|
| Dec. 28, 2001 12:51 p | 14,062 | excc.c |
| Dec. 28, 2001 12:51 p | 1,078 | excontext.c |
| Dec. 28, 2001 12:51 p | 1,360 | exdata.c |
| Dec. 28, 2001 12:51 p | 741 | exerror.c |
| Dec. 28, 2001 12:51 p | 32,024 | exeval.c |
| Dec. 28, 2001 12:51 p | 600 | exexpr.c |
| Dec. 28, 2001 12:51 p | 15,749 | exgram.h |
| Dec. 28, 2001 12:51 p | 810 | exlexname.c |
| Dec. 28, 2001 12:51 p | 4,590 | exlib.h |
| Dec. 28, 2001 12:51 p | 1,408 | exopen.c |
| Dec. 28, 2001 12:51 p | 73,496 | exparse.c |
| Dec. 28, 2001 12:51 p | 23,169 | exparse.y |
| Dec. 28, 2001 12:51 p | 1,819 | expr.3 |

-continued

| | | |
|---|---|---|
| Dec. 28, 2001 12:51 p | 8,037 | expr.h |
| Dec. 28, 2001 12:51 p | 856 | exrewind.c |
| Dec. 28, 2001 12:51 p | 13,929 | extoken.c |
| Dec. 28, 2001 12:51 p | 439 | extype.c |
| Dec. 28, 2001 12:51 p | 436 | exzero.c |
| Dec. 28, 2001 12:51 p | 13,685 | Makefile |
| Dec. 28, 2001 12:51 p | 1,426 | Makefile.am |
| Dec. 28, 2001 12:51 p | 14,185 | Makefile.IN |
| Dec. 28, 2001 12:51 p | 1,563 | Makefile.nmake |
| Dec. 28, 2001 12:51 p | 1,548 | Makefile.orig |
| Dec. 28, 2001 12:51 p | 1,630 | RELEASE |
| 24 File(s) | 228,640 bytes | |

Directory of F:\Send\ExtLibraries\graphviz-1.7.7\tools\gpr

| | | |
|---|---|---|
| Dec. 28, 2001 12:51 p | 1,950 | actions.c |
| Dec. 28, 2001 12:51 p | 169 | actions.h |
| Dec. 28, 2001 12:51 p | 20,098 | compile.c |
| Dec. 28, 2001 12:51 p | 879 | compile.h |
| Dec. 28, 2001 12:51 p | 11,355 | gpr.1 |
| Dec. 28, 2001 12:51 p | 8,287 | gpr.c |
| Dec. 28, 2001 12:51 p | 1,651 | gprdata |
| Dec. 28, 2001 12:51 p | 640 | gprstate.c |
| Dec. 28, 2001 12:51 p | 547 | gprstate.h |
| Dec. 28, 2001 12:51 p | 16,761 | Makefile |
| Dec. 28, 2001 12:51 p | 1,003 | Makefile.am |
| Dec. 28, 2001 12:51 p | 17,320 | Makefile.IN |
| Dec. 28, 2001 12:51 p | 4,044 | mkdefs.c |
| Dec. 28, 2001 12:51 p | 9,754 | parse.c |
| Dec. 28, 2001 12:51 p | 679 | parse.h |
| Dec. 28, 2001 12:51 p | 951 | queue.c |
| Dec. 28, 2001 12:51 p | 488 | queue.h |
| 17 File(s) | 96,576 bytes | |

Directory of F:\Send\ExtLibraries\graphviz-1.7.7\tools\sfio

| | | |
|---|---|---|
| Dec. 28, 2001 12:51 p | 15,977 | Makefile |
| Dec. 28, 2001 12:51 p | 1,425 | Makefile.am |
| Dec. 28, 2001 12:51 p | 16,522 | Makefile.IN |
| Dec. 28, 2001 12:51 p | 6,219 | Makefile.orig |
| Dec. 28, 2001 12:51 p | 2,567 | README |
| Dec. 28, 2001 12:51 p | 2,939 | sfclose.c |
| Dec. 28, 2001 12:51 p | 834 | sfclrlock.c |
| Dec. 28, 2001 12:51 p | 4,588 | sfcvt.c |
| Dec. 28, 2001 12:51 p | 3,482 | sfdisc.c |
| Dec. 28, 2001 12:51 p | 617 | sfdlen.c |
| Dec. 28, 2001 12:51 p | 2,574 | sfexcept.c |
| Dec. 28, 2001 12:51 p | 2,644 | sfexit.c |
| Dec. 28, 2001 12:51 p | 2,108 | sfextern.c |
| Dec. 28, 2001 12:51 p | 363 | sffcvt.c |
| Dec. 28, 2001 12:51 p | 2,404 | sffilbuf.c |
| Dec. 28, 2001 12:51 p | 2,016 | sfflsbuf.c |
| Dec. 28, 2001 12:51 p | 904 | sfgetd.c |
| Dec. 28, 2001 12:51 p | 884 | sfgetl.c |
| Dec. 28, 2001 12:51 p | 801 | sfgetm.c |
| Dec. 28, 2001 12:51 p | 2,755 | sfgetr.c |
| Dec. 28, 2001 12:51 p | 755 | sfgetu.c |
| Dec. 28, 2001 12:51 p | 29,501 | sfhdr.h |
| Dec. 28, 2001 12:51 p | 16,306 | sfio.h |
| Dec. 28, 2001 12:51 p | 3,694 | sfio_t.h |
| Dec. 28, 2001 12:51 p | 300 | sfllen.c |
| Dec. 28, 2001 12:51 p | 11,827 | sfmode.c |
| Dec. 28, 2001 12:51 p | 6,095 | sfmove.c |
| Dec. 28, 2001 12:51 p | 838 | sfmutex.c |
| Dec. 28, 2001 12:51 p | 2,673 | sfnew.c |
| Dec. 28, 2001 12:51 p | 288 | sfnotify.c |
| Dec. 28, 2001 12:51 p | 1,094 | sfnputc.c |
| Dec. 28, 2001 12:51 p | 4,341 | sfopen.c |
| Dec. 28, 2001 12:51 p | 5,246 | sfpkrd.c |
| Dec. 28, 2001 12:51 p | 4,603 | sfpoll.c |
| Dec. 28, 2001 12:51 p | 7,203 | sfpool.c |
| Dec. 28, 2001 12:51 p | 6,027 | sfpopen.c |
| Dec. 28, 2001 12:51 p | 1,445 | sfprintf.c |
| Dec. 28, 2001 12:51 p | 877 | sfprints.c |
| Dec. 28, 2001 12:51 p | 1,605 | sfpurge.c |
| Dec. 28, 2001 12:51 p | 1,473 | sfputd.c |
| Dec. 28, 2001 12:51 p | 1,255 | sfputl.c |
| Dec. 28, 2001 12:51 p | 1,230 | sfputm.c |
| Dec. 28, 2001 12:51 p | 1,900 | sfputr.c |
| Dec. 28, 2001 12:51 p | 1,130 | sfputu.c |
| Dec. 28, 2001 12:51 p | 1,078 | sfraise.c |
| Dec. 28, 2001 12:51 p | 6,582 | sfrd.c |
| Dec. 28, 2001 12:51 p | 2,700 | sfread.c |
| Dec. 28, 2001 12:51 p | 3,291 | sfreserve.c |
| Dec. 28, 2001 12:51 p | 1,137 | sfresize.c |
| Dec. 28, 2001 12:51 p | 1,358 | sfscanf.c |
| Dec. 28, 2001 12:51 p | 6,219 | sfseek.c |
| Dec. 28, 2001 12:51 p | 1,470 | sfset.c |
| Dec. 28, 2001 12:51 p | 7,921 | sfsetbuf.c |
| Dec. 28, 2001 12:51 p | 2,291 | sfsetfd.c |
| Dec. 28, 2001 12:51 p | 1,810 | sfsize.c |
| Dec. 28, 2001 12:51 p | 1,734 | sfsk.c |
| Dec. 28, 2001 12:51 p | 2,018 | sfstack.c |
| Dec. 28, 2001 12:51 p | 2,606 | sfstrtod.c |
| Dec. 28, 2001 12:51 p | 2,318 | sfswap.c |
| Dec. 28, 2001 12:51 p | 3,409 | sfsync.c |
| Dec. 28, 2001 12:51 p | 11,729 | sftable.c |
| Dec. 28, 2001 12:51 p | 838 | sftell.c |
| Dec. 28, 2001 12:51 p | 8,814 | sftmp.c |
| Dec. 28, 2001 12:51 p | 1,775 | sfungetc.c |
| Dec. 28, 2001 12:51 p | 24,994 | sfvprintf.c |
| Dec. 28, 2001 12:51 p | 18,547 | sfvscanf.c |
| Dec. 28, 2001 12:51 p | 4,861 | sfwr.c |
| Dec. 28, 2001 12:51 p | 3,026 | sfwrite.c |
| Dec. 28, 2001 12:51 p | 4,637 | vthread.h |
| 69 File(s) | 311,492 bytes | |

Directory of F:\Send\ExtLibraries\graphviz-1.7.7\tools\sfio\features

| | | |
|---|---|---|
| Dec. 28, 2001 12:51 p | 8,960 | common |
| Dec. 28, 2001 12:51 p | 12,049 | sfio |
| Dec. 28, 2001 12:51 p | 9,115 | stdio |
| 3 File(s) | 30,124 bytes | |

Directory of F:\Send\ExtLibraries\graphviz-1.7.7\tools\sfio\features\CVS

| | | |
|---|---|---|
| Dec. 28, 2001 12:51 p | 120 | Entries |
| Dec. 28, 2001 12:51 p | 30 | Repository |
| Dec. 28, 2001 12:51 p | 40 | Root |
| 3 File(s) | 190 bytes | |

Directory of F:\Send\ExtLibraries\graphviz-1.7.7\tools\sfio\Sfio_dc

| | | |
|---|---|---|
| Dec. 28, 2001 12:52 p | 11,797 | Makefile |
| Dec. 28, 2001 12:52 p | 948 | Makefile.am |
| Dec. 28, 2001 12:52 p | 12,334 | Makefile.IN |
| Dec. 28, 2001 12:52 p | 4,137 | sfdcdio.c |
| Dec. 28, 2001 12:52 p | 7,811 | sfdcdos.c |
| Dec. 28, 2001 12:52 p | 4,018 | sfdcfilter.c |
| Dec. 28, 2001 12:52 p | 41 | sfdchdr.h |
| Dec. 28, 2001 12:52 p | 10,249 | sfdclzw.c |
| Dec. 28, 2001 12:52 p | 3,439 | sfdcseekable.c |
| Dec. 28, 2001 12:52 p | 997 | sfdcslow.c |
| Dec. 28, 2001 12:52 p | 3,935 | sfdcsubstream.c |
| Dec. 28, 2001 12:52 p | 1,905 | sfdctee.c |

|  |  |
|---|---|
| Dec. 28, 2001 12:52 p | 3,703 sfdcunion.c |
| Dec. 28, 2001 12:52 p | 575 sfdisc.h |
| 14 File(s) | 65,889 bytes |

Directory of F:\Send\ExtLibraries\graphviz-1.7.7\tools\sfio\Sfio_f

|  |  |
|---|---|
| Dec. 28, 2001 12:52 p | 11,894 Makefile |
| Dec. 28, 2001 12:52 p | 992 Makefile.am |
| Dec. 28, 2001 12:52 p | 12,431 Makefile.IN |
| Dec. 28, 2001 12:52 p | 162_sfclrerr.c |
| Dec. 28, 2001 12:52 p | 160_sfdlen.c |
| Dec. 28, 2001 12:52 p | 150_sfeof.c |
| Dec. 28, 2001 12:52 p | 158_sferror.c |
| Dec. 28, 2001 12:52 p | 162_sffileno.c |
| Dec. 28, 2001 12:52 p | 154_sfgetc.c |
| Dec. 28, 2001 12:52 p | 156_sfllen.c |
| Dec. 28, 2001 12:52 p | 182_sfputc.c |
| Dec. 28, 2001 12:52 p | 191_sfputd.c |
| Dec. 28, 2001 12:52 p | 187_sfputl.c |
| Dec. 28, 2001 12:52 p | 224_sfputm.c |
| Dec. 28, 2001 12:52 p | 189_sfputu.c |
| Dec. 28, 2001 12:52 p | 135_sfslen.c |
| Dec. 28, 2001 12:52 p | 166_sfstacked.c |
| Dec. 28, 2001 12:52 p | 158_sfulen.c |
| Dec. 28, 2001 12:52 p | 166_sfvalue.c |
| 19 File(s) | 28,017 bytes |

Directory of F:\Send\ExtLibraries\graphviz-1.7.7\tools\src

|  |  |
|---|---|
| Dec. 28, 2001 12:52 p | 1,653 acyclic.1 |
| Dec. 28, 2001 12:52 p | 4,462 acyclic.c |
| Dec. 28, 2001 12:52 p | 1,177 ccomps.1 |
| Dec. 28, 2001 12:52 p | 3,488 ccomps.c |
| Dec. 28, 2001 12:52 p | 1,947 colorize.1 |
| Dec. 28, 2001 12:52 p | 5,295 colorize.c |
| Dec. 28, 2001 12:52 p | 16,451 colortbl.h |
| Dec. 28, 2001 12:52 p | 1,579 colxlate.c |
| Dec. 28, 2001 12:52 p | 1,545 gc.1 |
| Dec. 28, 2001 12:52 p | 5,815 gc.c |
| Dec. 28, 2001 12:52 p | 2,879 ingraphs.c |
| Dec. 28, 2001 12:52 p | 657 ingraphs.h |
| Dec. 28, 2001 12:52 p | 21,411 Makefile |
| Dec. 28, 2001 12:52 p | 2,353 Makefile.am |
| Dec. 28, 2001 12:52 p | 21,972 Makefile.IN |
| Dec. 28, 2001 12:52 p | 361 nop.1 |
| Dec. 28, 2001 12:52 p | 1,518 nop.c |
| Dec. 28, 2001 12:52 p | 1,616 sccmap.1 |
| Dec. 28, 2001 12:52 p | 8,094 sccmap.c |
| Dec. 28, 2001 12:52 p | 1,195 tred.1 |
| Dec. 28, 2001 12:52 p | 2,719 tred.c |
| Dec. 28, 2001 12:52 p | 1,490 unflatten.1 |
| Dec. 28, 2001 12:52 p | 4,670 unflatten.c |
| 23 File(s) | 114,347 bytes |

Directory of F:\Send\ExtLibraries\graphviz-1.7.7\tools\vmalloc

|  |  |
|---|---|
| Dec. 28, 2001 12:52 p | 3,477 ast_common.h |
| Dec. 28, 2001 12:52 p | 11,917 Makefile |
| Dec. 28, 2001 12:52 p | 928 Makefile.am |
| Dec. 28, 2001 12:52 p | 12,454 Makefile.IN |
| Dec. 28, 2001 12:52 p | 9,135 malloc.c |
| Dec. 28, 2001 12:52 p | 808 README |
| Dec. 28, 2001 12:52 p | 8,159 vmalloc.h |
| Dec. 28, 2001 12:52 p | 29,378 vmbest.c |
| Dec. 28, 2001 12:52 p | 1,170 vmclear.c |
| Dec. 28, 2001 12:52 p | 1,496 vmclose.c |
| Dec. 28, 2001 12:52 p | 868 vmdcheap.c |
| Dec. 28, 2001 12:52 p | 15,132 vmdebug.c |
| Dec. 28, 2001 12:52 p | 635 vmdisc.c |
| Dec. 28, 2001 12:52 p | 1,017 vmexit.c |
| Dec. 28, 2001 12:52 p | 15,733 vmhdr.h |
| Dec. 28, 2001 12:52 p | 9,222 vmlast.c |
| Dec. 28, 2001 12:52 p | 3,838 vmopen.c |
| Dec. 28, 2001 12:52 p | 6,313 vmpool.c |
| Dec. 28, 2001 12:52 p | 6,366 vmprivate.c |
| Dec. 28, 2001 12:52 p | 15,618 vmprofile.c |
| Dec. 28, 2001 12:52 p | 379 vmregion.c |
| Dec. 28, 2001 12:52 p | 680 vmsegment.c |
| Dec. 28, 2001 12:52 p | 781 vmset.c |
| Dec. 28, 2001 12:52 p | 2,209 vmstat.c |
| Dec. 28, 2001 12:52 p | 256 vmstrdup.c |
| Dec. 28, 2001 12:52 p | 4,072 vmtrace.c |
| Dec. 28, 2001 12:52 p | 1,011 vmwalk.c |
| 27 File(s) | 163,052 bytes |

Directory of F:\Send\ExtLibraries\graphviz-1.7.7\tools\vmalloc\features

|  |  |
|---|---|
| Dec. 28, 2001 12:52 p | 8,960 common |
| Dec. 28, 2001 12:52 p | 1,998 vmalloc |
| 2 File(s) | 10,958 bytes |

Directory of F:\Send\ExtLibraries\graphviz-1.7.7\tools\vmalloc\features\CVS

|  |  |
|---|---|
| Dec. 28, 2001 12:52 p | 84 Entries |
| Dec. 28, 2001 12:52 p | 33 Repository |
| Dec. 28, 2001 12:52 p | 40 Root |
| 3 File(s) | 157 bytes |

Directory of F:\Send\ExtLibraries\jaxp-1.1

|  |  |
|---|---|
| Dec. 28, 2001 12:52 p | 256,484 crimson.jar.b64 |
| Dec. 28, 2001 12:52 p | 2,717 install.html |
| Dec. 28, 2001 12:52 p | 38,924 jaxp.jar.b64 |
| Dec. 28, 2001 12:52 p | 2,739 License-ASF |
| Dec. 28, 2001 12:52 p | 11,407 License-RI.html |
| Dec. 28, 2001 12:52 p | 4,826 License-W3C.html |
| Dec. 28, 2001 12:52 p | 7,401 readme.html |
| Dec. 28, 2001 12:52 p | 9,028 relnotes.html |
| Dec. 28, 2001 12:52 p | 1,098,646 xalan.jar.b64 |
| 9 File(s) | 1,432,172 bytes |

Directory of F:\Send\ExtLibraries\jdk 1.3.1 \include

|  |  |
|---|---|
| Dec. 28, 2001 12:52 p | 7,839 jawt.h |
| Dec. 28, 2001 12:52 p | 68,634 jni.h |
| Dec. 28, 2001 12:52 p | 38,119 jvmdi.h |
| Dec. 28, 2001 12:52 p | 22,693 jvmpi.h |
| 4 File(s) | 137,285 bytes |

Directory of F:\Send\ExtLibraries\jdk 1.3.1\include\win32

|  |  |
|---|---|
| Dec. 28, 2001 12:52 p | 960 jawt_md.h |
| Dec. 28, 2001 12:52 p | 518 jni_md.h |
| 2 File(s) | 1,478 bytes |

Directory of F:\Send\ExtLibraries\jdom-b7

| | | |
|---|---|---|
| Dec. 28, 2001 12:52 p | 677 | build.bat |
| Dec. 28, 2001 12:52 p | 913 | build.sh |
| Dec. 28, 2001 12:52 p | 10,907 | build.xml |
| Dec. 28, 2001 12:52 p | 400 | build11.bat |
| Dec. 28, 2001 12:52 p | 545 | build11.sh |
| Dec. 28, 2001 12:52 p | 20,969 | CHANGES.txt |
| Dec. 28, 2001 12:52 p | 379 | COMMITTERS.txt |
| Dec. 28, 2001 12:52 p | 2,581 | LICENSE.txt |
| Dec. 28, 2001 12:52 p | 3,215 | README.txt |
| Dec. 28, 2001 12:52 p | 15,391 | TODO.txt |
| 10 File(s) | 55,977 bytes | |

Directory of F:\Send\ExtLibraries\jdom-b7\build

| | | |
|---|---|---|
| Dec. 28, 2001 12:52 p | 145,830 | jdom.jar.b64 |
| 1 File(s) | 145,830 bytes | |

Directory of F:\Send\ExtLibraries\Libs\pc\GraphVizLib

| | | |
|---|---|---|
| Dec. 28, 2001 12:52 p | 1,056 | edbuild-sh |
| Dec. 28, 2001 12:52 p | 14,353 | Graph VizLib.dsp |
| 2 File(s) | 15,409 bytes | |

Directory of F:\Send\ExtLibraries\Libs\pc\libsndfile

| | | |
|---|---|---|
| Dec. 28, 2001 12:52 p | 7,658 | libsndfile.dsp |
| 1 File(s) | 7,658 bytes | |

Directory of F:\Send\ExtLibraries\libsndfile

| | | |
|---|---|---|
| Dec. 28, 2001 12:52 p | 8,453 | acconfig.h |
| Dec. 28, 2001 12:52 p | 18,853 | aclocal.m4 |
| Dec. 28, 2001 12:52 p | 638 | AUTHORS |
| Dec. 28, 2001 12:52 p | 39,843 | ChangeLog |
| Dec. 28, 2001 12:52 p | 1,503 | check_libsndfile.py |
| Dec. 28, 2001 12:52 p | 34,268 | config.guess |
| Dec. 28, 2001 12:52 p | 26,511 | config.sub |
| Dec. 28, 2001 12:52 p | 87,543 | configure |
| Dec. 28, 2001 12:52 p | 4,895 | configure.in |
| Dec. 28, 2001 12:52 p | 27,021 | COPYING |
| Dec. 28, 2001 12:52 p | 8,013 | INSTALL |
| Dec. 28, 2001 12:52 p | 2,305 | install-sh |
| Dec. 28, 2001 12:52 p | 1,587 | libsndfile.spec |
| Dec. 28, 2001 12:52 p | 1,589 | libsndfile.spec.in |
| Dec. 28, 2001 12:52 p | 100,826 | ltconfig |
| Dec. 28, 2001 12:52 p | 114,790 | ltmain.sh |
| Dec. 28, 2001 12:52 p | 168 | Makefile.am |
| Dec. 28, 2001 12:52 p | 11,694 | Makefile.in |
| Dec. 28, 2001 12:52 p | 6,462 | missing |
| Dec. 28, 2001 12:52 p | 772 | mkinstalldirs |
| Dec. 28, 2001 12:52 p | 3,030 | NEWS |
| Dec. 28, 2001 12:52 p | 2,237 | README |
| Dec. 28, 2001 12:52 p | 170 | reconf |
| Dec. 28, 2001 12:52 p | 1,804 | TODO |
| 24 File(s) | 504,975 bytes | |

Directory of F:\Send\ExtLibraries\libsndfile\doc

| | | |
|---|---|---|
| Dec. 28, 2001 12:52 p | 18,765 | api.html |
| Dec. 28, 2001 12:52 p | 1,903 | bugs.html |
| Dec. 28, 2001 12:52 p | 39,261 | ChangeLog |
| Dec. 28, 2001 12:52 p | 12,380 | index.html |
| Dec. 28, 2001 12:52 p | 99 | Makefile.am |
| Dec. 28, 2001 12:52 p | 4,775 | Makefile.in |
| Dec. 28, 2001 12:52 p | 3,030 | NEWS |
| Dec. 28, 2001 12:52 p | 4,450 | new_file_type.HOWTO |
| Dec. 28, 2001 12:52 p | 1,261 | sf_info.html |
| 9 File(s) | 85,924 bytes | |

Directory of F:\Send\ExtLibraries\libsndfile\examples

| | | |
|---|---|---|
| Dec. 28, 2001 12:52 p | 874 | Makefile.am |
| Dec. 28, 2001 12:52 p | 12,354 | Makefile.in |
| Dec. 28, 2001 12:52 p | 2,416 | make_sine.c |
| Dec. 28, 2001 12:52 p | 7,215 | sfconvert.c |
| Dec. 28, 2001 12:52 p | 2,472 | sfdump.c |
| Dec. 28, 2001 12:52 p | 2,116 | sfhexdump.c |
| Dec. 28, 2001 12:52 p | 1,298 | sfprocess.c |
| Dec. 28, 2001 12:52 p | 2,869 | sndfile2oct.c |
| Dec. 28, 2001 12:52 p | 2,557 | sndfile_info.c |
| Dec. 28, 2001 12:52 p | 3,150 | wav32_aiff24.c |
| 10 File(s) | 37,321 bytes | |

Directory of F:\Send\ExtLibraries\libsndfile\MacOS

| | | |
|---|---|---|
| Dec. 28, 2001 12:52 p | 2,335 | config.h |
| Dec. 28, 2001 12:52 p | 2,442 | MacOS-readme.txt |
| Dec. 28, 2001 12:52 p | 41 | Makefile.am |
| Dec. 28, 2001 12:52 p | 4,706 | Makefile.in |
| 4 File(s) | 9,524 bytes | |

Directory of F:\Send\ExtLibraries\libsndfile\src

| | | |
|---|---|---|
| Dec. 28, 2001 12:52 p | 22,235 | aiff.c |
| Dec. 28, 2001 12:52 p | 27,295 | alaw.c |
| Dec. 28, 2001 12:52 p | 16,173 | au.c |
| Dec. 28, 2001 12:52 p | 1,089 | au.h |
| Dec. 28, 2001 12:52 p | 16,082 | au_g72x.c |
| Dec. 28, 2001 12:52 p | 19,912 | common.c |
| Dec. 28, 2001 12:52 p | 10,043 | common.h |
| Dec. 28, 2001 12:52 p | 2,122 | config.h.in |
| Dec. 28, 2001 12:52 p | 30,476 | float32.c |
| Dec. 28, 2001 12:52 p | 1,533 | floatcast.h |
| Dec. 28, 2001 12:52 p | 10,467 | ircam.c |
| Dec. 28, 2001 12:52 p | 723 | Makefile.am |
| Dec. 28, 2001 12:52 p | 15,605 | Makefile.in |
| Dec. 28, 2001 12:52 p | 7,990 | nist.c |
| Dec. 28, 2001 12:52 p | 24,513 | paf.c |
| Dec. 28, 2001 12:52 p | 85,049 | pcm.c |
| Dec. 28, 2001 12:52 p | 4,788 | raw.c |
| Dec. 28, 2001 12:52 p | 3,432 | samplitude.c |
| Dec. 28, 2001 12:52 p | 2,870 | sfendian.h |
| Dec. 28, 2001 12:52 p | 43,936 | sndfile.c |
| Dec. 28, 2001 12:52 p | 8,903 | sndfile.h |
| Dec. 28, 2001 12:52 p | 11 | stamp-h.in |
| Dec. 28, 2001 12:52 p | 12,055 | svx.c |
| Dec. 28, 2001 12:52 p | 65,646 | ulaw.c |
| Dec. 28, 2001 12:52 p | 11,216 | voc.c |
| Dec. 28, 2001 12:52 p | 37,252 | wav.c |
| Dec. 28, 2001 12:52 p | 3,063 | wav.h |
| Dec. 28, 2001 12:52 p | 19,251 | wav_gsm610.c |
| Dec. 28, 2001 12:52 p | 24,617 | wav_ima_adpcm.c |
| Dec. 28, 2001 12:52 p | 28,179 | wav_ms_adpcm.c |
| 30 File(s) | 556,526 bytes | |

Directory of F:\Send\ExtLibraries\libsndfile\src\G72×

| | | |
|---|---|---|
| Dec. 28, 2001 12:52 p | 1,968 | ChangeLog |
| Dec. 28, 2001 12:52 p | 4,917 | g721.c |
| Dec. 28, 2001 12:52 p | 5,655 | g723_16.c |
| Dec. 28, 2001 12:52 p | 4,273 | g723_24.c |
| Dec. 28, 2001 12:52 p | 5,163 | g723_40.c |
| Dec. 28, 2001 12:52 p | 16,370 | g72x.c |
| Dec. 28, 2001 12:52 p | 3,982 | g72x.h |
| Dec. 28, 2001 12:52 p | 327 | Makefile.am |
| Dec. 28, 2001 12:52 p | 8,307 | Makefile.in |
| Dec. 28, 2001 12:52 p | 3,954 | private.h |
| Dec. 28, 2001 12:52 p | 0 | README |
| Dec. 28, 2001 12:52 p | 3,311 | README.original |
| 12 File(s) | 58,227 bytes | |

Directory of F:\Send\ExtLibraries\libsndfile\src\GSM610

| | | |
|---|---|---|
| Dec. 28, 2001 12:52 p | 6,053 | add.c |
| Dec. 28, 2001 12:52 p | 659 | ChangeLog |
| Dec. 28, 2001 12:52 p | 2,566 | code.c |
| Dec. 28, 2001 12:52 p | 924 | config.h |
| Dec. 28, 2001 12:52 p | 706 | COPYRIGHT |
| Dec. 28, 2001 12:52 p | 1,633 | decode.c |
| Dec. 28, 2001 12:52 p | 1,752 | gsm.h |
| Dec. 28, 2001 12:52 p | 901 | gsm_create.c |
| Dec. 28, 2001 12:52 p | 11,027 | gsm_decode.c |
| Dec. 28, 2001 12:52 p | 595 | gsm_destroy.c |
| Dec. 28, 2001 12:52 p | 11,877 | gsm_encode.c |
| Dec. 28, 2001 12:52 p | 1,274 | gsm_option.c |
| Dec. 28, 2001 12:52 p | 24,536 | long_term.c |
| Dec. 28, 2001 12:52 p | 7,430 | lpc.c |
| Dec. 28, 2001 12:52 p | 451 | Makefile.am |
| Dec. 28, 2001 12:52 p | 9,304 | Makefile.in |
| Dec. 28, 2001 12:52 p | 2,626 | preprocess.c |
| Dec. 28, 2001 12:52 p | 8,195 | private.h |
| Dec. 28, 2001 12:52 p | 1,680 | proto.h |
| Dec. 28, 2001 12:52 p | 1,460 | README |
| Dec. 28, 2001 12:52 p | 11,548 | rpe.c |
| Dec. 28, 2001 12:52 p | 10,831 | short_term.c |
| Dec. 28, 2001 12:52 p | 2,210 | table.c |
| Dec. 28, 2001 12:52 p | 495 | unproto.h |
| 24 File(s) | 120,733 bytes | |

Directory of F:\Send\ExtLibraries\libsndfile\tests

| | | |
|---|---|---|
| Dec. 28, 2001 12:52 p | 6,490 | alaw_test.c |
| Dec. 28, 2001 12:52 p | 1,683 | check_log_buffer.c |
| Dec. 28, 2001 12:52 p | 942 | check_log_buffer.h |
| Dec. 28, 2001 12:52 p | 6,625 | command_test.c |
| Dec. 28, 2001 12:52 p | 1,603 | error_test.c |
| Dec. 28, 2001 12:52 p | 11,189 | floating_point_test.c |
| Dec. 28, 2001 12:52 p | 67,385 | lossy_comp_test.c |
| Dec. 28, 2001 12:52 p | 5,568 | Makefile.am |
| Dec. 28, 2001 12:52 p | 18,745 | Makefile.in |
| Dec. 28, 2001 12:52 p | 6,286 | peak_chunk_test.c |
| Dec. 28, 2001 12:52 p | 26,593 | read_seek_test.c |
| Dec. 28, 2001 12:52 p | 1,636 | sftest.c |
| Dec. 28, 2001 12:52 p | 1,118 | sfversion.c |
| Dec. 28, 2001 12:52 p | 3,749 | stdin_test.c |
| Dec. 28, 2001 12:52 p | 2,753 | stdio_test.c |
| Dec. 28, 2001 12:52 p | 3,550 | stdout_test.c |
| Dec. 28, 2001 12:52 p | 7,636 | ulaw_test.c |
| Dec. 28, 2001 12:52 p | 49,351 | write_read_test.c |
| 18 File(s) | 222,902 bytes | |

Directory of F:\Send\ExtLibraries\libsndfile\Win32

| | | |
|---|---|---|
| Dec. 28, 2001 12:52 p | 2,353 | config.h |
| Dec. 28, 2001 12:52 p | 84 | Makefile.am |
| Dec. 28, 2001 12:52 p | 4,742 | Makefile.in |
| Dec. 28, 2001 12:52 p | 3,619 | README-Win32.txt |
| Dec. 28, 2001 12:52 p | 1,360 | README-Win32.txt.old |
| Dec. 28, 2001 12:52 p | 1,729 | unistd.h |
| 6 File(s) | 13,887 bytes | |

Directory of F:\Send\ExtLibraries\monarch

| | | |
|---|---|---|
| Dec. 28, 2001 12:52 p | 6,964 | license.html |
| Dec. 28, 2001 12:52 p | 2,207 | readme.txt |
| 2 File(s) | 9,171 bytes | |

Directory of F:\Send\ExtLibraries\monarch\lib

| | | |
|---|---|---|
| Dec. 28, 2001 12:52 p | 167,738 | mgraph.jar.b64 |
| 1 File(s) | 167,738 bytes | |

Directory of F:\Send\ExtLibraries\zlib-1.1.3

| | | |
|---|---|---|
| Dec. 28, 2001 12:52 p | 1,293 | adler32.c |
| Dec. 28, 2001 12:52 p | 9,869 | algorithm.txt |
| Dec. 28, 2001 12:52 p | 24,017 | ChangeLog |
| Dec. 28, 2001 12:52 p | 2,204 | compress.c |
| Dec. 28, 2001 12:52 p | 6,840 | configure |
| Dec. 28, 2001 12:52 p | 7,136 | crc32.c |
| Dec. 28, 2001 12:52 p | 50,333 | deflate.c |
| Dec. 28, 2001 12:52 p | 11,925 | deflate.h |
| Dec. 28, 2001 12:52 p | 1,596 | descrip.mms |
| Dec. 28, 2001 12:52 p | 16,406 | example.c |
| Dec. 28, 2001 12:52 p | 2,322 | FAQ |
| Dec. 28, 2001 12:52 p | 26,616 | gzio.c |
| Dec. 28, 2001 12:52 p | 2,588 | INDEX |
| Dec. 28, 2001 12:52 p | 12,750 | infblock.c |
| Dec. 28, 2001 12:52 p | 1,253 | infblock.h |
| Dec. 28, 2001 12:52 p | 8,052 | infcodes.c |
| Dec. 28, 2001 12:52 p | 764 | infcodes.h |
| Dec. 28, 2001 12:52 p | 5,815 | inffast.c |
| Dec. 28, 2001 12:52 p | 505 | inffast.h |
| Dec. 28, 2001 12:52 p | 9,079 | inffixed.h |
| Dec. 28, 2001 12:52 p | 10,022 | inflate.c |
| Dec. 28, 2001 12:52 p | 16,529 | inftrees.c |
| Dec. 28, 2001 12:52 p | 2,674 | inftrees.h |
| Dec. 28, 2001 12:52 p | 2,086 | infutil.c |
| Dec. 28, 2001 12:52 p | 3,777 | infutil.h |
| Dec. 28, 2001 12:52 p | 5,472 | Makefile |
| Dec. 28, 2001 12:52 p | 5,451 | Makefile.in |
| Dec. 28, 2001 12:52 p | 3,927 | Makefile.riscos |
| Dec. 28, 2001 12:52 p | 2,548 | maketree.c |
| Dec. 28, 2001 12:52 p | 3,899 | Make_vms.com |
| Dec. 28, 2001 12:52 p | 8,170 | minigzip.c |
| Dec. 28, 2001 12:52 p | 7,254 | README |
| Dec. 28, 2001 12:52 p | 44,886 | trees.c |
| Dec. 28, 2001 12:52 p | 8,572 | trees.h |
| Dec. 28, 2001 12:52 p | 2,039 | uncompr.c |
| Dec. 28, 2001 12:52 p | 8,089 | zconf.h |
| Dec. 28, 2001 12:52 p | 3,387 | zlib.3 |
| Dec. 28, 2001 12:52 p | 41,791 | zlib.h |
| Dec. 28, 2001 12:52 p | 5,457 | zutil.c |
| Dec. 28, 2001 12:52 p | 5,780 | zutil.h |
| 40 File(s) | 393,173 bytes | |

Directory of F:\Send\ExtLibraries\zlib-1.1.3\amiga

| | | |
|---|---:|---|
| Dec. 28, 2001 12:52 p | 2,199 | Makefile.pup |
| Dec. 28, 2001 12:52 p | 1,881 | Makefile.sas |
| 2 File(s) | 4,080 bytes | |

Directory of F:\Send\ExtLibraries\zlib-1.1.3\contrib

| | | |
|---|---:|---|
| Dec. 28, 2001 12:52 p | 1,341 | README.contrib |
| Dec. 28, 2001 12:52 p | 2,635 | visual-basic.txt |
| 2 File(s) | 3,976 bytes | |

Directory of F:\Send\ExtLibraries\zlib-1.1.3\contrib\asm386

| | | |
|---|---:|---|
| Dec. 28, 2001 12:52 p | 14,823 | gvmat32.asm |
| Dec. 28, 2001 12:52 p | 7,196 | gvmat32c.c |
| Dec. 28, 2001 12:52 p | 59 | mkgvmt32.bat |
| Dec. 28, 2001 12:52 p | 2,482 | zlibvc.def |
| Dec. 28, 2001 12:52 p | 17,177 | zlibvc.dsp |
| Dec. 28, 2001 12:52 p | 726 | zlibvc.dsw |
| 6 File(s) | 42,463 bytes | |

Directory of F:\Send\ExtLibraries\zlib-1.1.3\contrib\asm586

| | | |
|---|---:|---|
| Dec. 28, 2001 12:52 p | 10,582 | match.S |
| Dec. 28, 2001 12:52 p | 1,658 | README.586 |
| 2 File(s) | 12,240 bytes | |

Directory of F:\Send\ExtLibraries\zlib-1.1.3\contrib\asm686

| | | |
|---|---:|---|
| Dec. 28, 2001 12:52 p | 9,336 | match.S |
| Dec. 28, 2001 12:52 p | 1,083 | README.686 |
| 2 File(s) | 10,419 bytes | |

Directory of F:\Send\ExtLibraries\zlib-1.1.3\contrib\delphi

| | | |
|---|---:|---|
| Dec. 28, 2001 12:52 p | 1,005 | zlib.mak |
| Dec. 28, 2001 12:52 p | 5,568 | zlibdef.pas |
| 2 File(s) | 6,573 bytes | |

Directory of F:\Send\ExtLibraries\zlib-1.1.3\contrib\delphi2

| | | |
|---|---:|---|
| Dec. 28, 2001 12:52 p | 5,287 | d_zlib.bpr |
| Dec. 28, 2001 12:52 p | 498 | d_zlib.cpp |
| Dec. 28, 2001 12:52 p | 670 | readme.txt |
| Dec. 28, 2001 12:52 p | 817 | zlib.bpg |
| Dec. 28, 2001 12:52 p | 5,338 | zlib.bpr |
| Dec. 28, 2001 12:52 p | 607 | zlib.cpp |
| Dec. 28, 2001 12:52 p | 16,644 | zlib.pas |
| Dec. 28, 2001 12:52 p | 4,581 | zlib32.bpr |
| Dec. 28, 2001 12:52 p | 1,488 | zlib32.cpp |
| 9 File(s) | 35,930 bytes | |

Directory of F:\Send\ExtLibraries\zlib-1.1.3\contrib\iostream

| | | |
|---|---:|---|
| Dec. 28, 2001 12:52 p | 550 | test.cpp |
| Dec. 28, 2001 12:52 p | 5,375 | zfstream.cpp |
| Dec. 28, 2001 12:52 p | 2,639 | zfstream.h |
| 3 File(s) | 8,564 bytes | |

Directory of F:\Send\ExtLibraries\zlib-1.13\contrib\iostream2

| | | |
|---|---:|---|
| Dec. 28, 2001 12:52 p | 9,590 | zstream.h |
| Dec. 28, 2001 12:52 p | 727 | zstream_test.cpp |
| 2 File(s) | 10,317 bytes | |

Directory of F:\Send\ExtLibraries\zlib-1.1.3\contrib\minizip

| | | |
|---|---:|---|
| Dec. 28, 2001 12:52 p | 1,341 | ChangeLogUnzip |
| Dec. 28, 2001 12:52 p | 466 | Makefile |
| Dec. 28, 2001 12:52 p | 11,729 | miniunz.c |
| Dec. 28, 2001 12:52 p | 7,830 | minizip.c |
| Dec. 28, 2001 12:52 p | 1,412 | readme.txt |
| Dec. 28, 2001 12:52 p | 35,835 | unzip.c |
| Dec. 28, 2001 12:52 p | 540 | unzip.def |
| Dec. 28, 2001 12:52 p | 10,205 | unzip.h |
| Dec. 28, 2001 12:52 p | 22,005 | zip.c |
| Dec. 28, 2001 12:52 p | 180 | zip.def |
| Dec. 28, 2001 12:52 p | 5,240 | zip.h |
| Dec. 28, 2001 12:52 p | 2,482 | zlibvc.def |
| Dec. 28, 2001 12:52 p | 17,177 | zlibvc.dsp |
| Dec. 28, 2001 12:52 p | 726 | zlibvc.dsw |
| 14 File(s) | 117,168 bytes | |

Directory of F:\Send\ExtLibraries\zlib-1.1.3\contrib\untgz

| | | |
|---|---:|---|
| Dec. 28, 2001 12:52 p | 237 | Makefile |
| Dec. 28, 2001 12:52 p | 1,194 | makefile.w32 |
| Dec. 28, 2001 12:52 p | 11,361 | untgz.c |
| 3 File(s) | 12,792 bytes | |

Directory of F:\Send\ExtLibraries\zlib-1.1.3\msdos

| | | |
|---|---:|---|
| Dec. 28, 2001 12:52 p | 2,868 | Makefile.b32 |
| Dec. 28, 2001 12:52 p | 3,422 | Makefile.bor |
| Dec. 28, 2001 12:52 p | 2,636 | Makefile.dj2 |
| Dec. 28, 2001 12:52 p | 1,507 | Makefile.emx |
| Dec. 28, 2001 12:52 p | 3,416 | Makefile.msc |
| Dec. 28, 2001 12:52 p | 2,901 | Makefile.tc |
| Dec. 28, 2001 12:52 p | 2,750 | Makefile.w32 |
| Dec. 28, 2001 12:52 p | 2,814 | Makefile.wat |
| Dec. 28, 2001 12:52 p | 1,857 | zlib.def |
| Dec. 28, 2001 12:52 p | 927 | zlib.rc |
| 10 File(s) | 25,098 bytes | |

Directory of F:\Send\ExtLibraries\zlib-1.1.3\nt

| | | |
|---|---:|---|
| Dec. 28, 2001 12:52 p | 3,023 | Makefile.emx |
| Dec. 28, 2001 12:52 p | 2,116 | Makefile.gcc |
| Dec. 28, 2001 12:52 p | 2,326 | Makefile.nt |
| Dec. 28, 2001 12:52 p | 1,749 | zlib.dnt |
| 4 File(s) | 9,214 bytes | |

Directory of F:\Send\ExtLibraries\zlib-1.1.3\os2

| | | |
|---|---|---|
| Dec. 28, 2001 12:52 p | 4,246 | Makefile.os2 |
| Dec. 28, 2001 12:52 p | 829 | zlib.def |
| 2 File(s) | 5,075 bytes | |

Directory of F:\Send\ExtTools\base64-1.3

| | | |
|---|---|---|
| Dec. 28, 2001 12:52 p | 3,526 | base64.1 |
| Dec. 28, 2001 12:52 p | 6,812 | base64.c |
| Dec. 28, 2001 12:52 p | 17,513 | base64.w |
| Dec. 28, 2001 12:52 p | 598 | config.h.in |
| Dec. 28, 2001 12:52 p | 48,728 | configure |
| Dec. 28, 2001 12:52 p | 632 | configure.in |
| Dec. 28, 2001 12:52 p | 294 | COPYING |
| Dec. 28, 2001 12:52 p | 4,990 | getopt.c |
| Dec. 28, 2001 12:52 p | 334 | getopt.h |
| Dec. 28, 2001 12:52 p | 5,771 | index.html |
| Dec. 28, 2001 12:52 p | 843 | INSTALL |
| Dec. 28, 2001 12:52 p | 5,003 | install-sh |
| Dec. 28, 2001 12:52 p | 6,415 | Makefile.in |
| Dec. 28, 2001 12:52 p | 1,446 | README |
| Dec. 28, 2001 12:52 p | 8,974 | rfc1341.html |
| Dec. 28, 2001 12:52 p | 7,511 | rfc1341.txt |
| 16 File(s) | 119,390 bytes | |

Directory of F:\Send\Tools\AudioPlayer

| | | |
|---|---|---|
| Dec. 28, 2001 12:52 p | 1,403 | AudioPlayer.cpp |
| Dec. 28, 2001 12:52 p | 5,371 | AudioPlayer.dsp |
| Dec. 28, 2001 12:52 p | 1,265 | AudioPlayer.dsw |
| Dec. 28, 2001 12:52 p | 722 | AudioPlayer.h |
| Dec. 28, 2001 12:52 p | 2,806 | AudioPlayerJNI.cpp |
| Dec. 28, 2001 12:52 p | 2,255 | AudioPlayerJNI.h |
| Dec. 28, 2001 12:52 p | 4,102 | CPlayer.cpp |
| Dec. 28, 2001 12:52 p | 1,268 | CPlayer.h |
| Dec. 28, 2001 12:52 p | 90 | makejni.bat |
| Dec. 28, 2001 12:52 p | 1,643 | ReadMe.txt |
| 10 File(s) | 20,925 bytes | |

Directory of F:\Send\Tools\DDLOpen

| | | |
|---|---|---|
| Dec. 28, 2001 12:52 p | 5,399 | DDLOpen.cpp |
| Dec. 28, 2001 12:52 p | 4,840 | DDLOpen.dsp |
| Dec. 28, 2001 12:52 p | 9,736 | EnumProc.cpp |
| Dec. 28, 2001 12:52 p | 578 | EnumProc.h |
| Dec. 28, 2001 12:52 p | 1,047 | MediaMap.h |
| Dec. 28, 2001 12:52 p | 1,619 | ReadMe.txt |
| Dec. 28, 2001 12:52 p | 294 | StdAfx.cpp |
| Dec. 28, 2001 12:52 p | 802 | StdAfx.h |
| 8 File(s) | 24,315 bytes | |

Directory of F:\Send\Tools\GraphViz

| | | |
|---|---|---|
| Dec. 28, 2001 12:52 p | 625 | GraphViz.cpp |
| Dec. 28, 2001 12:52 p | 5,341 | GraphViz.dsp |
| Dec. 28, 2001 12:52 p | 1,259 | GraphViz.dsw |
| Dec. 28, 2001 12:52 p | 5,908 | GraphVizJNI.cpp |
| Dec. 28, 2001 12:52 p | 701 | GraphVizJNI.h |
| Dec. 28, 2001 12:52 p | 88 | makejni.bat |
| Dec. 28, 2001 12:52 p | 1,625 | ReadMe.txt |
| 7 File(s) | 15,547 bytes | |

Directory of F:\Send\Tools\Talks

| | | |
|---|---|---|
| Dec. 28, 2001 12:52 p | 1,035 | buildme.bat |
| Dec. 28, 2001 12:52 p | 544 | Talks.html |
| 2 File(s) | 1,579 bytes | |

Directory of F:\Send\Tools\Talks\classes\jellyvision\uber1\graphics

| | | |
|---|---|---|
| Dec. 28, 2001 12:52 p | 1,280 | addsfx.gif.b64 |
| Dec. 28, 2001 12:52 p | 1,280 | approveaudio.gif.b64 |
| Dec. 28, 2001 12:52 p | 1,296 | approvevideo.gif.b64 |
| Dec. 28, 2001 12:52 p | 1,264 | audio.gif.b64 |
| Dec. 28, 2001 12:52 p | 1,284 | audiomoment.gif.b64 |
| Dec. 28, 2001 12:52 p | 1,222 | audiomomentnomedia.gif.b64 |
| Dec. 28, 2001 12:52 p | 1,284 | audiomomentsomemedia.gif.b64 |
| Dec. 28, 2001 12:52 p | 1,246 | downarrow.gif.b64 |
| Dec. 28, 2001 12:52 p | 1,246 | folder1.gif.b64 |
| Dec. 28, 2001 12:52 p | 1,258 | folder2.gif.b64 |
| Dec. 28, 2001 12:52 p | 1,320 | nixaudio.gif.b64 |
| Dec. 28, 2001 12:52 p | 1,332 | nixvideo.gif.b64 |
| Dec. 28, 2001 12:52 p | 1,246 | nomedia.gif.b64 |
| Dec. 28, 2001 12:52 p | 1,206 | spin1.gif.b64 |
| Dec. 28, 2001 12:52 p | 1,198 | spin2.gif.b64 |
| Dec. 28, 2001 12:52 p | 1,206 | spin3.gif.b64 |
| Dec. 28, 2001 12:52 p | 1,198 | spin4.gif.b64 |
| Dec. 28, 2001 12:52 p | 1,272 | textmoment.gif.b64 |
| Dec. 28, 2001 12:52 p | 1,268 | video.gif.b64 |
| 19 File(s) | 23,906 bytes | |

Directory of F:\Send\Tools\Talks\src

| | | |
|---|---|---|
| Dec. 28, 2001 12:52 p | 501 | app.xml |
| Dec. 28, 2001 12:52 p | 101 | MANIFEST.MF |
| Dec. 28, 2001 12:52 p | 95 | run.bat |
| Dec. 28, 2001 12:52 p | 18,698 | sfx.aif.b64 |
| Dec. 28, 2001 12:52 p | 62 | template.wav.b64 |
| Dec. 28, 2001 12:52 p | 1,031 | Trap.java |
| 6 File(s) | 20,488 bytes | |

Directory of F:\Send\Tools\Talks\src\jellyvision\uber1

| | | |
|---|---|---|
| Dec. 28, 2001 12:52 p | 3,586 | AppPrefs.java |
| Dec. 28, 2001 12:52 p | 1,568 | AppUndoManager.java |
| Dec. 28, 2001 12:52 p | 7,551 | CommandWindow.java |
| Dec. 28, 2001 12:52 p | 1,820 | MainApp.java |
| Dec. 28, 2001 12:52 p | 14,708 | MainFrame.java |
| Dec. 28, 2001 12:52 p | 5,804 | MediaView.java |
| Dec. 28, 2001 12:52 p | 5,893 | PlaybackView.java |
| Dec. 28, 2001 12:52 p | 10,479 | TestLink.java |
| Dec. 28, 2001 12:52 p | 489 | Tool Window.java |
| 9 File(s) | 51,898 bytes | |

Directory of F:\Send\Tools\Talks\src\jellyvision\uber1\editor

| | | |
|---|---|---|
| Dec. 28, 2001 12:52 p | 4,782 | AddPrefScreen.java |
| Dec. 28, 2001 12:52 p | 12,709 | ConditionCellEditor.java |
| Dec. 28, 2001 12:52 p | 2,335 | ConditionPref.java |
| Dec. 28, 2001 12:52 p | 2,540 | ConditionPrefView.java |
| Dec. 28, 2001 12:52 p | 6,556 | DialogueCellEditor.java |
| Dec. 28, 2001 12:52 p | 1,969 | DialoguePref.java |
| Dec. 28, 2001 12:52 p | 2,540 | DialoguePrefView.java |
| Dec. 28, 2001 12:52 p | 2,449 | FieldEditor.java |
| Dec. 28, 2001 12:52 p | 1,826 | FocusWatcher.java |

-continued

| | | |
|---|---|---|
| Dec. 28, 2001 12:52 p | 662 | IEditor.java |
| Dec. 28, 2001 12:52 p | 10,815 | NoteText.java |
| Dec. 28, 2001 12:52 p | 3,597 | OptionEditor.java |
| Dec. 28, 2001 12:52 p | 1,118 | Pref.java |
| Dec. 28, 2001 12:52 p | 5,506 | ScriptCommands.java |
| Dec. 28, 2001 12:52 p | 6,657 | ScriptPrefs.java |
| Dec. 28, 2001 12:52 p | 16,505 | ScriptView.java |
| Dec. 28, 2001 12:52 p | 3,682 | TextEditor.java |
| 17 File(s) | 86,248 bytes | |

Directory of F:\Send\Tools\Talks\src\jellyvision\uber1\flowchart

| | | |
|---|---|---|
| Dec. 28, 2001 12:52 p | 11,665 | ContextAdapter.java |
| Dec. 28, 2001 12:52 p | 7,594 | CurvedLink.java |
| Dec. 28, 2001 12:52 p | 827 | DisableLayout.java |
| Dec. 28, 2001 12:52 p | 9,678 | FixedDiamondNode.java |
| Dec. 28, 2001 12:52 p | 1,490 | FlowchartColors.java |
| Dec. 28, 2001 12:52 p | 1,468 | GraphView2.java |
| Dec. 28, 2001 12:52 p | 11,832 | GraphViz.java |
| Dec. 28, 2001 12:52 p | 785 | IfEraser.java |
| Dec. 28, 2001 12:52 p | 9,251 | IfLink.java |
| Dec. 28, 2001 12:52 p | 3,455 | IfPin.java |
| Dec. 28, 2001 12:52 p | 1,719 | LabelMeasure.java |
| Dec. 28, 2001 12:52 p | 4,043 | LayoutInfo.java |
| Dec. 28, 2001 12:52 p | 3,927 | LinkDragStrategy.java |
| Dec. 28, 2001 12:52 p | 6,642 | LinkFactory.java |
| Dec. 28, 2001 12:52 p | 20,229 | Model.java |
| Dec. 28, 2001 12:52 p | 1,847 | OutputPin.java |
| Dec. 28, 2001 12:52 p | 792 | Pin.java |
| Dec. 28, 2001 12:52 p | 1,762 | PinTable.java |
| Dec. 28, 2001 12:52 p | 2,871 | StubView.java |
| Dec. 28, 2001 12:52 p | 9,318 | ViewFactory.java |
| Dec. 28, 2001 12:52 p | 9,886 | WordBreakBlock.java |
| Dec. 28, 2001 12:52 p | 736 | WordWrapTextBox.java |
| Dec. 28, 2001 12:52 p | 3,654 | ZoomManager.java |
| 23 File(s) | 125,471 bytes | |

Directory of F:\Send\Tools\Talks\src\jellyvision\uber1\flowchart\change

| | | |
|---|---|---|
| Dec. 28, 2001 12:52 p | 1,458 | AliasChange.java |
| Dec. 28, 2001 12:52 p | 1,571 | AliasChangeCondition.java |
| Dec. 28, 2001 12:52 p | 1,700 | AudioMomentDescriptionChange.java |
| Dec. 28, 2001 12:52 p | 843 | CellCommand.java |
| Dec. 28, 2001 12:52 p | 1,313 | CellCreated.java |
| Dec. 28, 2001 12:52 p | 1,558 | CellCreatedBatch.java |
| Dec. 28, 2001 12:52 p | 1,580 | CellDeleted.java |
| Dec. 28, 2001 12:52 p | 1,707 | ConditionAdd.java |
| Dec. 28, 2001 12:52 p | 1,353 | ConditionCurrentChange.java |
| Dec. 28, 2001 12:52 p | 1,236 | ConditionDescriptionChange.java |
| Dec. 28, 2001 12:52 p | 1,852 | ConditionRemove.java |
| Dec. 28, 2001 12:52 p | 1,621 | HostChange.java |
| Dec. 28, 2001 12:52 p | 2,637 | LinkChange.java |
| Dec. 28, 2001 12:52 p | 995 | MediaChoice.java |
| Dec. 28, 2001 12:52 p | 1,341 | OptionDescriptionChange.java |
| Dec. 28, 2001 12:52 p | 2,803 | OptionLinkChange.java |
| 16 File(s) | 25,568 bytes | |

Directory of F:\Send\Tools\Talks\src\jellyvision\uber1\media

| | | |
|---|---|---|
| Dec. 28, 2001 12:52 p | 804 | AssetNode.java |
| Dec. 28, 2001 12:52 p | 3,110 | AssetTree.java |
| Dec. 28, 2001 12:52 p | 8,658 | AssetView.java |
| Dec. 28, 2001 12:52 p | 2,513 | AudioClip.java |
| Dec. 28, 2001 12:52 p | 34,536 | AudioMomentEditor.java |
| Dec. 28, 2001 12:52 p | 1,872 | AudioMomentNode.java |

-continued

| | | |
|---|---|---|
| Dec. 28, 2001 12:52 p | 4,966 | ComplexCellNode.java |
| Dec. 28, 2001 12:52 p | 20,490 | CueCard.java |
| Dec. 28, 2001 12:52 p | 1,080 | FolderNode.java |
| Dec. 28, 2001 12:52 p | 4,227 | MediaMap.java |
| Dec. 28, 2001 12:52 p | 1,822 | MediaNode.java |
| Dec. 28, 2001 12:52 p | 1,503 | MenuMap.java |
| Dec. 28, 2001 12:52 p | 1,071 | MomentEditor.java |
| Dec. 28, 2001 12:52 p | 3,354 | OrphanFolderNode.java |
| 14 File(s) | 90,006 bytes | |

Directory of F:\Send\Tools\Talks\src\jellyvision\uber1\media\change

| | | |
|---|---|---|
| Dec. 28, 2001 12:52 p | 1,062 | AudioMomentDescriptionChange.java |
| Dec. 28, 2001 12:52 p | 1,006 | AudioMomentReference.java |
| Dec. 28, 2001 12:52 p | 1,007 | AudioMomentRemove.java |
| Dec. 28, 2001 12:52 p | 796 | HostChange.java |
| Dec. 28, 2001 12:52 p | 780 | VersionChange.java |
| 5 File(s) | 4,651 bytes | |

Directory of F:\Send\Tools\Talks\src\jellyvision\uber1\model

| | | |
|---|---|---|
| Dec. 28, 2001 12:52 p | 800 | AliasCell.java |
| Dec. 28, 2001 12:52 p | 3,891 | AlphaNumericIDTable.java |
| Dec. 28, 2001 12:52 p | 835 | AssetInfo.java |
| Dec. 28, 2001 12:52 p | 8,340 | AudioMoment.java |
| Dec. 28, 2001 12:52 p | 2,819 | AudioMomentTable.java |
| Dec. 28, 2001 12:52 p | 3,447 | AudioVersion.java |
| Dec. 28, 2001 12:52 p | 5,002 | Cell.java |
| Dec. 28, 2001 12:52 p | 5,152 | CellTable.java |
| Dec. 28, 2001 12:52 p | 1,542 | CommandQueue.java |
| Dec. 28, 2001 12:52 p | 729 | ComplexCell.java |
| Dec. 28, 2001 12:52 p | 995 | ConditionAlias.java |
| Dec. 28, 2001 12:52 p | 13,554 | ConditionCell.java |
| Dec. 28, 2001 12:52 p | 15,111 | Context.java |
| Dec. 28, 2001 12:52 p | 1,437 | Controller.java |
| Dec. 28, 2001 12:52 p | 2,789 | DefaultComplexCell.java |
| Dec. 28, 2001 12:52 p | 2,568 | DeleteCommand.java |
| Dec. 28, 2001 12:52 p | 3,653 | DialogueCell.java |
| Dec. 28, 2001 12:52 p | 1,675 | DragAudioMomentInfo.java |
| Dec. 28, 2001 12:52 p | 2,224 | FlowchartSync.java |
| Dec. 28, 2001 12:52 p | 898 | MediaSync.java |
| Dec. 28, 2001 12:52 p | 640 | MediaType.java |
| Dec. 28, 2001 12:52 p | 1,767 | ModelUndoCommand.java |
| Dec. 28, 2001 12:52 p | 734 | NodeType.java |
| Dec. 28, 2001 12:52 p | 4,675 | ProjectFile.java |
| Dec. 28, 2001 12:52 p | 4,605 | ProjectFileUI.java |
| Dec. 28, 2001 12:52 p | 1,550 | ReDeleteCommand.java |
| Dec. 28, 2001 12:52 p | 966 | SingleLinkAlias.java |
| Dec. 28, 2001 12:52 p | 4,117 | SingleLinkCell.java |
| Dec. 28, 2001 12:52 p | 3,822 | SinglePath.java |
| Dec. 28, 2001 12:52 p | 2,110 | StateCommand.java |
| Dec. 28, 2001 12:52 p | 1,005 | UndoController.java |
| Dec. 28, 2001 12:52 p | 1,942 | UndoNames.java |
| Dec. 28, 2001 12:52 p | 1,225 | XMLTags.java |
| 33 File(s) | 106,619 bytes | |

Directory of F:\Send\Tools\Talks\src\jellyvision\uber1\model\change

| | | |
|---|---|---|
| Dec. 28, 2001 12:52 p | 851 | AliasChange.java |
| Dec. 28, 2001 12:52 p | 934 | AliasChangeCondition.java |
| Dec. 28, 2001 12:52 p | 880 | AudioMomentDescriptionChange.java |
| Dec. 28, 2001 12:52 p | 1,054 | AudioMomentRemove.java |
| Dec. 28, 2001 12:52 p | 776 | CellCommand.java |
| Dec. 28, 2001 12:52 p | 1,790 | CellCreated.java |
| Dec. 28, 2001 12:52 p | 1,075 | ConditionAdd.java |

-continued

| | | |
|---|---|---|
| Dec. 28, 2001 12:52 p | 868 | ConditionDescriptionChange.java |
| Dec. 28, 2001 12:52 p | 985 | ConditionRemove.java |
| Dec. 28, 2001 12:52 p | 795 | HostChange.java |
| Dec. 28, 2001 12:52 p | 1,887 | LinkChange.java |
| Dec. 28, 2001 12:52 p | 947 | OptionCommand.java |
| Dec. 28, 2001 12:52 p | 875 | OptionDescriptionChange.java |
| Dec. 28, 2001 12:52 p | 2,100 | OptionLinkChange.java |
| 14 File(s) | 15,817 bytes | |

Directory of F:\Send\Tools\Talks\src\jellyvision\uber1\playback

| | | |
|---|---|---|
| Dec. 28, 2001 12:52 p | 6,147 | DisplayDocument.java |
| Dec. 28, 2001 12:52 p | 4,355 | Playback.java |
| Dec. 28, 2001 12:52 p | 650 | PlayCell.java |
| Dec. 28, 2001 12:52 p | 3,621 | PlayCondition.java |
| Dec. 28, 2001 12:52 p | 4,872 | PlayDialogue.java |
| Dec. 28, 2001 12:52 p | 3,398 | RandomNoRepeat.java |
| Dec. 28, 2001 12:52 p | 2,894 | TextDisplay.java |
| Dec. 28, 2001 12:52 p | 2,854 | TimeLine.java |
| 8 File(s) | 28,791 bytes | |

Directory of F:\Send\Tools\Talks\src\jellyvision\uber1\utils

| | | |
|---|---|---|
| Dec. 28, 2001 12:52 p | 3,169 | AudioPlayer.java |
| Dec. 28, 2001 12:52 p | 2,319 | CenterDeleteString.java |
| Dec. 28, 2001 12:52 p | 1,863 | DragLinkStart.java |
| Dec. 28, 2001 12:52 p | 2,065 | DragLinkTarget.java |
| Dec. 28, 2001 12:52 p | 1,624 | GlassPane.java |
| Dec. 28, 2001 12:52 p | 1,508 | ReadOnlyListIterator.java |
| Dec. 28, 2001 12:52 p | 1,661 | StyleRun.java |
| Dec. 28, 2001 12:52 p | 3,310 | TextMeasure.java |
| Dec. 28, 2001 12:52 p | 4,808 | UberIcon.java |
| Dec. 28, 2001 12:52 p | 1,558 | Utilities.java |
| 10 File(s) | 23,885 bytes | |

Total Files Listed:

| | |
|---|---|
| 1505 File(s) | 12,813,537 bytes |
| 0 Dir(s) | 0 bytes free |

BACKGROUND

Flowcharts are often used to show a graphical representation of cells. Flowcharts can be prepared by hand using pencil and paper or can be prepared electronically using a computer. Some software applications require a user to build a flowchart by drawing graphical shapes and then typing text into each graphical shape. If there are many branches in the flowchart, it can be difficult for a user to isolate a single path among the various paths. This can happen, for example, if the user is creating a flowchart to structurally represent a multimedia experience since a reasonably sophisticated experience can generate a flowchart that is quite large and unwieldy, with hundreds or thousands of cells and complex branching between the cells. Another difficulty encountered with structurally representing a multimedia experience is that creating a flowchart using existing tools can pull creative focus away from developing the experience. One approach to author-centric multimedia creation is presented in U.S. Pat. No. 6,100,881 to Gibbons et al. However, among its deficiencies as a multimedia creation tool, the approach described in Gibbons et al. is not directed to flowcharts.

There is a need, therefore, for a method that can be used to overcome the disadvantages discussed above.

SUMMARY

The present invention is defined by the following claims, and nothing in this section should be taken as a limitation on those claims.

By way of introduction, the preferred embodiments described below provide methods for identifying cells in a path in a flowchart and for synchronizing graphical and textual views of a flowchart. In one preferred embodiment, a method for identifying cells in a path in a flowchart is provided comprising the acts of displaying a flowchart comprising a plurality of cells, selecting a cell in the flowchart, determining a path comprising the selected cell, and identifying at least some of the cells in the path. In another preferred embodiment, a method for synchronizing graphical and textual views of a flowchart is provided. This method comprises the acts of displaying a graphical view of a flowchart comprising a plurality of cells in a first display region, displaying a textual view of at least some cells in the flowchart in a second display region, and in response to input received in either the first or second display regions, applying the input to both the first and second display regions. Other preferred embodiments are provided, and each of the preferred embodiments can be used alone or in combination with one another.

The preferred embodiments will now be described with reference to the attached drawings.

DETAILED DESCRIPTION OF THE PRESENTLY PREFERRED EMBODIMENTS

Introduction

The preferred embodiments described herein are preferably implemented using software and/or hardware components. For example, the preferred embodiments can be implemented with a software application (i.e., computer-readable program code) running on a processor of a general-purpose computer. Alternatively, some or all of the functionality of the application can be implemented with application-specific hardware components. For simplicity, the term "application" shall be used herein to refer generally to the entity (be it software and/or hardware) used to implement the preferred embodiments described below. The term "tool" shall be used interchangeably with the term "application."

Figure 1:
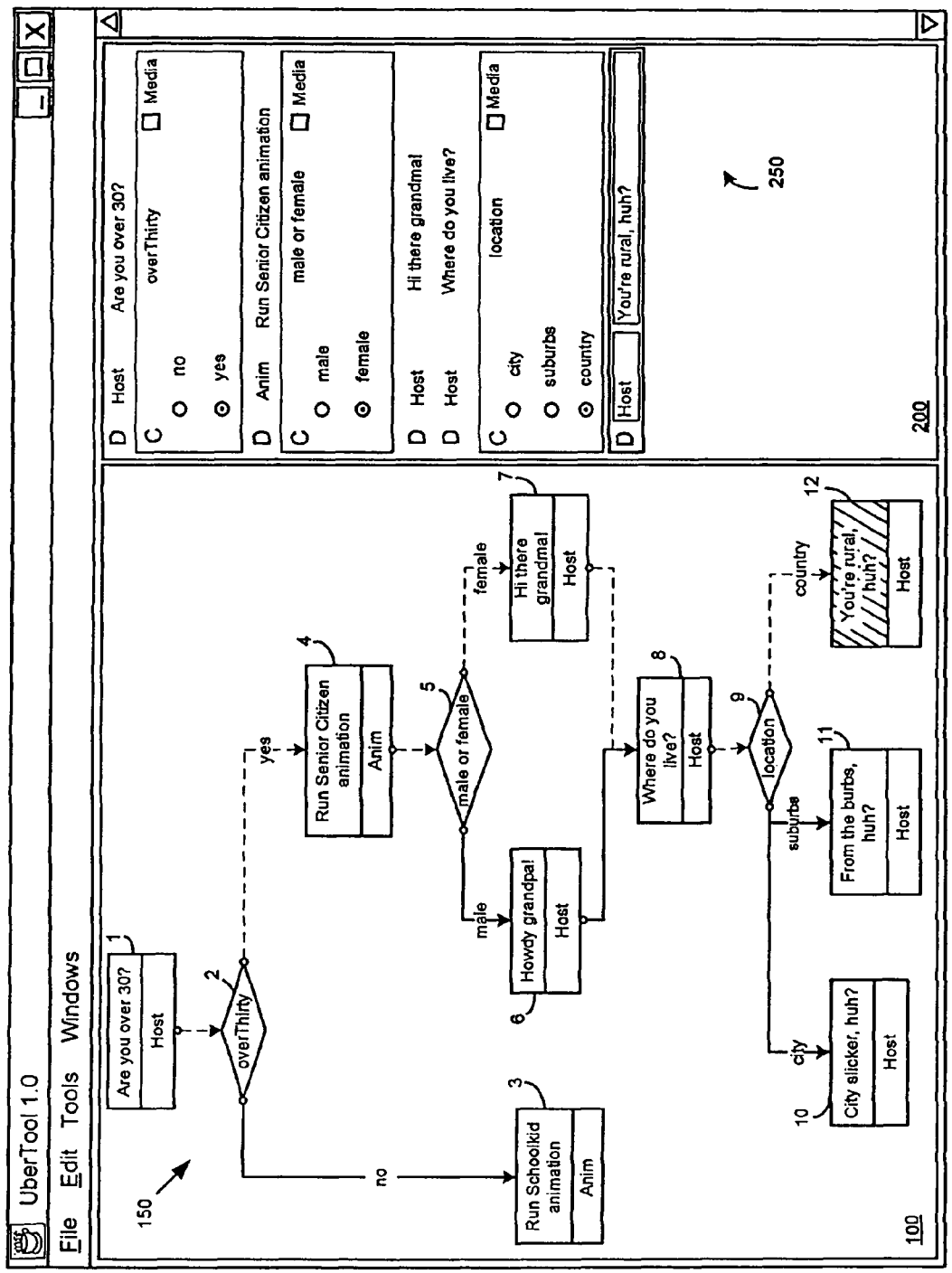
FIG. 1 is an illustration of a preferred embodiment in which a path from cell 1 to cell 12 is identified in first and second display regions.

Turning now to the drawings, FIG. 1 is an illustration of a display output of an application of a preferred embodiment. Here, the application displays two display regions 100, 200. As used herein, the term "display region" refers to an area of display on one or more display devices (e.g., computer monitors). Each display region 100, 200 can be a separate window, or the display regions 100, 200 can be different areas in a single window. The first and second display regions 100, 200 can be fixed or movable and can be non-overlapping (as in FIG. 1) or can overlap each other. Additionally, the first and second display regions 100, 200 can be alternately shown (one than the other) in response to a command from the application and/or in response to a command from the user. The first display region 100 will sometimes be referred to herein as the "Structure Window," and the second display region 200 will sometimes be referred to herein as the "Script Window."

As shown in FIG. 1, the application displays a flowchart 150 in the first display region 100. As used herein, the term "flowchart" refers to a series of linked graphical symbols or cells. The lines in the flowchart show how the cells are interconnected, and the cells are arranged in the flowchart in the order in which they are traversed in operation. The first display region 100 is referred to as the "Structure Window" because it displays the graphical representation (i.e., the cells and the connecting lines) of the flowchart 150. In FIG. 1, the flowchart 150 is displayed in its entirety in the first display region 100. It should be noted that a flowchart is displayed in the first display region 100 even if only part of the flowchart is visible at one time in the first display region 100. For example, if the flowchart were larger than the first display region 100, only a portion of the flowchart would be visible in the first display region 100. In this situation, a scroll bar and/or other navigation devices can be provided in the first display region 100 to allow a user to select which part of the flowchart is visible.

The flowchart 150 in FIG. 1 comprises a plurality of cells (cells 1-12), some of which are rectangular-shaped and others of which are diamond-shaped. The rectangular-shaped cells are referred to herein as "simple cells," and the diamond-shaped cells are referred to herein as "conditional cells." A simple cell is a cell that contains a single branching link to a single cell. For example, in the flowchart 150 shown in FIG. 1, simple cell 4 branches to conditional cell 5, and simple cell 6 branches to simple cell 8. Unlike a simple cell, a conditional cell contains multiple branching links to multiple cells. The branching links are associated with conditions necessary for that branching link to be followed. For example, in the flowchart 150 shown in FIG. 1, conditional cell 5 branches to simple cells 6 and 7. The branch to simple cell 6 is followed if the condition "male" is true, while the branch to simple cell 7 is followed if the condition "female" is true. It should be noted that a cell can contain two or more individual cells (simple cells or conditional cells). Such a cell is referred to herein as a "group cell" and can be used to simplify the display of a flowchart by grouping multiple cells together in a single cell. In addition to simple and conditional cells, a group cell can contain other group cells (i.e., groups cells can be nested) and other types of cells, such as "go to" cells, "alias" cells, and other types of cells described in the next paragraph. "Go to" cells can be used instead of a line to show the flow from that cell to another cell. In this way, "go to" cells can be used to keep a flowchart clean and readable. "Alias" cells can be used to mimic the function/operation of another cell.

The cells in a flowchart can contain any suitable content. For example, as in a traditional flowchart drawn on paper, a cell can contain text. A cell can also contain instructions that are implemented by the application (or by another application) when the cell is "played." For example, a cell can contain an instruction to trigger a piece of media, gather user input, generate visual or oral information, send/receive information or media to a database, process data, perform a calculation, or perform other functions, such as describing how and when media should be played. Examples of media assets include, but are not limited to, digital audio/video objects representing still art, animation, graphics, on-screen text, music, sound effects, or voiceover dialog. Different cells can have different durations. For example, some cells can be played after a previous cell initiates its function, while other cells can be played after a previous cell finishes its function. (The timing of a cell can also be based on a time X before or after the beginning or end of a cell, and one cell can be played simultaneously with another cell. Timing can also be based off of a common clock. Other timing mechanisms can be used.) A cell can also provide selection choices to a user and evaluate which choice was selected. For example, when conditional cell 2 in FIG. 1 is played, the user is prompted to input "yes" or "no" using a user interface device, such as a keyboard, mouse, microphone, remote control, or any other type of device. Conditional cell 2 also determines whether the user input is "yes" or "no." If the user input is "yes," the branch leading to cell 4 is followed, and the application runs a file called "Senior Citizen animation."

When played, the cells in the flowchart 150 of FIG. 1 provide an interactive multimedia experience for a user. In this example, the interactive multimedia experience takes the form of an interactive conversation interface in which responses are collected from a user using an interface that simulates a real-life conversation. When the flowchart is played from its beginning, the user first hears a voice asking whether the user is over 30. Depending on the user's response, an animation of a school kid or an animation of a senior citizen is played. If the user is over 30, the user is also asked if the user is male or female. If the user is male, an audio file voicing the phrase "Howdy Grandpa" is played; if the user is female, an audio file voicing the phrase "Hi there Grandma" is played. The interactive conversation interface can be used to communicate ideas and information in an audio and/or visual environment, such as interactive computer games, commercials, guided tours, auctions, stories, and news, health, or financial services. The interface can be implemented with wired or wireless equipment that includes both audio and video output devices (such as a home computer or television) as well as with equipment that includes only an audio output device (such as a conventional telephone) or only a video output device. It is important to note that these preferred embodiments can be used in flowchart applications that are unrelated to an interactive multimedia experience.

Accordingly, a specific type of cell should not be read into the claims unless explicitly recited therein.

Returning to FIG. 1, the second display region 200 (the Script Window) contains a textual view 250 of some of the cells (cells 1, 2, 4, 5, 7, 8, 9, and 12) in the order in which the cells appear in the flowchart 150. The textual view shows a "description" of a cell (e.g., the text that is contained in a cell, the line of dialogue that will be voiced, the description of the animation or of the SFX that will be played, etc.). The content displayed in the textual view 250 can also contain other cell "properties," such as the font of displayed text, the name of the actor who will provide the media content, the cell's timing relative to other cells, the volume at which audio content of the cell should be played, the frames per second of animation, and other information. Cell properties can also be displayed in a third display region. It should be noted that the "textual" view can also contain graphics. For example, the textual view 250 in FIG. 1 contains radio buttons. As another example, text of the cell can also be supported with a graphics button next to the text that indicates the type of media in the cell (e.g., a button with a little horn indicating a SFX) and is clickable to open a properties window of the cell, to playback the media, or to perform other functions.

Embodiments Related to Identifying Cells in a Path in a Flowchart

Cells 1, 2, 4, 5, 7, 8, 9, and 12 in FIG. 1 represent one of many paths in the flowchart 150. As used herein, the term "path" refers to at least two cells in the flowchart that are connected to each other. In FIG. 1, the path contains the first and last cells in the flowchart 150 (cells 1 and 12). However, a path does not necessarily need to include the first and/or last cells. When a flowchart contains many paths, it can be difficult for a user to follow the cells along a single path, and cells along a path can be identified in a way to assist a user in following the path in the flowchart. In FIG. 1, cells along a path are identified by displaying the lines linking the cells differently (e.g., in a different color, shading, or thickness) than the lines linking cells that are not along the path. (In FIG. 1, the selected path is the lightest path.) Additionally, the content of the cells along the path is displayed in the second display region 200 to allow a user to read through the content of those cells in isolation from the cells in the other paths. As described in more detail below, other techniques can be used to identify cells along a path. For example, the borders of the cells along a path and their branches can be displayed with thicker lines in the first display region 100.

To identify cells in a path, a user can individually select each of the cells along a desired path. With reference to the illustration in FIG. 1, this would require a user to individually select cells 1, 2, 4, 5, 7, 8, 9, and 12. As can be seen even from the simple flowchart 150 in FIG. 1, individually selecting cells along a path can be time consuming. To facilitate the selection of a path in the flowchart, the application preferably implements a method to identify cells in a path based on the selection of a single cell. With this method, after the application displays a flowchart, a user selects a single cell. In the flowchart 150 displayed in FIG. 2, a user uses a pointing device (such as a mouse or trackball) to move a pointer 30 over a desired cell in the flowchart 150 and then selects that cell by pressing a selector switch (such as the mouse button). The user can select a cell using any other type of user interface device. For example, if the cells are numbered, the user can select a cell by typing in the cell number using a keyboard or by speaking the number of the cell into a microphone. Additionally, instead of the user selecting a cell, the application can automatically select a cell (e.g., based on the output of some operation being run by the application or based on the output sent to the application by another application). In this example, cell 3 is selected.

Next, the application determines a path comprising the selected cell. In this preferred embodiment, the selection of a single cell is used to isolate the cells above and below the selected cell to form a single path based on the history of the cell and the history of the cells above and below it in succession. In operation, the application builds a path by determining which cells above and below a given cell were selected the last time that the given cell was selected. A path made from cells selected in this manner is referred to herein as "the last selected path." The operation of this preferred embodiment will now be illustrated in conjunction with FIGS. 1 and 2. When a user selects cell 3 in FIG. 2, the application "walks" the flowchart to identify the cells below and above the selected cell. The application recognizes that cell 3 is the last cell in the path because there are no cells below cell 3 in the flowchart 150. Additionally, the application remembers that the last time cell 3 was selected, cell 2 was in the selected path directly above cell 3, and that the last time cell 2 was selected, cell 1 was in the selected path directly above cell 2.

Figure 2:
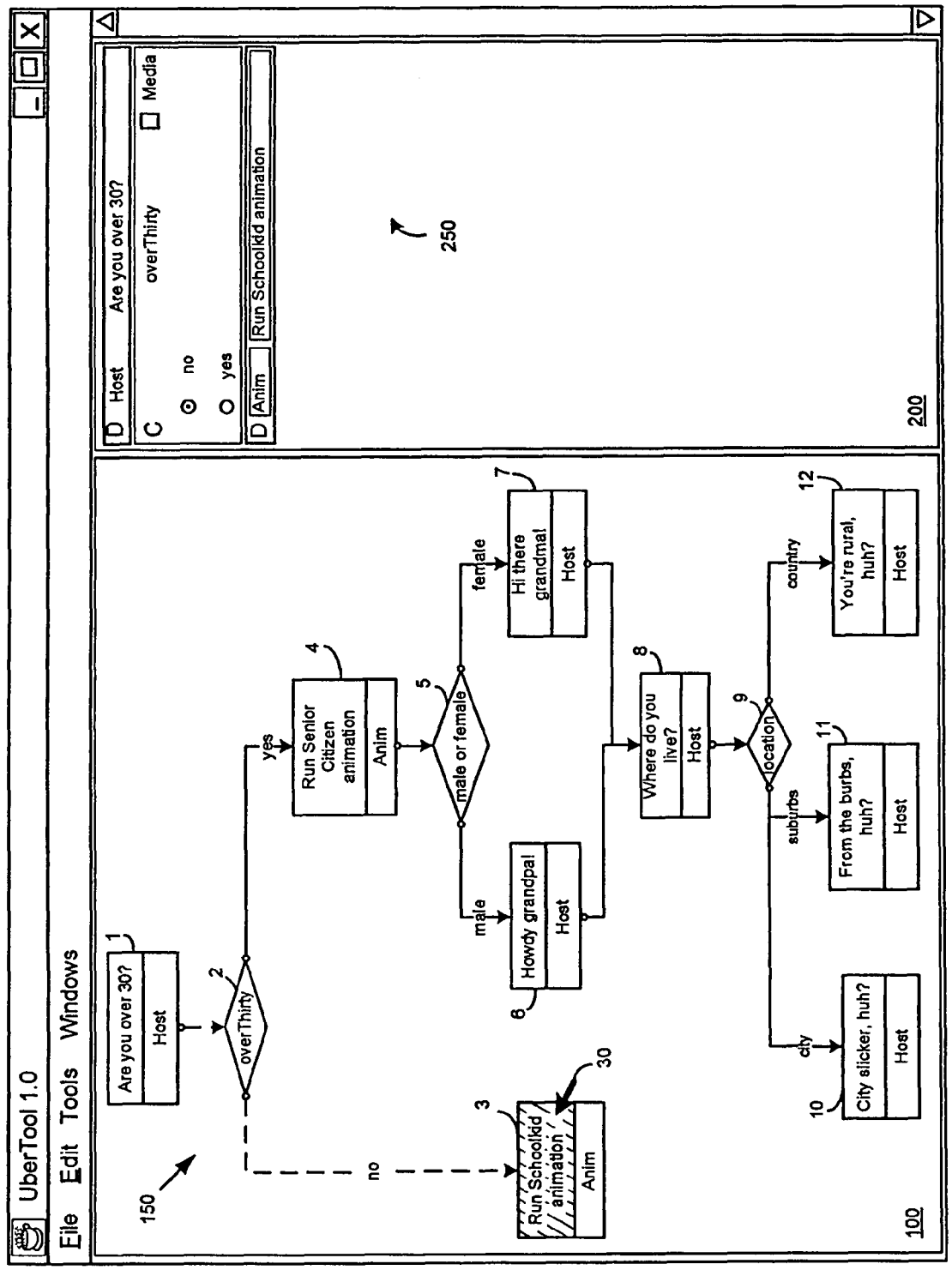
FIG. 2 is an illustration of a preferred embodiment in which a path from cell 1 to cell 3 is identified in first and second display regions.

After the path has been determined, at least some of the cells in that path are identified. In FIG. 2, the lines linking the cells in the path are different from those linking cells that are not in the path. Of course, other techniques of identifying the cells can be used. For example, cells can be displayed in a different color or otherwise highlighted, such as when the borders of cells in the determined path are displayed with thicker lines. Additionally, cells can be identified by changing their size with respect to other cells, such as when the identified cells are enlarged and/or the other cells are reduced in size. The application can also temporarily align the identified cells vertically to create the appearance of an additional display area in the first display region 100. In FIG. 2, the cells in the path are also identified by displaying a textual view of the cells in the second display region 200. It should be noted that while FIG. 2 identifies the cells along the path in two ways (by displaying the lines linking the cells in the path differently and by displaying a textual view of the cells in the second display region 200), the path can be identified using only one of these techniques or by using an additional technique. For example, a copy of the flowchart 150 can be displayed where only the cells in the path are visible and the cells that are not on the path are hidden.

Figure 3:
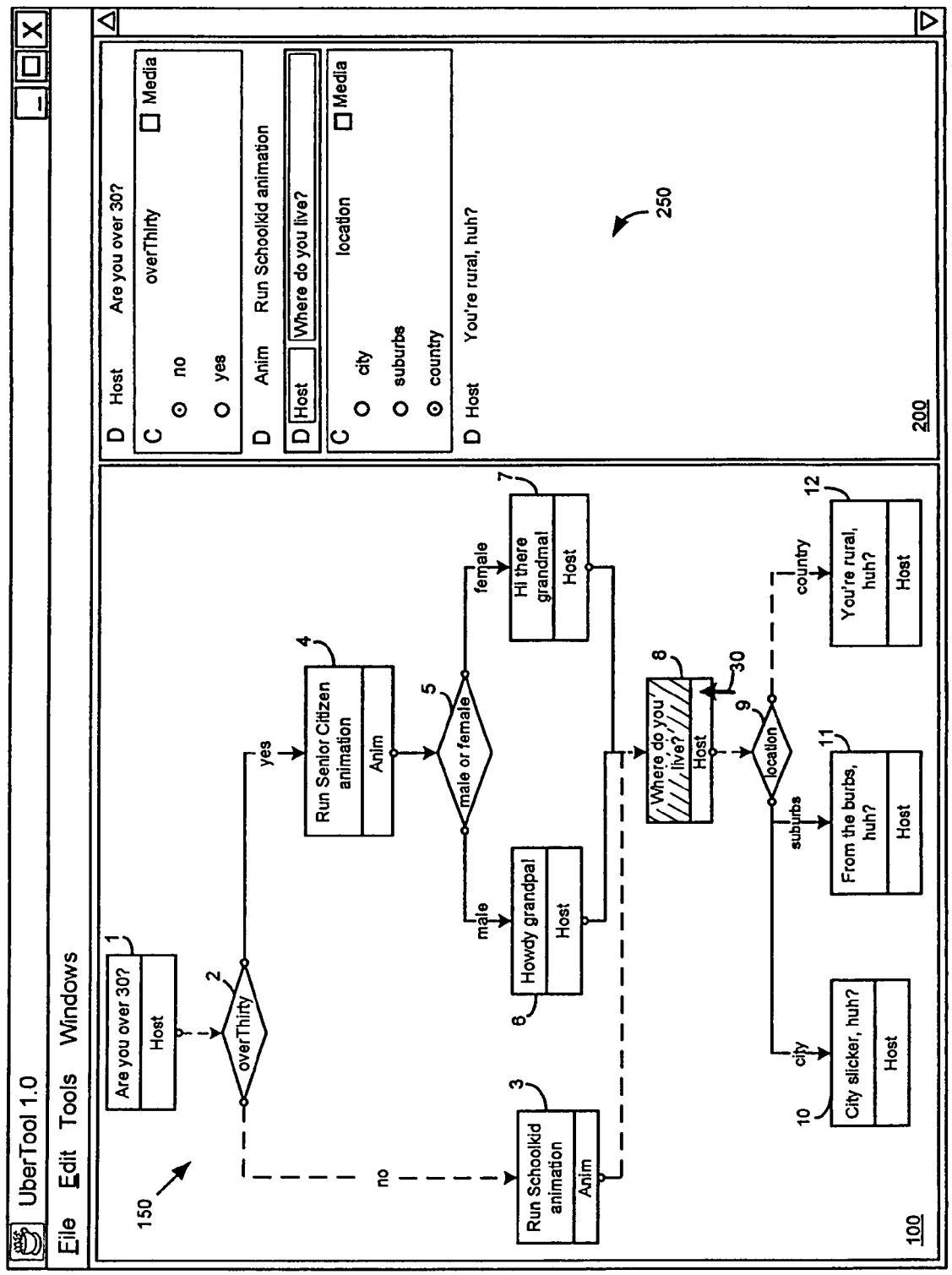
FIG. 3 is an illustration of a preferred embodiment in which a path from cell 1 to cell 12 is identified in first and second display regions.

Returning to the drawings, FIG. 3 shows the display output after the user connects cell 3 to cell 8. Cell 8 is now the selected cell by virtue of it being the end of the new connection. The application remembers that the last time cell 3 was on the selected path (see FIG. 2), cell 2 was in the selected path directly above cell 3, and cell 1 was in the selected path directly above cell 2. The application also remembers that the last time cell 8 was on the selected path (see FIG. 1), cell 9 was in the selected path directly below cell 8, and the last time cell 9 was on the selected path (see FIG. 1), cell 12 was in the selected path directly below cell 9. The cells along this determined path are identified as before. Assume that the user now selects cell 10 (see FIG. 4). The application determines that the path above cell 10 is the same as before, and, since there are no cells below cell 10, the selected path ends at cell 10.

Figure 4:
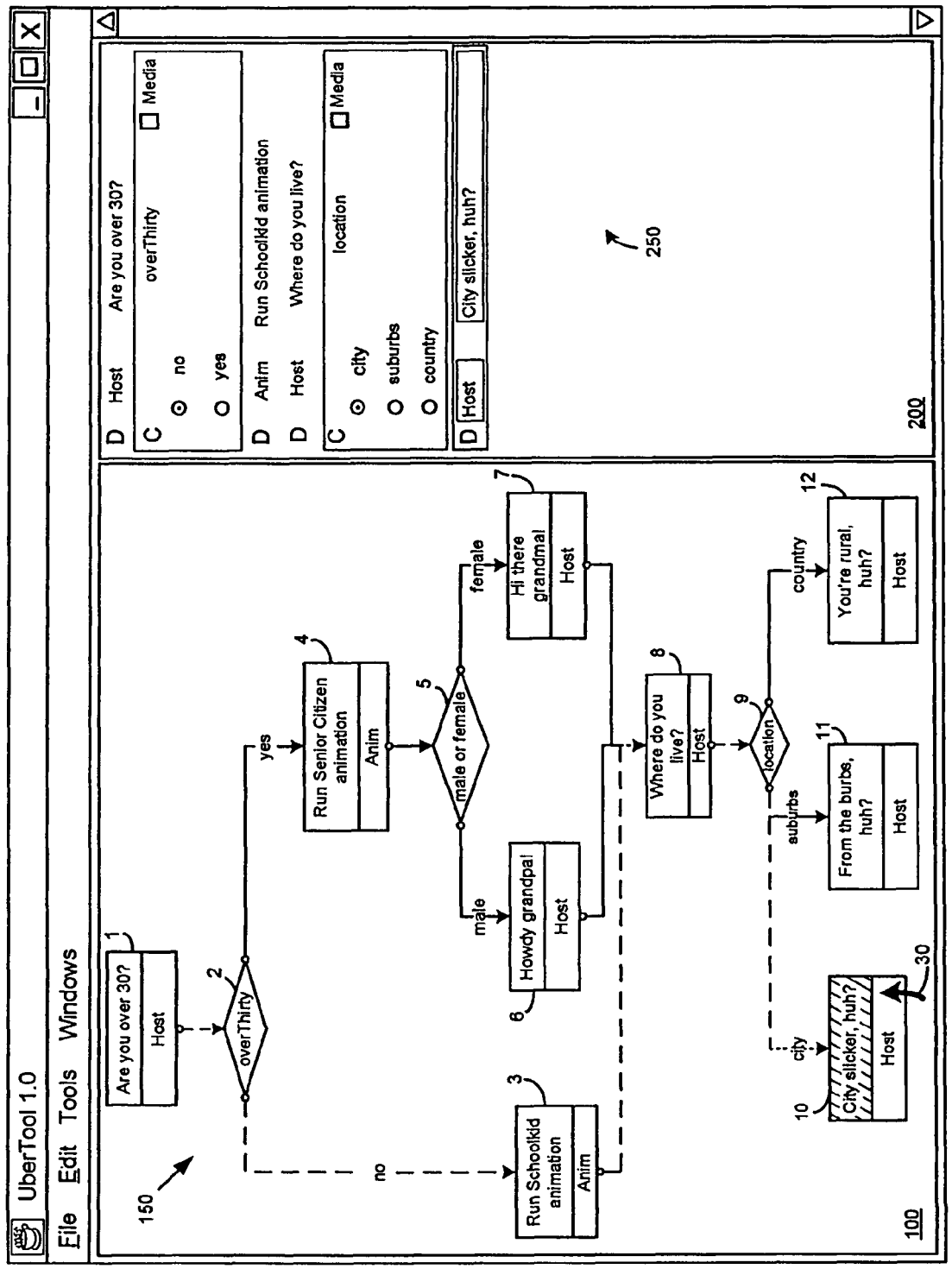
FIG. 4 is an illustration of a preferred embodiment in which a path from cell 1 through cell 3 to cell 10 is identified in first and second display regions.
Figure 5:
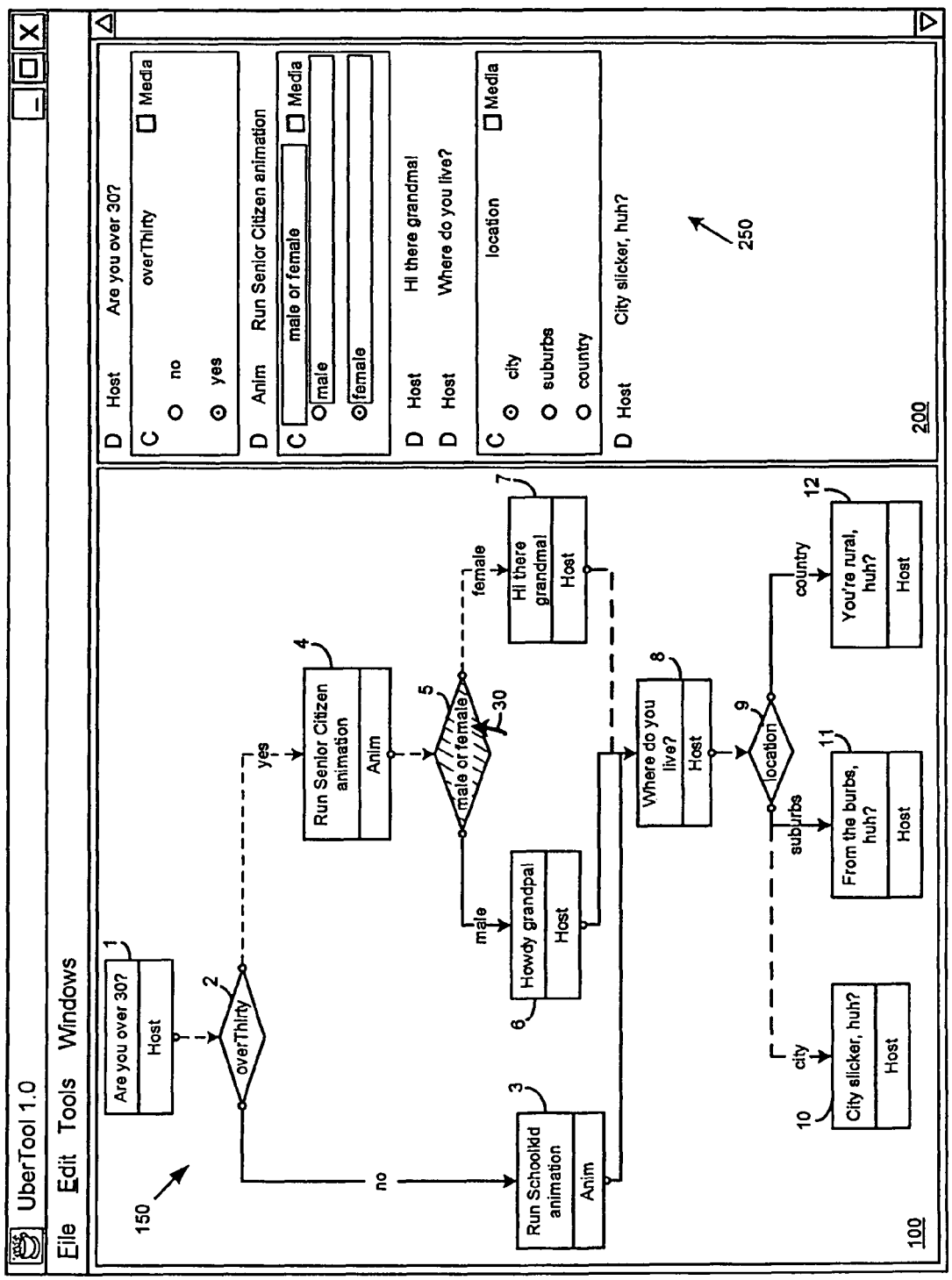
FIG. 5 is an illustration of a preferred embodiment in which a path from cell 1 through cell 7 to cell 10 is identified in first and second display regions.

In this example, if the user selects any cell along the currently-selected path (e.g., cell 9 in FIG. 4), the selected path does not change. If, however, the user selects a cell not along the currently-selected path, such as cell 5, the application will remember that (1) the last time cell 5 was on the selected path (see FIG. 1), cell 4 was in the selected path directly above cell 5; (2) the last time cell 4 was on the selected path (see FIG. 1), cell 2 was in the selected path directly above cell 4; and (3) the last time cell 2 was on the selected path (see FIG. 4), cell 1 was in the selected path directly above cell 2. The application also remembers that (1) the last time cell 5 was on the selected path (see FIG. 1), cell 7 was in the selected path directly below cell 5; (2) the last time cell 7 was on the selected path (see FIG. 1), cell 8 was in the selected path directly below cell 7; (3) the last time cell 8 was on the selected path (see FIG. 4), cell 9 was in the selected path directly below cell 8; and (4) the last time cell 9 was on the selected path (see FIG. 4), cell 10 was in the selected path directly below cell 9. The cells on this path are identified in the first display region 100 and the second display region 200 as shown in FIG. 5.

There are several alternatives that can be used. For example, instead of selecting the last selected path, a path can be determined based on the most-frequently selected path containing the selected cell. Other methods can be used. For example, of the many paths that contain the selected cell, the application can choose the path that most recently contained the selected cell. As another example, the application can randomly determine a path comprising the selected cell or can semi-randomly determine a path comprising the selected cell, such as when part of the path is selected based upon some form of logic (e.g., most frequently selected links three cells above and below the selected cell), but the rest of the path is selected at random (e.g., all other links are selected randomly).

In the embodiment discussed above, all of the cells in a path are determined, and all of those cells are identified. In one alternate embodiment, all of the cells in a path are determined, but only some of those cells are identified. For example, for a determined path that contains both a beginning cell and an end cell, the beginning cell and/or end cell need not be identified along with the other cells in the path. In another alternate embodiment, only some of the cells in a path are determined. For example, if cell 5 in FIG. 4 is selected, instead of determining which cells are both above and below cell 5 on the path from the first cell to the last cell in the flowchart, the application can determine, for example, only the cells in the path that are above cell 5, only the cells in the path that are below cell 5, or only the cells that are X cells above and below cell 5. Some or all of these cells in the determined path can then be identified.

In another alternate embodiment, instead of selecting a single cell in the flowchart, at least one additional cell is selected, and the application determines a path comprising the selected cell and the at least one additional cell. In a variation of this alternate embodiment, a user can establish a "master" cell and then select one or more additional cells. The application would then find a path between the master cell and the selected cell(s). Additionally, a path can be determined "manually" when the path determined by the application is merely a plurality of cells selected by a user.

Instead of determining a single path comprising the selected cell, some or all of the possible paths can be determined. One or more of these paths can be selected, and at least some of the cells in the selected path(s) can be identified. For example, the application can display the cells of every possible path that can lead up to and out of a selected cell, and a user could additionally select from a pop-up menu to make one or more paths pop-out. In another alternative, in addition to the single path, the application can determine N additional path(s) comprising the selected cell. At least some of the cells in each of the determined paths can be identified. In this way, the application can display the cells of the last three selected paths coming in to or out of a selected cell (e.g., the textual view can show three columns, with the most current path displayed in the left-most column). As another example, when selecting a "new" current path, the cells of the "last" path can remain displayed (e.g., in a different color). In this way, there are always at least two selected paths, and the cells in the last path are identified along with the cells in the new path.

In yet another alternate embodiment, an additional display region (an "Adjacencies View") displays a textual view of all the cells that lead into a selected cell and all the cells that lead out of it (i.e., the cells that fan-in/fan-out from the selected cell). The top row displays the content of the fan-in cells, the middle row displays the content of the selected cell, and the bottom row displays the content of the fan-out cells. In still another alternate embodiment, the application displays another display region that plays the output of the cells in the flowchart one cell at a time as the cells are played back. When a conditional cell is encountered, a user is prompted for input, and cells along the corresponding branch are played. The application remembers the cells that were played back and can identify some or all of these cells in the structure and/or script views.

Embodiments Related to Synchronizing Graphical and Textual Views of a Flowchart

In creating a flowchart, the content of the cells can be entered in the flowchart itself. For example, a rectangular-shaped cell can be created, and a user can type text directly in that rectangular-shaped cell. Entering text in this manner can be difficult for some users. To overcome this problem, the preferred embodiments described below provide a text-entry process to drive the creation and modification of a flowchart. By way of overview, the application displays two display regions: one displaying a graphical view of a flowchart and the other displaying a textual view of at least some cells in the flowchart. In response to input received in either the first or second display regions, the application applies the input to both the first and second display regions, thereby synchronizing the graphical and textual views of the flowchart. FIGS. 6-11 will now be discussed to illustrate the operation of this preferred embodiment in creating a flowchart by incrementally entering data in cells along a path in the flowchart.

Figure 6A:
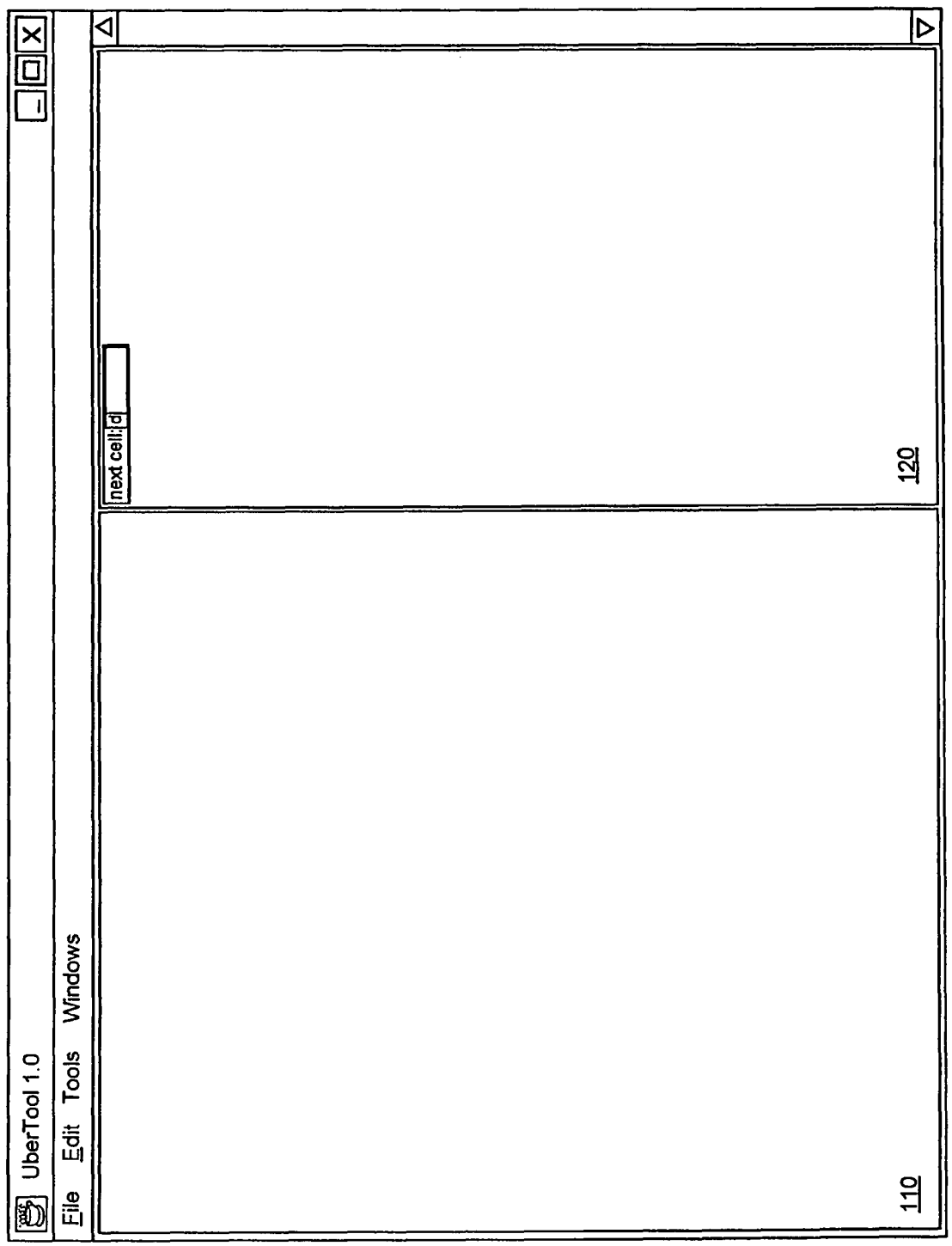
FIGS. 6A and 6B are illustrations of a preferred embodiment in which a new cell is inserted in Structure and Script Windows.
Figure 6B:
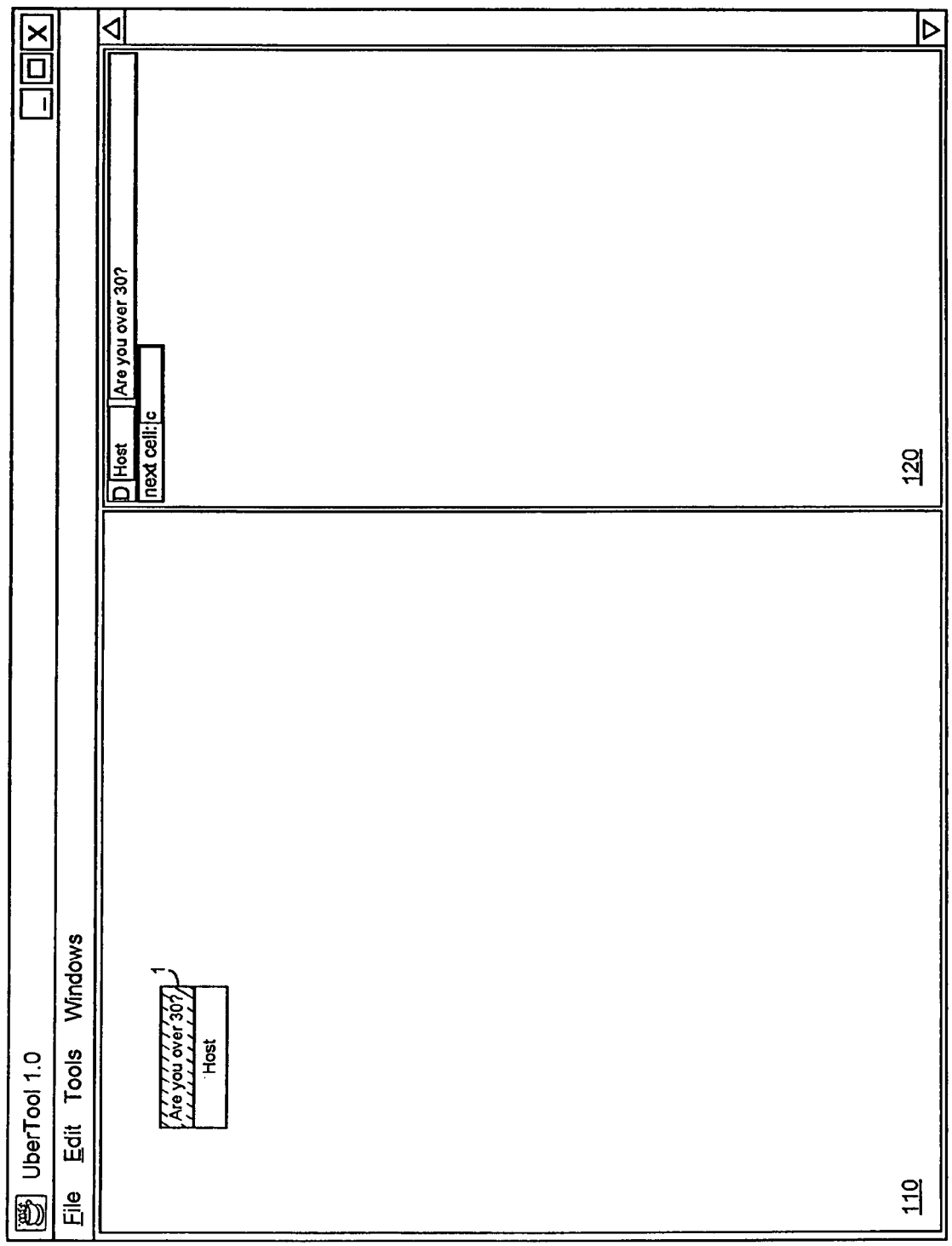

To create a flowchart, a user first creates a new project by selecting "New" from the File menu. After the user names the file, the application then presents two display regions: a Structure Window 110 and a Script Window 120 (see FIG. 6A). As in the embodiments described above, the Structure Window 110 is used to display a graphical view of a flowchart, and the Script Window 120 is used to display a textual view of at least some cells in a single path in the flowchart. In this embodiment, a user can create and manipulate cells in either the first or second display regions 110, 120. When a blank document opens, a "Next Cell Prompt" (NCP) is displayed, and the user enters the type of cell he wishes into the NCP. In this example, the user typed "D" to create a simple cell (see FIG. 6B). The user then can immediately start typing dialogue or other information into the simple cell. As shown in FIG. 6B, the user typed the dialogue "Are you over 30?" for the Host. In this preferred embodiment, while in a simple cell, hitting the return (or enter) key enters the text typed into the Script Window 120 into the corresponding cell on the Flowchart Window 110 and brings up another NCP in the Script Window 120 underneath the current text. In an alternate embodiment, the text typed into one window is simultaneously applied to the other window.

Figure 7:
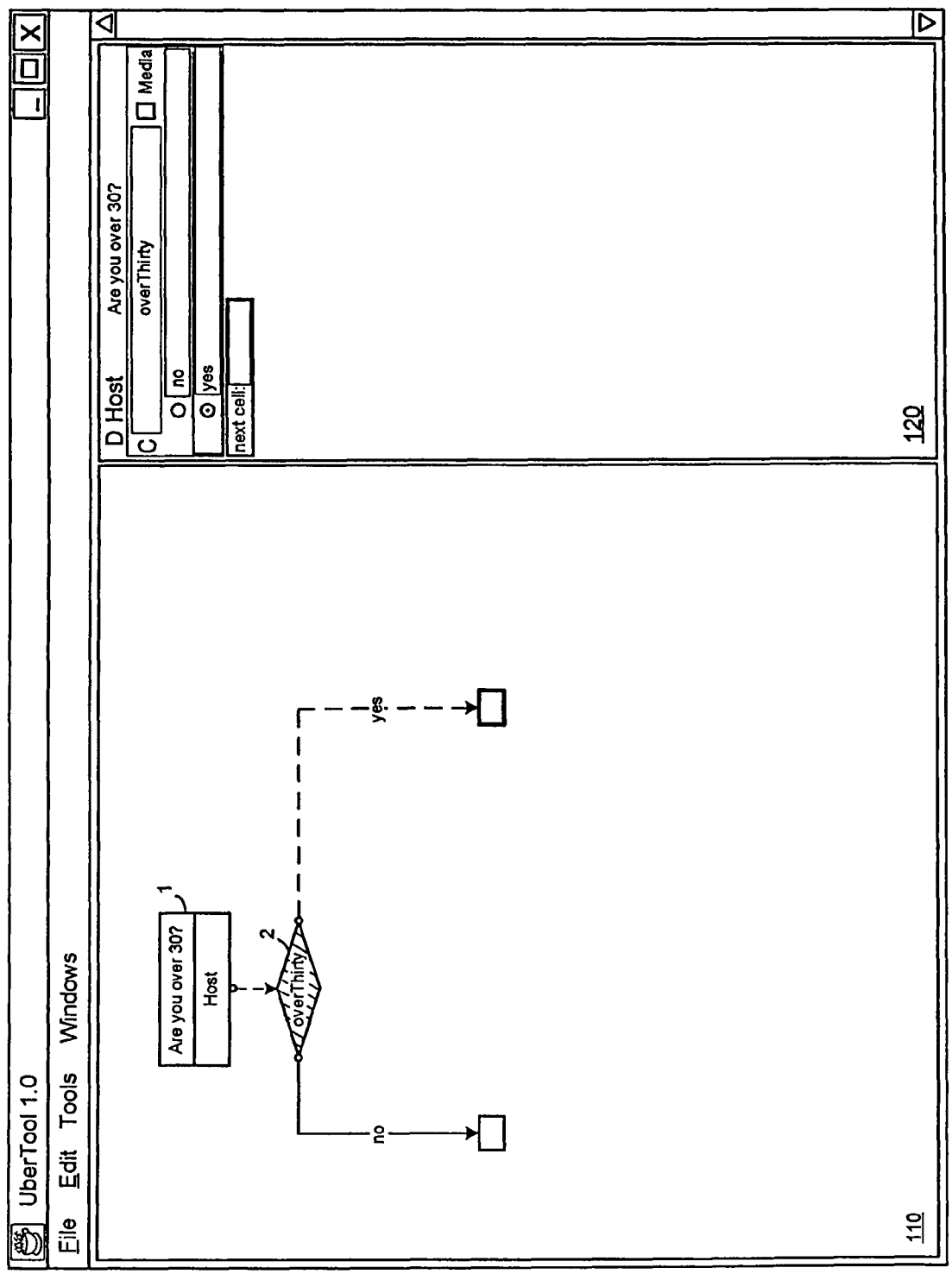
FIG. 7 is an illustration of a preferred embodiment in which a new conditional cell is inserted in Structure and Script Windows below the cell created in FIGS. 6A and 6B.

With reference again to example illustrated in FIG. 6B, the user next types "C" in the NCP to create a conditional cell. As shown in FIG. 7, the user can optionally create a label for the conditional cell (e.g., overThirty). The label can be used as a variable name into which user input is stored. For example, after the user responds to the "Are you over 30?" question, the variable <<overThirty>> will have a value of either "yes" or "no." As another example, when a conditional cell is labeled "male or female," the conditional cell can select a branch based on which value (male or female) is stored in the "male or female" variable in a database. With reference again to FIG. 7, the user then types in the conditions for the conditional cell (no, yes).

Figure 8:
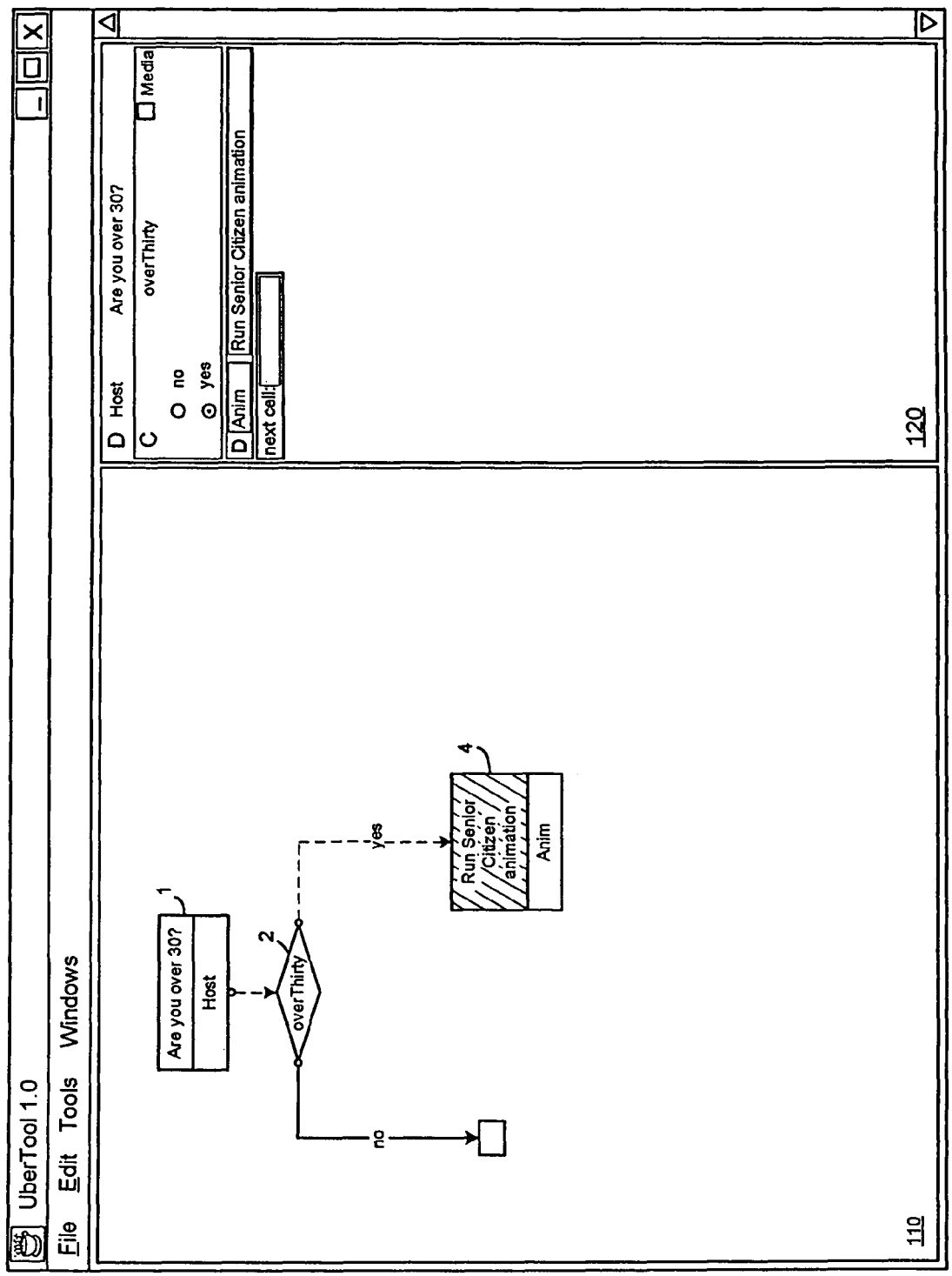
FIG. 8 is an illustration of a preferred embodiment in which a current path from the conditional cell created in FIG. 7 is indicated in both the Script Window and the Structure Window.
Figure 9:
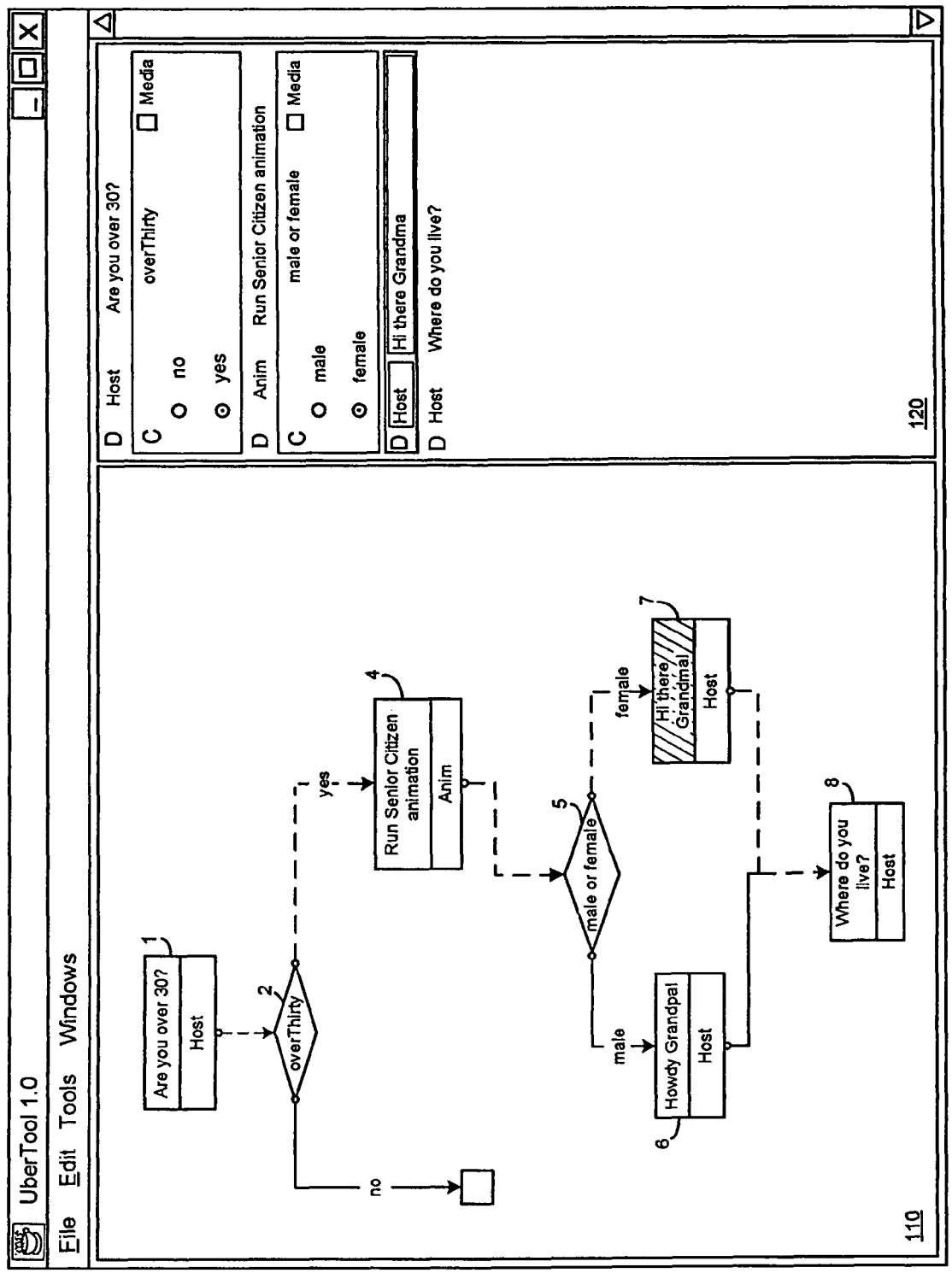
FIG. 9 is an illustration of a preferred embodiment in which additional cells have been created in the current path indicated in the Script Window of FIG. 8.
Figure 10:
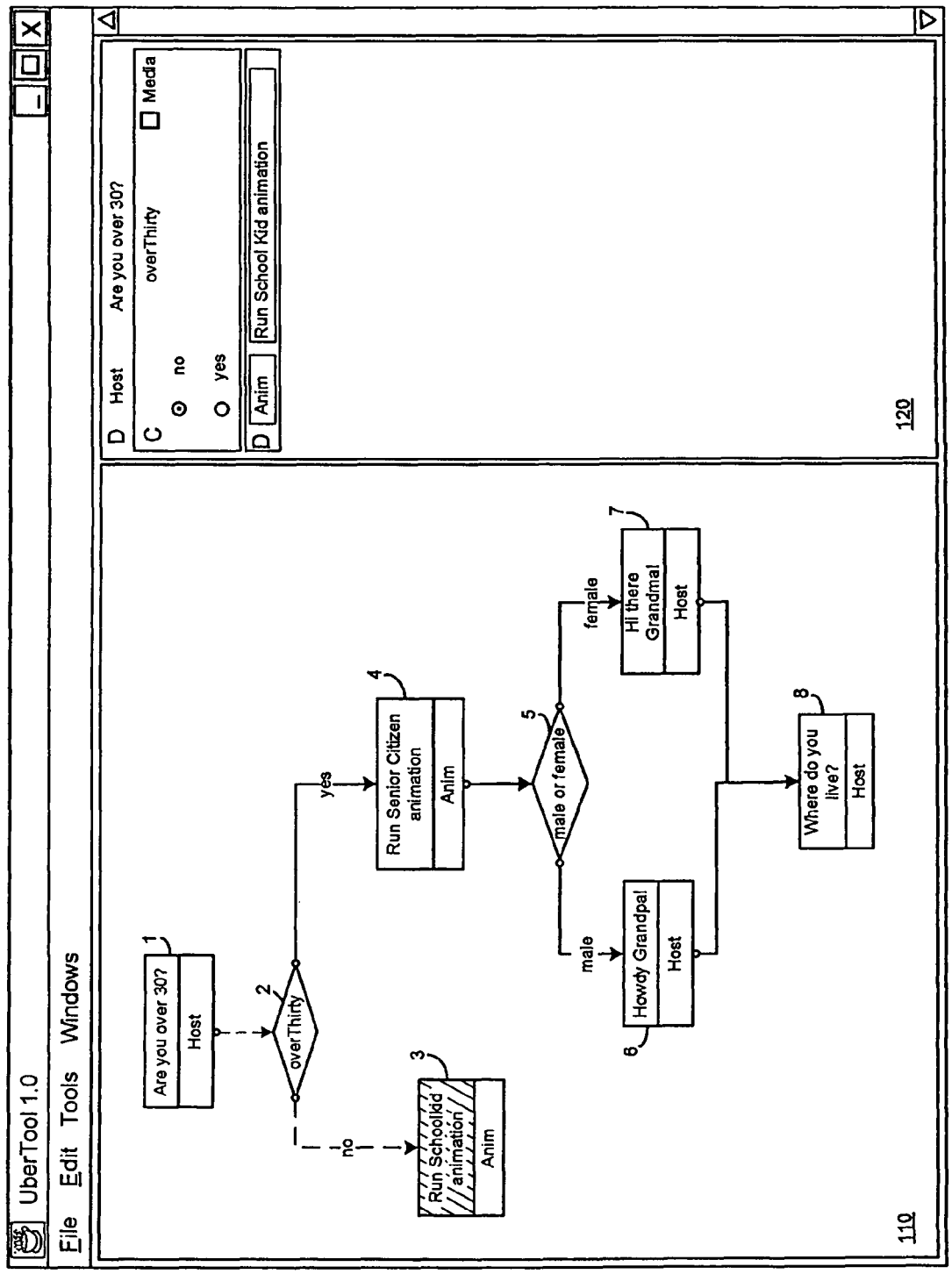
FIG. 10 is an illustration of a preferred embodiment in which a different path from the conditional cell created in FIG. 7 is indicated in both the Script Window and the Structure Window.

In this embodiment, the application assumes the writer wants to continue writing along the path of the last condition entered. The user continues creating cells along the path, as shown in FIGS. 8 and 9. To return to the "no" condition specified in cell 2 and create cells along that path, the user can either click on the "yes" radio button in the Script Window 120 or click on the cell below the "no" arrow in the Flowchart Window 110. The user can then add cell 3 to the flowchart, as shown in FIG. 10. Note that in this embodiment, the Script Window 120 shows only cells along a single path. Accordingly, only cells 1, 2, and 3 are shown in the Script Window 120 in FIG. 10. When the user selects cell 8, for example, the application determines the last-selected path using the embodiments described above, and the Script Window 120 resets itself to show this single path leading down to cell 8 (as shown in FIG. 9).

Figure 11:
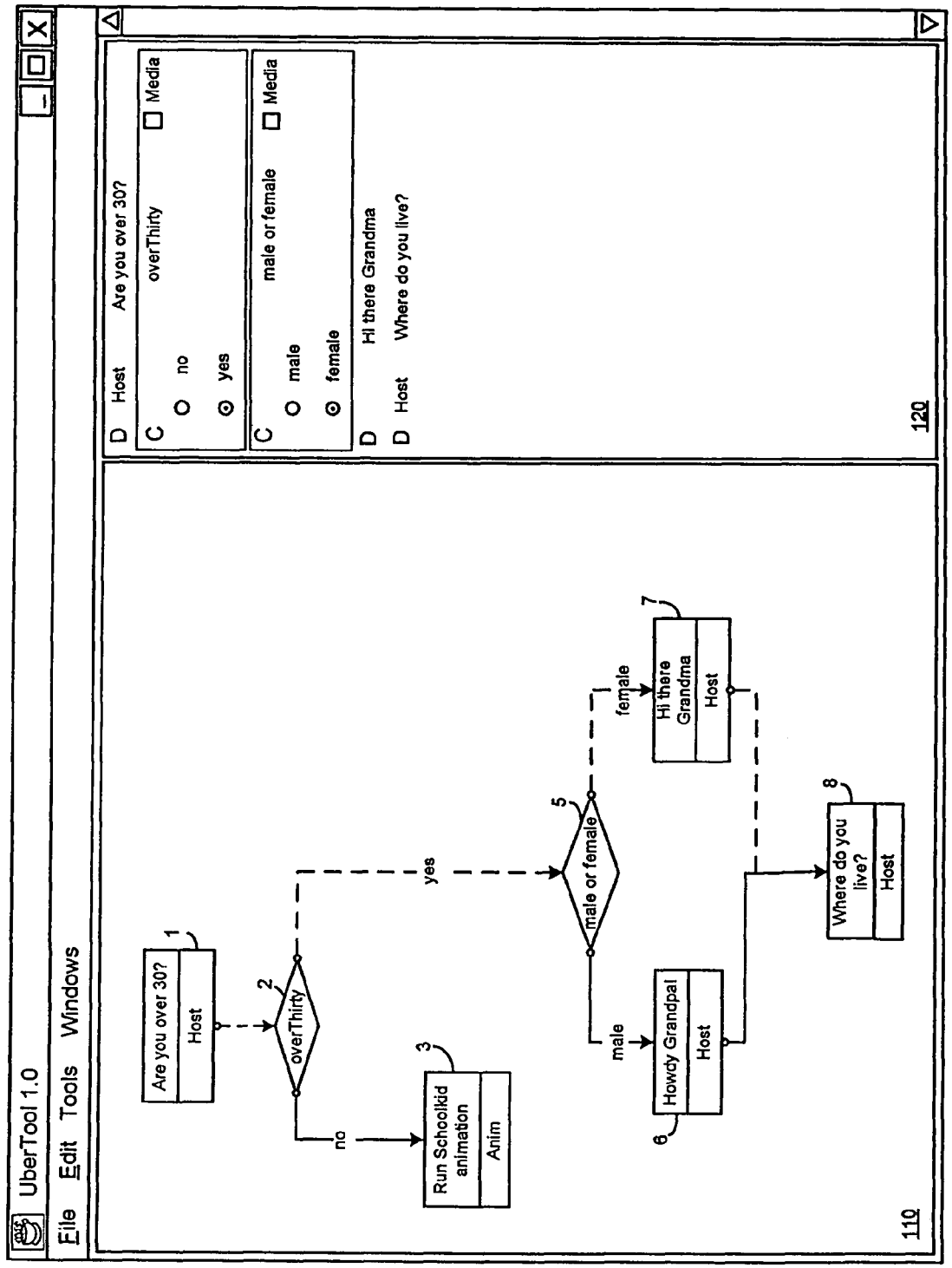
FIG. 11 is an illustration of a preferred embodiment in which cell 4 has been deleted from the Structure and Script Windows.

If the user then wants to delete cell 4, for example, he can click on the text box in the Script Window 120 for cell 4 (or the same cell in the Structure Window 110) and hit delete. Cell 4 is then deleted from both the Script Window 120 and the Structure Window 110. Depending on how the user has set his preferences, the application can automatically attach the cell above the deleted cell (cell 2, condition=yes) to the cell below the deleted cell (cell 5), as shown in FIG. 11. The application can contain similar functionality for copying or cutting a cell from one part of the flowchart and pasting it elsewhere. Additional functionality includes, but is not limited to, editing a cell, adding a cell, deleting a cell, adding a link between cells, removing a link between cells, adding conditional branch(es), and deleting conditional branch(es). For example, to attach a cell manually to another cell, a user can click on the first cell, drag a line out of that cell, and "drop" the end of the line on the other cell. A link is then made between the two cells. As another example, to delete a link, a user can grab the arrow going into a cell, drag it off the cell, and drop it on the open flowchart. Alternatively, the user can right-click on the line and choose a "remove link" option from a pop-up window.

As described above, the functions applied to the Script Window 120 (or the Structure Window 110) are mirrored in the Structure Window 110 (or the Script Window 120). For example, if a user selects a cell on the Script Window 120 and issues a command to insert a cell, the cell will be inserted into both the Structure Window 110 and the Script Window 120 below the currently-selected cell. Similar to the ability to split a paragraph in two in a word-processor, the user can highlight part of the text within a cell in the Script Window 120 and issues a command to insert a cell, and the application will create a new cell attached to the current cell with the highlighted text. If the highlighted text includes the first character of that text, the cell is preferably inserted above the current cell; otherwise, it is preferably inserted below. It should be noted that connecting a cell from one branch of the flowchart to an entirely different branch may require the user to define the path on the Structure Window 110. However, the flow between such connected cells will appear as a single path in the Script Window 120.

There are several advantages associated with this preferred embodiment, especially if the application is used to write and edit copy for an interactive multimedia experience. Interactive multimedia experiences are often written by writers who are more accustomed to using a word processor to type in a story than using a tool to create a flowchart. With this preferred embodiment, the writer can focus primarily on developing content in the Script Window 120 (as he would if he were using a word processor), while the application automatically creates and modifies the graphical view of the flowchart in the Structure Window 110. Additionally, from the writer's standpoint, it can be extremely difficult to visualize the linear flow through an experience by viewing the graphical view of the flowchart. A typical interactive multimedia experience consists of many prompts and decision logic after each prompt, with each decision producing a branch leading to additional processing steps. These large branching structures can be difficult to design and produce due to the unwieldy nature of the flowchart and writing tasks. The complexities of determining and managing the branching structures of a flowchart can pull creative focus away from developing its content because it is mechanically difficult to harmonize the content and the structure of an interactive program the way a great screenplay harmonizes every line of dialogue with the plot and vice-versa. However, the quality of the experience will be largely determined by whether the writer takes into account all of the possible paths and makes them flow seamlessly. Providing a Script Window 120 that at any one time represents the flow through a single path addresses this problem by making it easy for the writer to read and write each path as if it were a normal sequential storyline.

There are several alternatives that can be used with these preferred embodiments. For example, while the first and second display regions 110, 120 were displayed simultaneously in the example described above, in an alternate embodiment, the first and second display regions 110, 120 are displayed at different times. In another alternate embodiment, instead of applying the input to both display regions simultaneously, the input is applied first to one display region and later to the other. Additionally, instead of or in addition to using the keyboard, a user can use a mouse (or other pointing device) and menu selections to execute equivalent operations. However, some operations may only be available in the Structure Window 110. For example, a user can connect a branch in one area of the flowchart to another part of the flowchart by using a mouse to drag a connector line in the Structure Window 110 since only a single path is visible in the Script Window 120 at one time in this embodiment. Of course, provisions can be made for this functionality to be executed in the Script Window 120 as well.

In yet another alternate embodiment, instead of or in addition to using the Script Window 120 to edit cells, a user can edit the content and/or properties of cells in the flowchart displayed in the Structure Window 110. Accordingly, the Script Window 120 can drive the Structure Window 110 or vice versa. In this way, the designer can build an interactive multimedia experience by editing nodes in the graphical flowchart or textual specifications in a textual view. For example, cells on a selected path can be enlarged to allow a user to easily see the flow of the path and edit the contents of the cells on the flowchart itself. In this way, a user can create a cell in the graphic flowchart view, enter script in the enlarged cell, hit return, and have that cell appear in the textual view of the cell to see the single path flow. As noted above, the cells of the selected path can temporarily align themselves vertically to create the appearance of the Structure Window 120. Additionally, a third display area can be provided for receiving user input, and the application can apply the input received in the third display area to the Structure and Script Windows 110, 120. The third display area can take the form of a "properties window" that displays and allows a user to edit the properties of the cell such as script description, timing properties, and visual display properties.

As noted above, as the user clicks on different nodes in the flowchart, the application shows the currently-selected path in the Script Window 120. Preferably, the application uses the single path selection technique discussed above to "remember" the last selected path leading in to and out of the selected cell. It should be noted, however, that these preferred embodiments can be used without the single path embodiments discussed above. Additionally, any of the alternatives discussed above with respect to path selection can also be used with this preferred embodiment. For example, instead of displaying a textual view, the second display region 120 can display a copy of the flowchart where only the cells in the selected path are visible and the cells that are not on the path are hidden. In this way, the second display region 120 would display a graphical view of one path in the flowchart in isolation. The user can then create or edit cells on this graphical view. Additionally, the cells along a path can be identified in any other manner to allow a user to perceive and edit cells along that path. For example, the cells along a path can be displayed larger than the other cells in the flowchart. Here, the "second display region" (the display area occupied by these larger cells in the flowchart) is part of the first display region.

In another alternate embodiment, the application can be equipped with various functionality to allow it to facilitate the construction of the media assets scripted by the writer and for providing the programming necessary to fully render the interactive multimedia experience on a given platform. As noted above, cells can contain instructions to play a media asset such as an audio file or a video file. When a writer is scripting the content of the interactive multimedia experience, those media assets may not exist. The application can sort the various pieces of uncreated media based on the talent that is necessary to create the media or on other criteria for sorting. For example, the cells can be divided into music tasks, animation tasks, art tasks, programming tasks, SFX tasks, writing tasks, video tasks, and performance tasks. In this way, artists used to create the media can be assigned a list of tasks that need to be performed. When each of the media assets is created by the artists and inserted into designated "slots" in a database, the application can assemble the completed media for playback. The slots in the database can be created before or after the media assets are created. Because an interactive multimedia experience can have thousands of assets and a non-linear structure, it is preferred that the application maintain a database to track the media assets.

The application can also allow the writer to guide the various artists with annotations as to how the media should be rendered or performed. This process is analogous to a scriptwriter's comments regarding stage directions or other production issues in a play. The application can also produce cue cards that guide the talent in the performance and recording of the media. For other types of media, the writer can create preliminary versions of animations, music, etc. as guides for the creative staff when they are creating final versions. The application can also be used by the talent to record the media. For example, an integrated audio recording tool can be provided that assists the talent and producer in capturing the audio, still images, animation, etc., performing post-processing, and storing the media in an asset database. The audio recording tool can also show the points in the audio that precede and succeed a performance, making it easier for the performer to ensure seamless transitions. The talent can also enter comments back to the writer regarding issues that might arise in the performance.

Finally, it should be noted that a path can contain additional cells that are determined using techniques in addition to the ones described above. For example, if the techniques described above generate a path that contains an endless loop, the path can be modified to show a path out of the endless loop. As another example, a path can be expanded to include "dead-end" cells that are simultaneously triggered by a cell in a path. These dead-end cells can, for example, play sound effects or animation when a cell on the determined path is played.

The CD-ROM appendix contains a computer program listing for a presently preferred embodiment.

It is intended that the foregoing detailed description be understood as an illustration of selected forms that the invention can take and not as a definition of the invention. It is only the following claims, including all equivalents, that are intended to define the scope of this invention.

What is claimed is:

1. A method for identifying cells in a path in a flowchart, the method comprising:
    (a) displaying a flowchart comprising a plurality of cells, wherein at least some of the plurality of cells in the flowchart comprise instructions for providing an interactive multimedia presentation, wherein at least one of the plurality of cells comprises an instruction to trigger a piece of media during the interactive multimedia presentation, wherein timing information specifies when the piece of media is to be played during the interactive multimedia presentation, and wherein at least one other of the plurality of cells comprises an instruction to gather user input during the interactive multimedia presentation;
    (b) receiving, from a user, a selection of a cell in the flowchart;
    (c) determining a path comprising the selected cell;
    (d) identifying, to the user, at least some cells in the path in a way that distinguishes the at least some cells in the path from at least some cells in the flowchart that are not in the path; and
    (e) for at least one of the plurality of cells that comprise an instruction to trigger a piece of media during the interactive multimedia presentation, displaying a description of the media that will be played during the interactive multimedia presentation.

2. The method of claim 1, wherein the flowchart is displayed in a first display region, and wherein the at least some cells in the path are identified in (d) by displaying a textual view of the at least some of the cells in the path in a second display region.

3. The method of claim 1, wherein the flowchart is displayed in a first display region, and wherein the at least some of the cells in the path are identified in (d) by displaying a copy of the at least some of the cells in the path in a second display region.

4. The method of claim 1, wherein the at least some cells in the path are identified in (d) by highlighting the at least some cells in the path in the flowchart.

5. The method of claim 1, wherein the at least some cells in the path are identified in (d) by enlarging the at least some cells in the path in the flowchart.

6. A method for identifying cells in a path in a flowchart, the method comprising:
   (a) displaying a flowchart comprising a plurality of cells, wherein the plurality of cells define a plurality of paths, wherein at least some of the plurality of cells in the flowchart comprise instructions for providing an interactive multimedia presentation, wherein at least one of the plurality of cells comprises an instruction to trigger a piece of media during the interactive multimedia presentation, wherein timing information specifies when the piece of media is to be played during the interactive multimedia presentation, and wherein at least one other of the plurality of cells comprises an instruction to gather user input during the interactive multimedia presentation;
   (b) receiving, from a user, a selection of a single cell in the flowchart;
   (c) in response to the selection of the single cell in the flowchart, determining a path comprising the single cell;
   (d) identifying, to the user, at least some cells in the path determined in (c) in a way that distinguishes the at least some cells in the path from at least some cells in the flowchart that are not in the path; and
   (e) for at least one of the plurality of cells that comprise an instruction to trigger a piece of media during the interactive multimedia presentation, displaying a description of the media that will be played during the interactive multimedia presentation.

7. The method of claim 6, wherein the path is determined in (c) based on a history of the single cell and a history of cells above and below it.

8. The method of claim 6, wherein (c) comprises, starting with the single cell being a given cell:
   (c1) determining which cell directly connected to the given cell was in a determined path the last time the given cell was in a determined path; and
   (c2) repeating (c1) with the given cell being the cell determined in (c1).

9. The method of claim 6, wherein the flowchart is displayed in a first display region, and wherein the at least some of the cells in the path are identified to the user in (d) by displaying a textual view of the at least some cells in the path, but not of the at least some cells in the flowchart that are not in the path, in a second display region.

10. The method of claim 6, wherein the flowchart is displayed in a first display region, and wherein the at least some cells in the path are identified to the user in (d) by displaying a copy of the at least some cells in the path, but not of the at least some cells in the flowchart that are not in the path, in a second display region.

11. A method for identifying cells in a path in a flowchart, the method comprising:
   (a) displaying a flowchart comprising a plurality of cells, wherein the plurality of cells define a plurality of paths, wherein at least some of the plurality of cells in the flowchart comprise instructions for providing an interactive multimedia presentation, wherein at least one of the plurality of cells comprises an instruction to trigger a piece of media during the interactive multimedia presentation, wherein timing information specifies when the piece of media is to be played during the interactive multimedia presentation, and wherein at least one other of the plurality of cells comprises an instruction to gather user input during the interactive multimedia presentation;
   (b) receiving, from a user, a selection of a cell in the flowchart;
   (c) determining a path comprising the selected cell based on a history of the selected cell and a history of cells above and below it, if any;
   (d) identifying, to the user, at least some cells in the path determined in (c) in a way that distinguishes the at least some cells in the path from at least some cells in the flowchart that are not in the path; and
   (e) for at least one of the plurality of cells that comprise an instruction to trigger a piece of media during the interactive multimedia presentation, displaying a description of the media that will be played during the interactive multimedia presentation.

12. The method of claim 11, wherein (c) comprises, starting with the selected cell being a given cell:
   (c1) determining which cell directly connected to the given cell was in a determined path the last time the given cell was in a determined path; and
   (c2) repeating (c1) with the given cell being the cell determined in (c1).

13. The method of claim 11, wherein the flowchart is displayed in a first display region, and wherein the at least some cells in the path are identified to the user in (d) by displaying a textual view of the at least some cells in the path, but not of the at least some cells in the flowchart that are not in the path, in a second display region.

14. The method of claim 11, wherein the flowchart is displayed in a first display region, and wherein the at least some cells are identified to the user in (d) by displaying a copy of the at least some cells in the path, but not of the at least some of the plurality of cells in the flowchart that are not in the path, in a second display region.

15. A method for identifying cells in a path in a flowchart, the method comprising:
   (a) displaying a flowchart in a first display region, wherein the flowchart comprises a plurality of cells defining a plurality of paths, wherein at least some of the plurality of cells in the flowchart comprise instructions for providing an interactive multimedia presentation, wherein at least one of the plurality of cells comprises an instruction to trigger a piece of media during the interactive multimedia presentation, wherein timing information specifies when the piece of media is to be played during the interactive multimedia presentation, and wherein at least one other of the plurality of cells comprises an instruction to gather user input during the interactive multimedia presentation;
   (b) receiving, from a user, a selection of a cell in the flowchart;
   (c) determining a path comprising the selected cell;
   (d) identifying, to the user, at least some cells in the path by displaying a textual view of the at least some cells in the path, but not of at least some cells in the flowchart that are not in the path, in a second display region; and
   (e) for at least one of the plurality of cells that comprise an instruction to trigger a piece of media during the interactive multimedia presentation, displaying a description of the media that will be played during the interactive multimedia presentation.

16. The method of claim 15, wherein the path is determined in (c) based on a history of the selected cell and a history of cells above and below it, if any.

17. The method of claim 15, wherein (c) comprises, starting with the selected cell being a given cell:
   (c1) determining which cell directly connected to the given cell was in a determined path the last time the given cell was in a determined path; and (c2) repeating (c1) with the given cell being the cell determined in (c1).

18. A method for identifying cells in a path in a flowchart, the method comprising:
- (a) displaying a flowchart comprising a plurality of cells, wherein at least one of the plurality of cells comprises an instruction to trigger a piece of media during an interactive multimedia presentation, wherein timing information specifies when the piece of media is to be played during the interactive multimedia presentation;
- (b) receiving, from a user, a selection of a cell in the flowchart;
- (c) determining a plurality of paths comprising the selected cell;
- (d) identifying, to the user, at least some of the cells in each of the plurality of paths in a way that distinguishes the at least some of the cells in each of the plurality of paths from cells in other paths in the flowchart; and
- (e) for at least one of the plurality of cells that comprise an instruction to trigger a piece of media during the interactive multimedia presentation, displaying a description of the media that will be played during the interactive multimedia presentation.

19. The method of claim 18, wherein the flowchart is displayed in a first display region, and wherein the at least some of the cells in each of the plurality of paths are identified in (d) by displaying a textual view of the at least some of the cells in each of the plurality of paths in a second display region.

20. The method of claim 18, wherein the flowchart is displayed in a first display region, and wherein the at least some of the cells in each of the plurality of paths are identified in (d) by displaying a copy of the at least some of the cells in each of the plurality of paths in a second display region.

21. The method of claim 20, wherein the at least some of the cells in each of the plurality of paths comprise direct parent cells of the selected cell.

22. The method of claim 20, wherein changes received to the copy of the at least some of the cells in each of the plurality of paths in the second display region are applied to the flowchart displayed in the first display region.

23. The method of claim 18, wherein the at least some of the cells in each of the plurality of paths are identified in (d) by highlighting the at least some of the cells in each of the plurality of paths in the flowchart.

24. The method of claim 18, wherein the at least some of the cells in each of the plurality of paths are identified in (d) by enlarging the at least some of the cells in each of the plurality of paths in the flowchart.

25. The method of claim 18, wherein at least one other of the plurality of cells comprises an instruction to gather user input during the interactive multimedia presentation.

26. A method for identifying cells in a path in a flowchart, the method comprising:
- (a) displaying a flowchart comprising a plurality of cells, wherein at least one of the plurality of cells comprises an instruction to trigger a piece of media during an interactive multimedia presentation, wherein timing information specifies when the piece of media is to be played during the interactive multimedia presentation, and wherein at least one other of the plurality of cells comprises an instruction to gather user input during the interactive multimedia presentation;
- (b) receiving, from a user, a selection of a cell in the flowchart;
- (c) determining a plurality of paths comprising the selected cell;
- (d) identifying, to the user, at least some of the cells in each of the plurality of paths in a way that distinguishes the at least some of the cells in each of the plurality of paths from cells in other paths in the flowchart; and
- (e) for at least one of the plurality of cells that comprise an instruction to trigger a piece of media during the interactive multimedia presentation, displaying a description of the media that will be played during the interactive multimedia presentation;
- wherein the flowchart is displayed in a first display region, and wherein the at least some of the cells in each of the plurality of paths are identified in (d) by displaying a copy of the at least some of the cells in each of the plurality of paths in a second display region, and wherein the at least some of the cells in each of the plurality of paths comprise direct parent cells of the selected cell.

27. The method of claim 26, wherein changes received to the copy of the at least some of the cells in each of the plurality of paths in the second display region are applied to the flowchart displayed in the first display region.

* * * * *